US008304037B2

(12) United States Patent
Yano

(10) Patent No.: US 8,304,037 B2
(45) Date of Patent: Nov. 6, 2012

(54) TRANS-MONOFLUOROETHYLENE LIQUID CRYSTAL COMPOUND HAVING NEGATIVE DIELECTRIC ANISOTROPY, A LIQUID CRYSTAL COMPOSITION USING THE COMPOUND AND A LIQUID CRYSTAL DISPLAY DEVICE

(75) Inventor: Tomohiro Yano, Ichihara (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 3 days.

(21) Appl. No.: 13/114,797

(22) Filed: May 24, 2011

(65) Prior Publication Data

US 2011/0291047 A1 Dec. 1, 2011

(30) Foreign Application Priority Data

May 28, 2010 (JP) ................................ 2010-122840

(51) Int. Cl.

| | |
|---|---|
| ***C09K 19/34*** | (2006.01) |
| ***C09K 19/30*** | (2006.01) |
| ***C09K 19/12*** | (2006.01) |
| ***C09K 19/20*** | (2006.01) |
| ***C07C 25/24*** | (2006.01) |
| ***C07C 43/225*** | (2006.01) |

(52) U.S. Cl. ............... 428/1.1; 252/299.61; 252/299.63; 252/299.66; 252/299.67; 568/663; 568/669; 570/128

(58) Field of Classification Search .................. 428/1.1; 252/299.61, 299.62, 299.63, 299.66, 299.67; 568/663, 669; 570/128
See application file for complete search history.

(56) References Cited

FOREIGN PATENT DOCUMENTS

| | | |
|---|---|---|
| JP | H05-070382 A | 3/1993 |
| JP | 2002-193852 A | 10/2002 |

*Primary Examiner* — Shean C Wu
(74) *Attorney, Agent, or Firm* — Hogan Lovells US LLP

(57) ABSTRACT

A liquid crystal compound having general physical properties necessary for a liquid crystal compound, a high stability to heat, light or the like, a small viscosity, a suitable refractive index anisotropy, a suitable dielectric anisotropy and steep electro-optic characteristics, a wide temperature range of a nematic phase and an excellent compatibility with other liquid crystal compounds, and a liquid crystal compound especially having a wide temperature range of a nematic phase. A compound represented by formula (1).

(1)

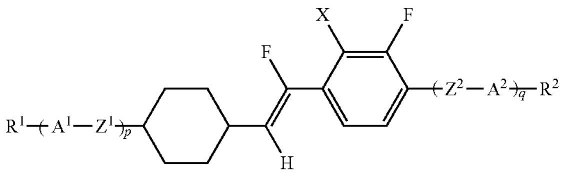

with, for example, $R^1$ and $R^2$ are alkyl having 1 to 10 carbons; $A^1$ is 1,4-cyclohexylene; $A^2$ is 2,3-difluoro-1,4-phenylene; X is fluorine or chlorine; $Z^1$ and $Z^2$ are a single bond; and p and q is 0 or 1.

16 Claims, No Drawings

TRANS-MONOFLUOROETHYLENE LIQUID CRYSTAL COMPOUND HAVING NEGATIVE DIELECTRIC ANISOTROPY, A LIQUID CRYSTAL COMPOSITION USING THE COMPOUND AND A LIQUID CRYSTAL DISPLAY DEVICE

BACKGROUND OF THE INVENTION

1. Field of the Invention

The invention relates to a new liquid crystal compound that is useful as a material for use in a liquid crystal display device, and a liquid crystal composition including this compound. More specifically, the invention relates to a new liquid crystal compound that has a small viscosity and an excellent compatibility with other liquid crystal compounds, and further has a suitable optical anisotropy and dielectric anisotropy, and that gives a steep electro-optic characteristics when the compound is used for a liquid crystal display device, and relates to a liquid crystal composition that includes this compound and to a liquid crystal display device that contains this liquid crystal composition.

2. Related Art

A display device containing a liquid crystal compound has been widely used for displays of a computer, a television set and so forth. In this display device, the optical anisotropy, the dielectric anisotropy and so forth of the liquid crystal compound are utilized.

A liquid crystal phase includes a nematic liquid crystal phase, a smectic liquid crystal phase, a cholestric liquid crystal phase, and the nematic phase is most widely applied. An operating mode includes modes such as DS (dynamic scattering), DAP (deformation of aligned phases), GH (guest-host), TN (twisted nematic), STN (super twisted nematic), TFT (a thin film transistor), VA (vertical alignment), IPS (in-plane switching) and PSA (polymer sustained alignment).

A liquid crystal compound used for these operating modes is required to have a liquid crystal phase in a wide temperature range including room temperature, a sufficient stability under conditions that the display device is used, and also sufficient characteristics for driving the display device. However, no single liquid crystal compounds that satisfy these conditions have been found until now.

The actual situation is that a liquid crystal composition is prepared by mixing from several to several tens of liquid crystal compounds in order to satisfy the required characteristics. It is required that the liquid crystal composition is stable to moisture, light, heat and air, which are normally present under conditions that the display is used, and to an electric field or electromagnetic radiation, and also is stable chemically to a compound that will be mixed. It is required that the liquid crystal composition has suitable values of characteristics such as optical anisotropy ($\Delta n$) and dielectric anisotropy ($\Delta\in$), depending on the operating mode or the shape of the display device. Furthermore, it is important that each component in the liquid crystal composition has an excellent solubility in each other.

It is desirable for an excellent liquid crystal display that the product ($\Delta n \times d$) of the cell thickness of the liquid crystal display device and the optical anisotropy ($\Delta n$) of the liquid crystal composition used is constant. See E. Jakeman, et al., Phys. Lett., 39A. 69 (1972). The response speed of the liquid crystal display device is inversely proportional to the square of the cell thickness. Accordingly, a liquid crystal composition having a large optical anisotropy should be used in order to produce a liquid crystal display device that is able to respond at high speed and thus can be applied to the display of moving images and so forth. A variety of liquid crystal compounds having a large optical anisotropy have been synthesized until now. Since such a compound having a large optical anisotropy generally has a highly conjugated molecular structure, the compound has a tendency to have a poor compatibility with the other liquid crystal compounds, and thus it is difficult to use the compound as a component of a liquid crystal composition having excellent electrical characteristics. Further, in a liquid crystal compound used as a component of a liquid crystal composition, which is required to be a high insulation (specific resistance), for using a liquid crystal display device with a thin film transistor type, a high stability is required.

In the operating mode described above, the VA mode, the PSA mode and so forth utilize homeotropic orientation of liquid crystal molecules, and it is known that a limited viewing angle, which is a disadvantage of a conventional display mode such as the TN mode and the STN mode, can be improved by means of these modes.

A liquid crystal compound having a trans-monofluoroethylene group as a bonding group has conventionally been studied as a component of a liquid crystal composition usable for these liquid crystal display devices.

The patent document No. 1 discloses the compounds (S-1) and (S-2), and these compounds have features that are small in viscosity and stable to light. However, a compound having negative dielectric anisotropy is not disclosed.

(s-1)

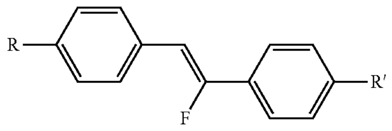

(s-2)

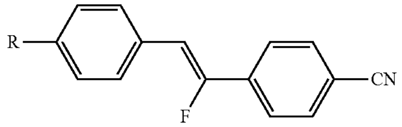

R and R' are an alkyl group.

The patent document No. 2 discloses the compounds (S-3) and (S-4) having negative dielectric anisotropy and having an ethylene group as a bonding group. However, a compound in which fluorine is introduced in the ethylene group is not disclosed.

(s-3)

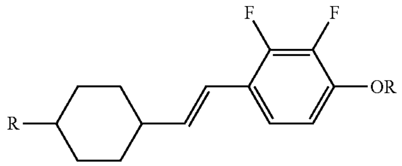

(s-4)

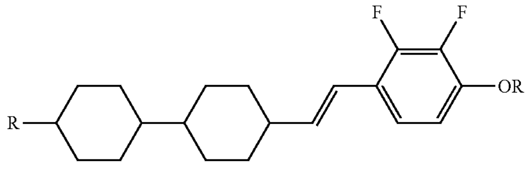

R is an alkyl group.

3. References

No. 1: JP H05-070382 A (1993).

No. 2: JP 2002-193852 A.

SUMMARY OF THE INVENTION

The invention concerns a compound represented by formula (1), a liquid crystal composition and a liquid crystal display device:

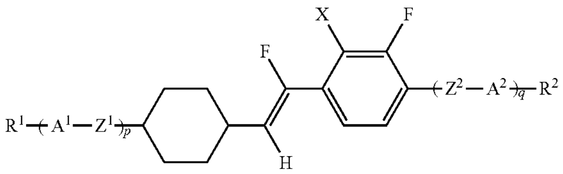

(1)

wherein $R^1$ and $R^2$ are each independently alkyl having 1 to 10 carbons, and in the alkyl, arbitrary —$CH_2$— may be replaced by —O—, —S—, —CO—, —CH═CH— or —C≡C—, and in these groups, arbitrary hydrogen may be replaced by halogen or —C≡N; $A^1$ and $A^2$ are each independently 1,4-cyclohexylene, 1,4-cyclohexenylene or 1,4-phenylene, and in these rings, arbitrary —$CH_2$— may be replaced by —O—, arbitrary —CH═ may be replaced by —N═, and arbitrary hydrogen may be replaced by fluorine, chlorine or bromine; $Z^1$ and $Z^2$ are each independently a single bond, —$(CH_2)_2$—, —$(CF_2)_2$—, —COO—, —OCO—, —$OCH_2$—, —$CH_2O$—, —CH═CH—, —C≡C—, —$(CH_2)_4$—, —$O(CH_2)_3$— or —$(CH_2)_3O$—; X is fluorine or chlorine; and p and q are each independently 0 or 1.

DETAILED DESCRIPTION OF THE INVENTION

Accordingly, there are still subjects to be solved even in a liquid crystal display device having an operating mode such as an IPS mode, a VA mode and a PSA mode, and, for example, an improvement of the response speed, an improvement of the contrast and a decrease in the driving voltage are expected.

A display device operated in the IPS mode, the VA mode or the PSA mode described above mainly contains a liquid crystal composition having negative dielectric anisotropy, and a liquid crystal compound included in this liquid crystal composition is required to have the following characteristics shown in items (1) to (8), in order to improve the characteristics described above. That is to say:

(1) chemical stability and physical stability, (2) a high clearing point, and the clearing point means the transition temperature between a liquid crystal phase and an isotropic phase, (3) a low minimum temperature of a liquid crystal phase, and the liquid crystal phase means a nematic phase, a smectic phase and so forth, (4) a small viscosity, (5) a suitable optical anisotropy, (6) a suitable negative dielectric anisotropy, and many compounds having a large dielectric anisotropy have a large viscosity, (7) a suitable elastic constant $K_{33}$ or $K_{11}$ ($K_{33}$: a bend elastic constant and $K_{11}$: a splay elastic constant), and (8) an excellent compatibility with other liquid crystal compounds.

A voltage holding ratio can be increased when a composition including a chemically and physically stable liquid crystal compound, as described in item (1), is used for a display device.

The temperature range of a nematic phase is wide in a composition that includes a liquid crystal compound having a high clearing point or a low minimum temperature of a liquid crystal phase as described in items (2) and (3), and thus the device can be used in a wide temperature range.

The response speed and steepness of the response can be improved, when a composition that includes a compound having a small viscosity as described in item (4) or a compound having a suitable elastic constant $K_{33}$ or $K_{11}$ as described in item (7) is used for a display device. The contrast of a display device can be improved, when a composition that includes a compound having a suitable optical anisotropy as described in item (5) is used for a display device.

When a liquid crystal compound has a large negative dielectric anisotropy, the threshold voltage of the liquid crystal composition including this compound can be decreased. Hence, the driving voltage of the display device can be decreased and the electric power consumption can also be decreased, when the display device contains a composition that includes a compound having a suitable negative dielectric anisotropy as described in item (6). The driving voltage of a display device can be adjusted and the electric power consumption can also be adjusted, when the display device contains a composition that includes a compound having a suitable elastic constant $K_{33}$ as described in item (7).

A liquid crystal compound is generally used in the form of a composition prepared by mixing it with many other liquid crystal compounds in order to exhibit characteristics that are difficult to be attained by a single compound. Accordingly, it is desirable that a liquid crystal compound used for a display device has an excellent compatibility with other liquid crystal compounds and so forth, as described in item (8). Since the display device may also be used in a wide temperature range including a lower temperature than the freezing point, the compound that exhibits an excellent compatibility even at a low temperature may be desirable.

The first advantage of the invention is to solve the subject of a conventional technique and to provide a liquid crystal compound that has general physical properties necessary for a liquid crystal compound, a high stability to heat, light or the like, a small viscosity, a suitable optical anisotropy, a suitable negative dielectric anisotropy, a suitable elastic constant $K_{33}$ and $K_{11}$, steep electro-optic characteristics, a wide temperature range of a nematic phase and an excellent compatibility with other liquid crystal compounds.

The second advantage of the invention is to provide a liquid crystal composition that includes this liquid crystal compound and has a high maximum temperature of a nematic phase, a low minimum temperature of a nematic phase, a small viscosity, a suitable optical anisotropy and a low threshold voltage, and especially has a high maximum temperature of a nematic phase and a low minimum temperature of a nematic phase.

The third advantage of the invention is to provide a liquid crystal display device that contains this composition and has a wide temperature range in which the device can be used, a short response time, small electric power consumption, a large contrast and a low driving voltage, and especially has a wide temperature range in which the device can be used.

The inventors had studied the above subjects earnestly, and found that a liquid crystal compound having a trans-monofluoroethylene group as a bonding group had a high response speed, an excellent steepness of the response, a quite small viscosity, a high chemical stability, a wide temperature range of a nematic phase, a large optical anisotropy and a suitable negative dielectric anisotropy. The inventors also found that a liquid crystal display device having steep electro-optic characteristics, a short response time, a wide operating temperature range and a small driving electric power can be made by use of a liquid crystal composition including the preceding compound. Accordingly, the preceding compounds is suitable for a liquid crystal display device, especially a liquid crystal display device having a mode such as ECB, IPS, VA or PSA, which is widely used at present, and the inventors completed the invention.

The invention includes the following items.

Item 1. A compound represented by formula (1):

(1)

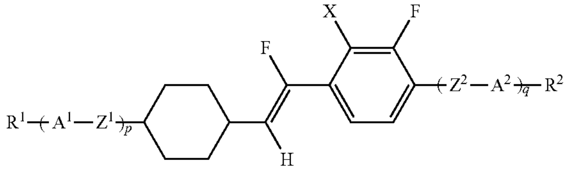

wherein $R^1$ and $R^2$ are each independently alkyl having 1 to 10 carbons, and in the alkyl, arbitrary $—CH_2—$ may be replaced by —O—, —S—, —CO—, —CH═CH— or —C≡C—, and in these groups, arbitrary hydrogen may be replaced by halogen or —C≡N; $A^1$ and $A^2$ are each independently 1,4-cyclohexylene, 1,4-cyclohexenylene or 1,4-phenylene, and in these rings, arbitrary $—CH_2—$ may be replaced by —O—, arbitrary —CH═ may be replaced by —N═, and arbitrary hydrogen may be replaced by fluorine, chlorine or bromine; $Z^1$ and $Z^2$ are each independently a single bond, $—(CH_2)_2—$, $—(CF_2)_2—$, —COO—, —OCO—, $—OCH_2—$, $—CH_2O—$, —CH═CH—, —C≡C—, $—(CH_2)_4—$, $—O(CH_2)_3—$ or $—(CH_2)_3O—$; X is fluorine or chlorine; and p and q are each independently 0 or 1.

Item 2. The compound according to item 1, wherein $R^1$ and $R^2$ are each independently alkyl having 1 to 10 carbons, alkenyl having 2 to 10 carbons or alkoxy having 1 to 9 carbons; $A^1$ and $A^2$ are each independently 1,4-cyclohexylene, 1,4-cyclohexenylene, 1,4-phenylene, 2,3-difluoro-1,4-phenylene, 2-fluoro-1,4-phenylene or 3-fluoro-1,4-phenylene; $Z^1$ and $Z^2$ are each independently a single bond, $—(CH_2)_2—$, —COO—, —OCO—, $—OCH_2—$, $—CH_2O—$, —CH═CH— or —C≡C—.

Item 3. The compound according to item 1, wherein $R^1$ is alkyl having 1 to 10 carbons; $R^2$ is alkoxy having 1 to 9 carbons; $A^1$ is 1,4-cyclohexylene, 1,4-cyclohexenylene, 1,4-phenylene or 2,3-difluoro-1,4-phenylene; $Z^1$ is a single bond; X is fluorine; and p is 1 and q is 0.

Item 4. The compound according to item 1, wherein $R^1$ is alkyl having 1 to 10 carbons; $R^2$ is alkoxy having 1 to 9 carbons; $A^1$ and $A^2$ are each independently 1,4-cyclohexylene, 1,4-phenylene or 2,3-difluoro-1,4-phenylene; $Z^1$ and $Z^2$ are a single bond; X is fluorine; and p is 1 and q is 1.

Item 5. A liquid crystal composition including at least one of compounds according to any one of items 1 to 4.

Item 6. The liquid crystal composition according to item 5, further including at least one compound selected from the group of compounds represented by formulas (2), (3) and (4).

(2)

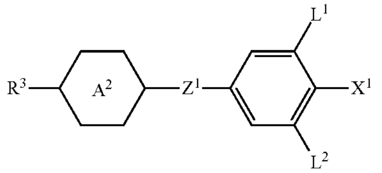

(3)

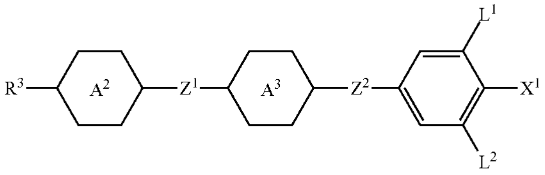

(4)

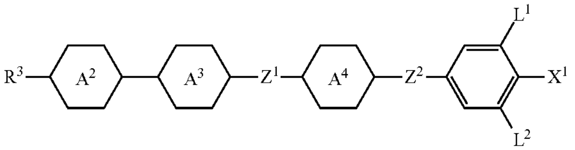

wherein $R^3$ is alkyl having 1 to 10 carbons or alkenyl having 2 to 10 carbons, and in these groups, arbitrary hydrogen may be replaced by fluorine and arbitrary $—CH_2—$ may be replaced by —O—; $X^1$ is fluorine or chlorine; the ring $A^2$, the ring $A^3$ and the ring $A^4$ are each independently 1,4-cyclohexylene, 1,3-dioxane-2,5-diyl, pyrimidine-2,5-diyl, tetrahydropyran-2,5-diyl or 1,4-phenylene in which arbitrary hydrogen may be replaced by fluorine; $Z^1$ and $Z^2$ are each independently $—(CH_2)_2—$, $—(CH_2)_4—$, —COO—, $—CF_2O—$, $—OCF_2—$, —CH═CH—, —C≡C—, $—CH_2O—$ or a single bond; and $L^1$ and $L^2$ are each independently hydrogen or fluorine.

Item 7. The liquid crystal composition according to item 5, further including at least one compound selected from the group of compounds represented by formula (5):

(5)

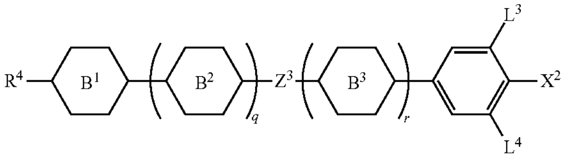

wherein $R^4$ is alkyl having 1 to 10 carbons or alkenyl having 2 to 10 carbons, and in the alkyl and the alkenyl, arbitrary hydrogen may be replaced by fluorine and arbitrary $—CH_2—$ may be replaced by —O—; $X^2$ is —C≡N or —C≡C—C≡N; the ring $B^1$, the ring $B^2$ and the ring $B^3$ are each independently 1,4-cyclohexylene, 1,4-phenylene in which arbitrary hydrogen may be replaced by fluorine, 1,3-dioxane-2,5-diyl, tetrahydropyran-2,5-diyl or pyrimidine-2,5-diyl; $Z^3$ is $—(CH_2)_2—$, —COO—, $—CF_2O—$, $—OCF_2—$, —C≡C—, $—CH_2O—$ or a single bond; $L^3$ and $L^4$ are each independently hydrogen or fluorine; and q is 0, 1 or 2 and r is 0 or 1.

Item 8. The liquid crystal composition according to item 5, further including at least one compound selected from the group of compounds represented by formulas (6), (7), (8), (9), (10) and (11):

(6)

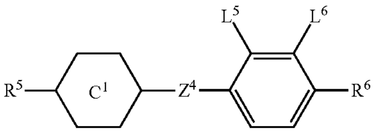

(7)

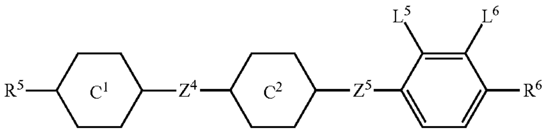

(8)

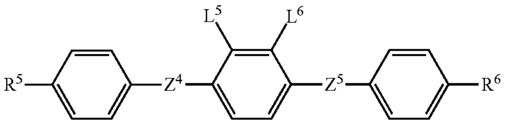

(9)

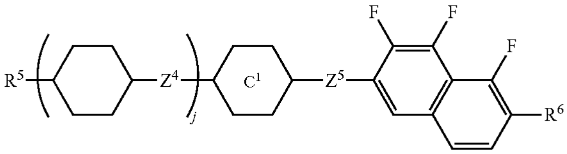

(10)

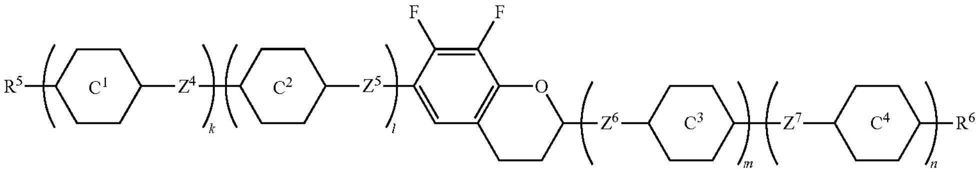

(11)

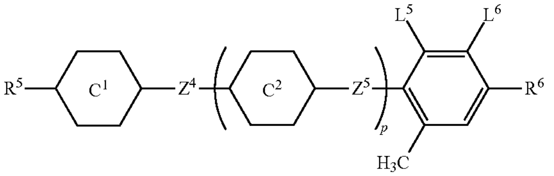

wherein $R^5$ is alkyl having 1 to 10 carbons or alkenyl having 2 to 10 carbons, and in these groups, arbitrary hydrogen may be replaced by fluorine; $R^6$ is alkoxy having 1 to 9 carbons or alkenyloxy having 2 to 9 carbons, and in these groups, arbitrary hydrogen may be replaced by fluorine; the ring $C^1$, the ring $C^2$, the ring $C^3$ and the ring $C^4$ are each independently 1,4-cyclohexylene, 1,4-cyclohexenylene, 1,4-phenylene in which arbitrary hydrogen may be replaced by fluorine, tetrahydropyran-2,5-diyl or decahydronaphthalene-2,6-diyl; $Z^4$, $Z^5$, $Z^6$ and $Z^7$ are each independently $-(CH_2)_2-$, $-COO-$, $-CH_2O-$, $-OCF_2-$, $-OCF_2\ (CH_2)_2-$ or a single bond; $L^5$ and $L^6$ are each independently fluorine or chlorine; and j, k, l, m, n and p are each independently 0 or 1, and the sum of k, l, m and n is 1 or 2.

Item 9. The liquid crystal composition according to item 5, further including at least one compound selected from the group of compounds represented by formulas (12), (13) and (14):

(12)

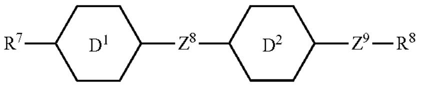

(13)

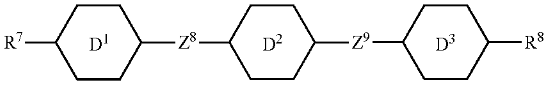

(14)

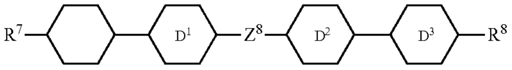

wherein $R^7$ and $R^8$ are each independently alkyl having 1 to 10 carbons or alkenyl having 2 to 10 carbons, and in these groups, arbitrary hydrogen may be replaced by fluorine and arbitrary $-CH_2-$ may be replaced by $-O-$; the ring $D^1$, the ring $D^2$ and the ring $D^3$ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^8$ and $Z^9$ are each independently $-C{\equiv}C-$, $-COO-$, $-(CH_2)_2-$, $-CH{=}CH-$ or a single bond.

Item 10. The liquid crystal composition according to item 6, further including at least one compound selected from the group of compounds represented by formula (5) according to item 7.

Item 11. The liquid crystal composition according to item 6, further including at least one compound selected from the group of compounds represented by formulas (12), (13) and (14) according to item 9.

Item 12. The liquid crystal composition according to item 7, further including at least one compound selected from the group of compounds represented by formulas (12), (13) and (14) according to item 9.

Item 13. The liquid crystal composition according to item 8, further including at least one compound selected from the group of compounds represented by formulas (12), (13) and (14) according to item 9.

Item 14. The liquid crystal composition according to any one of items 5 to 13, further including at least one optically active compound and/or one polymerizable compound.

Item 15. The liquid crystal composition according to any one of items 5 to 14, further including at least one antioxidant and/or one ultraviolet light absorber.

Item 16. A liquid crystal display device containing the liquid crystal composition according to any one of items 5 to 15.

The compound of the invention has general physical properties necessary for a liquid crystal compound, a high stability to heat, light or the like, a small viscosity, a suitable optical anisotropy, a suitable negative dielectric anisotropy and an excellent compatibility with other liquid crystal compounds. The liquid crystal composition of the invention includes at least one of these compounds and has a high maximum temperature of a nematic phase, a low minimum temperature of a nematic phase, a small viscosity, a suitable optical anisotropy, a suitable elastic constant $K_{33}$ ($K_{33}$: a bend elastic constant) and a low threshold voltage. The liquid crystal display device of the invention contains this composition and has a wide temperature range in which the device can be used, a short response time, small electric power consumption, a large contrast ratio and a low driving voltage.

That is to say, the compound of the invention has an excellent compatibility with other liquid crystal compounds, a small viscosity and a wide temperature range of a liquid crystal phase in comparison with known compounds having a similar structure. The compound has a low threshold voltage and a relatively small viscosity in comparison with a similar compound. Further, the compound of the invention is sufficiently stable physically and chemically under conditions that the liquid crystal display device is usually used, and is quite excellent as a component of a nematic liquid crystal composition, and can suitably be used as a component of the liquid crystal composition for use in TN, STN, TFT, VA, IPS and PSA mode-devices.

Usage of the terms in this specification is as follows. A liquid crystal compound is a generic term for a compound having a liquid crystal phase such as a nematic phase or a smectic phase, and also for a compound having no liquid crystal phases but useful as a component for a liquid crystal composition. The terms, a liquid crystal compound, a liquid crystal composition and a liquid crystal display device may be abbreviated to a compound, a composition and a device, respectively. A liquid crystal display device is a generic term for a liquid crystal display panel and a liquid crystal display module. A maximum temperature of a nematic phase is the phase transition temperature between a nematic phase and an isotropic phase, and may simply be abbreviated to the maximum temperature. A minimum temperature of the nematic phase may simply be abbreviated to the minimum temperature. The compound represented by formula (1) may be abbreviated to the compound (1). This abbreviation may apply to the compound represented by formula (2) or the like. In formula (2) to formula (14), the symbols $A^1$, $B^1$, $C^1$, $D^1$ or the like surrounded by a hexagonal shape correspond to the ring $A^1$, the ring $B^1$, the ring $C^1$, the ring $D^1$ or the like, respectively. A plurality of the same symbols were used in the same or different formulas, where these symbols may mean the same or different groups.

"Arbitrary" is used not only in cases where the position is arbitrary but also in cases where the number is arbitrary. However, it is not used in cases where the number is 0 (zero). The expression "arbitrary A may be replaced by B, C or D" includes cases where arbitrary A is replaced by B, and arbitrary A is replaced by C, and arbitrary A is replaced by D, and also cases where a plurality of A are replaced by at least two of B, C and/or D. For example, the expression "alkyl in which arbitrary $-CH_2-$ may be replaced by $-O-$ or $-CH{=}CH-$" includes alkyl, alkenyl, alkoxy, alkoxyalkyl, alkoxyalkenyl and alkenyloxyalkyl. Incidentally, it is undesirable in the invention that two successive $-CH_2-$ are replaced by $-O-$ to give $-O-O-$. It is also undesirable that $-CH_2-$ in the methyl moiety of alkyl is replaced by $-O-$ to give $-O-H$. The amount of a compound that is expressed as a percentage means a weight percentage (% by weight) based on the total weight of the composition. The invention will be further explained below.

The Compound (1) of the Invention

First, the compound (1) will further be explained.

(1)

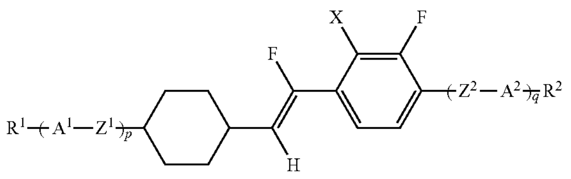

The structure of the compound (1) is divided into the structural units of the left-terminal group, the bonding group, the ring structure and the right-terminal group, all of which are described in Table 4, and each of the structural unit will be explained. The compound (1) is a two-ring, three-ring or 4-ring compound that has a trans-monofluoroethylene group as a bonding group and a benzene ring with fluorine or chlorine at 2-position and with fluorine at 3-position. This compound is quite stable physically and chemically under conditions that a device is usually used, and has an excellent compatibility with other liquid crystal compounds. A composition including this compound is stable under conditions that a device is usually used. This compound does not deposit its crystals (or its smectic phase) even when the composition is kept in storage at a low temperature. The compound has general physical properties necessary for a compound, a suitable optical anisotropy and a suitable negative dielectric anisotropy.

Physical properties such as optical anisotropy and dielectric anisotropy can be adjusted arbitrarily by a suitable selection of the terminal group, the ring structure and the bonding group in the compound (1). The effect of a desirable terminal group, ring $A^1$ and ring $A^2$, and their kinds in the compound (1) on the physical properties of the compound (1) will be explained below.

In $R^1$ and $R^2$ of the compound (1), it is desirable that they are straight-chain. When they are straight-chain, the compound has a wide temperature range of a liquid crystal phase and a small viscosity. When one of $R^1$ and $R^2$ is branched chain, the compound has an excellent compatibility with other liquid crystal compounds. When one of $R^1$ and $R^2$ is an optically active group, the compound is useful as a chiral dopant. A reverse twisted domain which will occur in a device can be prevented by the addition of this compound to a composition. A compound that $R^1$ and $R^2$ are not an optically active group is useful as a component of the composition.

$R^1$ and $R^2$ in the compound (1) are each independently alkyl having 1 to 10 carbons, and in the alkyl, arbitrary $-CH_2-$ may be replaced by $-O-$, $-S-$, $-CO-$, $-CH{=}CH-$ or $-C{\equiv}C-$, and in these groups, arbitrary hydrogen may be replaced by halogen or $-C{\equiv}N$. With regard to $R^1$ and $R^2$, groups can be selected depending on intended use of the compound, according to the following specific examples. Desirable $R^1$ or $R^2$ is alkyl, alkoxy, alkenyl and alkenyloxy, where the alkenyl is a group in which arbitrary $-(CH_2)_2-$ in the alkyl is replaced by $-CH{=}CH-$. For example, examples of $CH_3(CH_2)_3-$ in which arbitrary $-(CH_2)_2-$ is replaced by $-CH{=}CH-$ are $H_2C{=}CH-(CH_2)_2-$, $CH_3-CH{=}CH-CH_2-$ and so forth. As is shown above, "arbitrary" means "at least one selected without distinction." $CH_2$═CH—$CH_2$—$CH_2$—CH═CH— in which the double bond is not adjacent is preferable to $CH_2$═CH—CH═CH—$CH_2$—$CH_2$— in which the double bond is adjacent in consideration of the stability of the compound.

A desirable configuration of —CH═CH— in the alkenyl depends on the position of the double bond. Trans configuration is preferable in the alkenyl having the double bond in the even position such as —$CH_2$CH═$CHCH_3$, —$CH_2$CH═$CHC_2H_5$ and —$CH_2$CH═$CHC_3H_7$. An alkenyl compound having such a desirable configuration has a wide temperature range of a liquid crystal phase, a large elastic constant $K_{33}$ and a small viscosity, and it increases the maximum temperature ($T_{NI}$) of a nematic phase when this liquid crystal compound is added to a liquid crystal composition. Cis configuration is preferable in the alkenyl having the double bond in the odd position such as —CH═$CHCH_3$, —CH═$CHC_2H_5$, —CH═$CHC_3H_7$ and —CH═$CHC_4H_9$. An alkenyl compound having an inner double bond such as —$CH_2$CH═$CHCH_3$ is preferable to that having a terminal double bond such as —$(CH_2)_2$CH═$CH_2$, since it has a large elastic constant $K_{33}$ and a small viscosity of the compound.

Examples of desirable $R^1$ and $R^2$ are —$CH_3$, —$C_2H_5$, —$C_3H_7$, —$C_4H_9$, —$C_5H_{11}$, —$C_6H_{13}$, —$C_7H_{15}$, —$C_8H_{17}$— CH═$CH_2$, —CH═$CHCH_3$, —$CH_2$CH═$CH_2$, —CH═$CHC_2H_5$, —$CH_2$CH═$CHCH_3$, —$(CH_2)_2$ CH═$CH_2$, —CH═$CHC_3H_7$, —$CH_2$CH═$CHC_2H_5$, —$(CH_2)_2$CH═$CHCH_3$, —$(CH_2)_3$CH═$CH_2$, —$CH_2$CH═CH$(CH_2)_2$CH═$CH_2$, —$CH_2$CH═CH$(CH_2)_2$ CH═$CHCH_3$, —$OCH_3$, —$OC_2H_5$, —$OC_3H_7$, —$OC_4H_9$, —$OC_5H_{11}$, —$OC_6H_{13}$, —$OC_7H_{15}$, —$OC_8H_{17}$— OCH═$CH_2$, —OCH═$CHCH_3$, —$OCH_2$CH═$CH_2$, —OCH═$CHC_2H_5$, —$OCH_2$CH═$CHCH_3$, —O$(CH_2)_2$ CH═$CH_2$, —OCH═$CHC_3H_7$, —$OCH_2$CH═$CHC_2H_5$, —O$(CH_2)_2$CH═$CHCH_3$, —O$(CH_2)_3$CH═$CH_2$, —$OCH_2$CH═CH$(CH_2)_2$CH═$CH_2$ and —$OCH_2$CH═CH $(CH_2)_2$CH═$CHCH_3$.

Examples of more desirable $R^1$ and $R^2$ are —$CH_3$, —$C_2H_5$, —$C_3H_7$, —$C_4H_9$, —$C_5H_{11}$, —$C_6H_{13}$, —$C_7H_{15}$, —$C_8H_{17}$, —CH═$CH_2$, —CH═$CHCH_3$, —$CH_2$CH═$CH_2$, —CH═$CHC_2H_5$, —$CH_2$CH═$CHCH_3$, —$(CH_2)_2$ CH═$CH_2$, —CH═$CHC_3H_7$, —$CH_2$CH═$CHC_2H_5$, —$(CH_2)_2$CH═$CHCH_3$, —$(CH_2)_3$CH═$CH_2$, —$OCH_3$, —$OC_2H_5$, —$OC_3H_7$, —$OC_4H_9$, —$OC_5H_{11}$, —$OC_6H_{13}$, —$OC_7H_{15}$, —$OC_8H_{17}$, —OCH═$CH_2$, —OCH═$CHCH_3$, —$OCH_2$CH═$CH_2$, —OCH═$CHC_2H_5$, —$OCH_2$CH═$CHCH_3$, —O$(CH_2)_2$CH═$CH_2$, —OCH═$CHC_3H_7$, —$OCH_2$CH═$CHC_2H_5$, —$(OCH_2)_2$ CH═$CHCH_3$ and —$(OCH_2)_3$CH═$CH_2$.

Examples of the most desirable $R^1$ and $R^2$ are —$CH_3$, —$C_2H_5$, —$C_4H_9$, —$C_6H_{13}$, —$C_8H_{17}$, —CH═$CH_2$, —CH═$CHCH_3$, —$CH_2$CH═$CH_2$, —CH═$CHC_2H_5$, —$CH_2$CH═$CHCH_3$, —$CH_2$CH═$CHC_2H_5$, —$(CH_2)_2$ CH═$CHCH_3$, —$(CH_2)_3$CH═$CH_2$, —$OCH_3$, —$OC_2H_5$, —$OC_4H_9$, —$OC_6H_{13}$, —$OC_8H_{17}$, —OCH═$CH_2$, —OCH═$CHCH_3$, —$OCH_2$CH═$CH_2$, —OCH═$CHC_2H_5$, —$OCH_2$CH═$CHCH_3$, —$OCH_2$CH═$CHC_2H_5$, —$(OCH_2)_2$ CH═$CHCH_3$ and —O$(CH_2)_3$CH═$CH_2$.

In the ring structure of the compound (1), $A^1$ and $A^2$ are each independently 1,4-cyclohexylene, 1,4-cyclohexenylene or 1,4-phenylene, and in these rings, arbitrary —$CH_2$— may be replaced by —O—, arbitrary —CH═ may be replaced by —N═, and arbitrary hydrogen may be replaced by fluorine, chlorine or bromine.

Desirable configuration of 1,4-cyclohexylene is trans. The maximum temperature of a nematic phase ($T_{NI}$) of a liquid crystal phase in the liquid crystal compound can be increased by the effect of such configuration.

The maximum temperature is high, the optical anisotropy is small, and the viscosity is small, when at least one of the rings is 1,4-cyclohexylene. The optical anisotropy is relatively large and the orientational order parameter is large, when at least one of the rings is 2-fluoro-1,4-phenylene, 3-fluoro-1,4-phenylene, 2,3-difluoro-1,4-phenylene, 2-fluoro-3-chloro-1,4-phenylene or 2-chloro-3-fluoro-1,4-phenylene. The optical anisotropy is large, the temperature range of a liquid crystal phase is wide, and the maximum temperature is high, when at least two of the rings are 2-fluoro-1,4-phenylene, 3-fluoro-1,4-phenylene, 2,3-difluoro-1,4-phenylene, 2-fluoro-3-chloro-1,4-phenylene or 2-chloro-3-fluoro-1,4-phenylene.

$Z^1$ and $Z^2$ are each independently a single bond, —$(CH_2)_2$—, —$(CF_2)_2$—, —COO—, —OCO—, —$OCH_2$—, —$CH_2O$—, —CH═CH—, —C≡C—, —$(CH_2)_4$—, —O$(CH_2)_3$— or —$(CH_2)_3$O—; X is fluorine or chlorine; p and q are each independently 0 or 1. Desirable $Z^1$, $Z^2$, $Z^3$ and $Z^4$ are a single bond in view of a wide temperature range of a liquid crystal phase and a small viscosity.

X which is a lateral group in the compound (1) is fluorine or chlorine.

The compound (1) has a large negative dielectric anisotropy. A compound having a large dielectric anisotropy is useful as a component for decreasing the threshold voltage of a composition.

The compound (1) has a suitable negative dielectric anisotropy and a quite excellent compatibility with other liquid crystal compounds. The compound also has a high stability to heat, light or the like, a wide temperature range of a nematic phase, a small viscosity, a large optical anisotropy and a suitable elastic constant $K_{33}$ or $K_{11}$. The viscosity is small when the compound (1) has two rings. The maximum temperature is high when the compound (1) has three rings. As described above, a compound having desired physical properties can be obtained by a suitable selection of the kinds of the terminal group, the ring structure and the bonding group, and the number of the rings. The liquid crystal composition including the compound (1) is stable under conditions that a liquid crystal display device is usually used, and this compound does not deposit its crystals (or its smectic phase) even when the composition is kept in storage at a low temperature.

Accordingly, the compound (1) can suitably be utilized for a liquid crystal composition used for a liquid crystal display device having a display mode such as PC, TN, STN, ECB, OCB, IPS, VA or PSA, and especially for a liquid crystal composition used for a liquid crystal display device having a display mode such as IPS, VA or PSA.

The compound (1) is obtained by the selection of defined groups in $R^1$, $R^2$, $Z^1$, $Z^2$ and X of the formula, and an introduction of the selected groups can be carried out by known and general synthetic organic methods. Representative examples of the synthesis include the methods described in "Vol. 14: Synthesis and Reaction of Organic Compounds" (1978) in New Experimental Chemistry Course (Shin Jikken Kagaku Kouza, in Japanese; Maruzen Co., Ltd.), or "Vol. 19 to Vol. 26: Organic Synthesis I to VIII" (1991) in Experimental Chemistry Course (Jikken Kagaku Kouza, in Japanese; the fourth edition, Maruzen Co., Ltd.).

Next, an example of the preparation of the compound (1) will be shown. Incidentally, the definitions of $R^1$, $R^2$, $Z^1$, $Z^2$, $X^1$, $X^2$ and $X^3$ of each formula in the following synthetic routes are just the same as described previously.

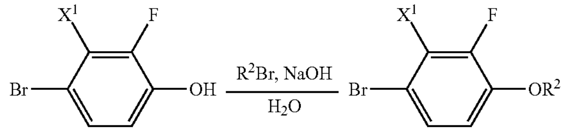

(1a) (1b)

The compound (1a) is dissolved in water, to which an alkyl halide such as an alkyl bromide or an alkenyl halide is added, and then sodium hydroxide is added while paying attention to heat generation. Then the stirring at 80° C. for 1 hour gives the phenol derivative (1b).

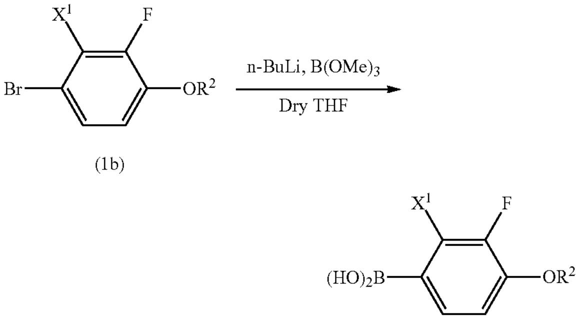

(1b)

(1c)

The reaction of the compound (1b) with n-butyllithium gives a lithium salt, which is allowed to react with a boric acid ester. Hydrolysis of the product under acidic conditions gives dihydroxyborane derivative (1c).

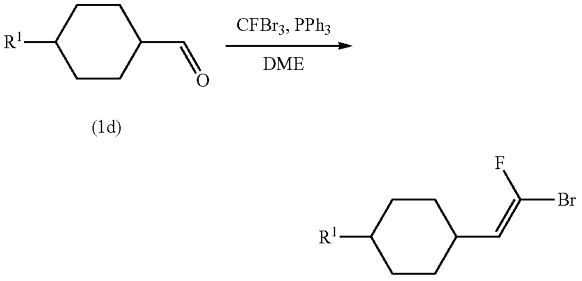

(1d)

(1e)

The reaction of the compound (1d) with fluorotribromomethane in the presence of triphenylphosphine gives the compound (1e).

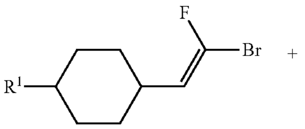

(1e)

-continued

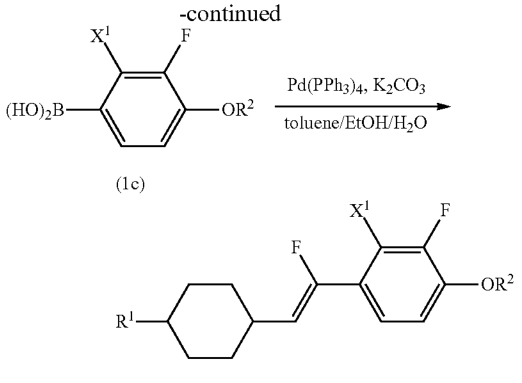

(1c)

(1-a)

The two-ring compound (1-a) where p and q is 0 can be prepared by the reaction of the compound (1e) obtained in the preceding step with the compound (1c) in the presence of a base such as potassium carbonate and a catalyst such as $Pd(PPh_3)_4$.

The following three-ring compounds (1-b) and (1-c) can be prepared in the manner as with the preparation of the compound (1-a).

(1-b)

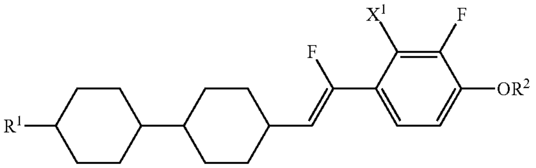

(1-c)

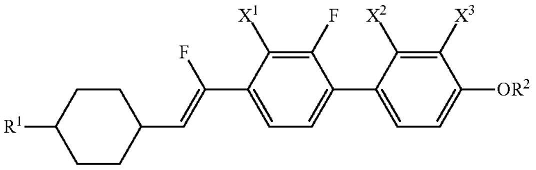

The compound (1-a) has an excellent compatibility with other liquid crystal compounds and a small viscosity. The compounds (1-b) and (1-c) have a high maximum temperature of a nematic phase ($T_{NI}$).

The Liquid Crystal Composition of the Invention

Second, the liquid crystal composition will be further explained in detail. The liquid crystal composition should include at least one compound selected from the group of compounds represented by formula (1) as the component A. A composition of the component A only or a composition of the component A and another component in which the name of the component is not shown in this specification is reasonable. Furthermore, a liquid crystal composition having a variety of characteristics can be provided by the addition of a component selected from the components B, C, D and E, these of which will be shown below, in addition to the component A.

Desirable components that will be added to the component A are the component B that is at least one compound selected from the group of compounds represented by formulas (2), (3) and (4), the component C that is at least one compound selected from the group of compounds represented by formulas (5), the component D that is at least one compound selected from the group of compounds represented by formulas (6), (7), (8), (9), (10) and (11), or the component E that is at least one compound selected from the group of compounds represented by formulas (12), (13) and (14). Each component can be suitably combined and added depending on the purpose of the composition.

In each component of the liquid crystal composition, there are no major differences in characteristics even if the component is an analogue composed of isotopes of each element.

Desirable examples of the component B are the compounds (2-1) to (2-16), the compounds (3-1) to (3-112) and the compounds (4-1) to (4-54).

(2-1)
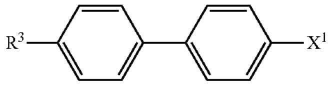

(2-2)
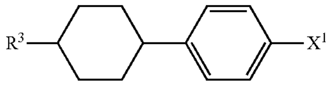

(2-3)
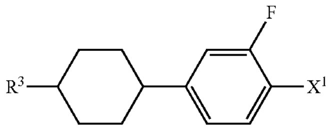

(2-4)
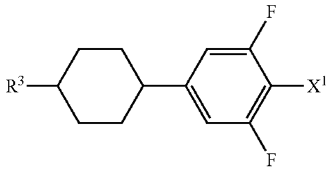

(2-5)
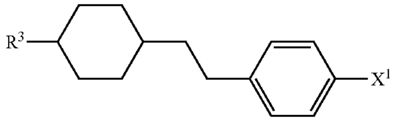

(2-6)
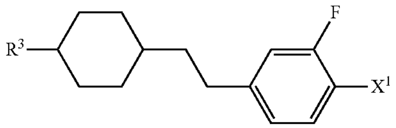

(2-7)
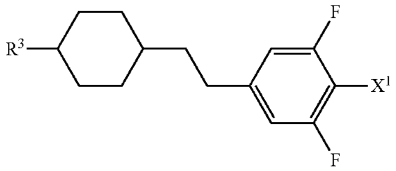

(2-8)
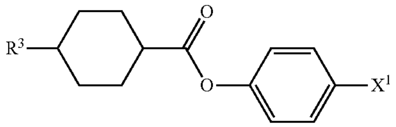

(2-9)
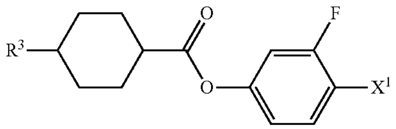

-continued (2-10)
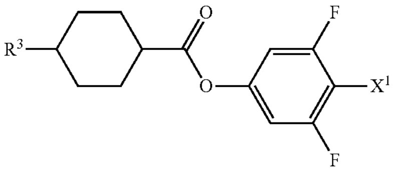

(2-11)
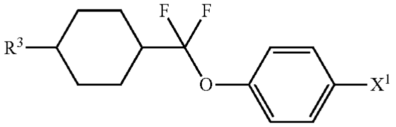

(2-12)
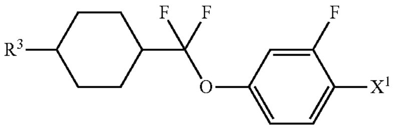

(2-13)
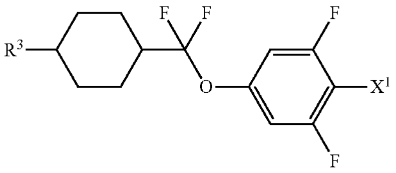

(2-14)
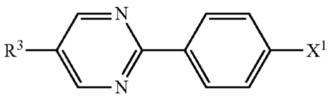

(2-15)
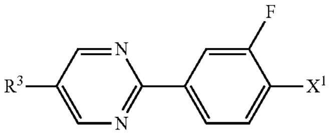

(2-16)
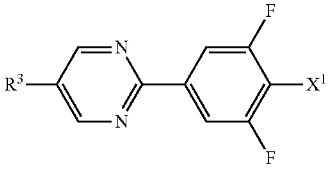

(3-1)
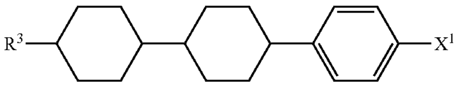

(3-2)
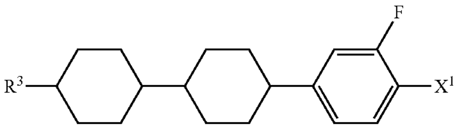

(3-3)
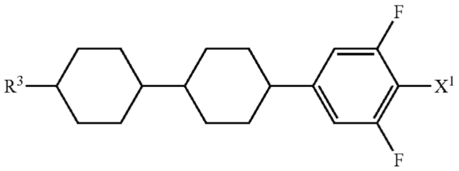

-continued
(3-4)
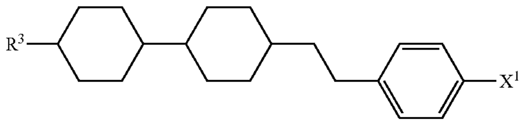
(3-5)
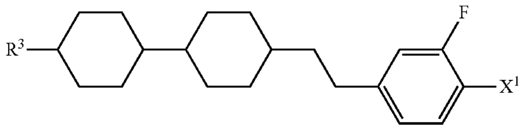
(3-6)
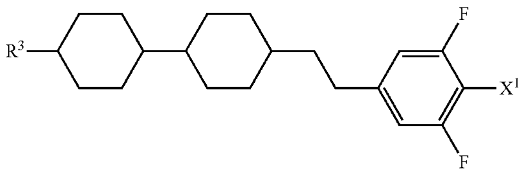
(3-7)
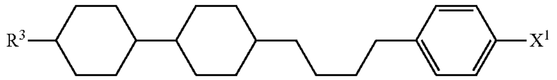
(3-8)
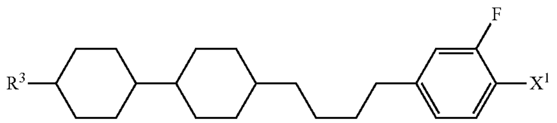
(3-9)
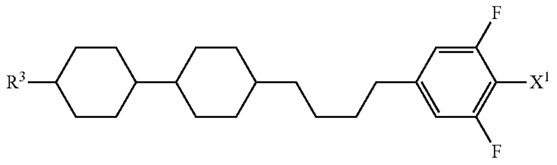
(3-10)
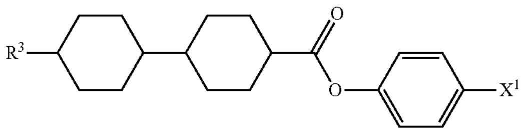
(3-11)
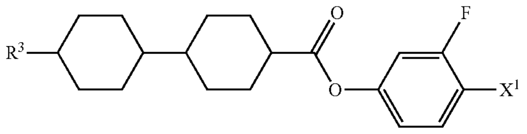
(3-12)
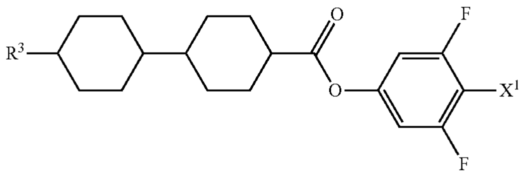
-continued
(3-13)
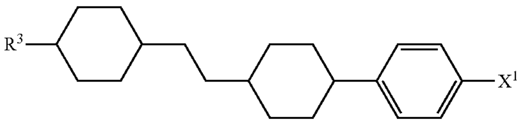
(3-14)
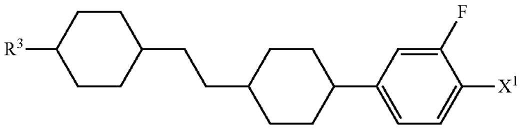
(3-15)
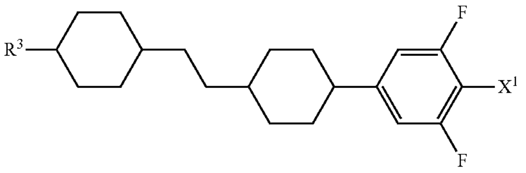
(3-16)
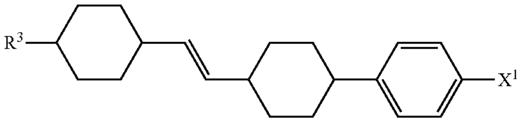
(3-17)
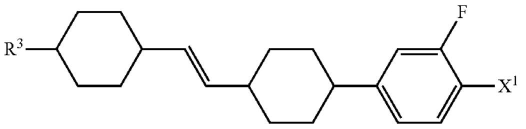
(3-18)
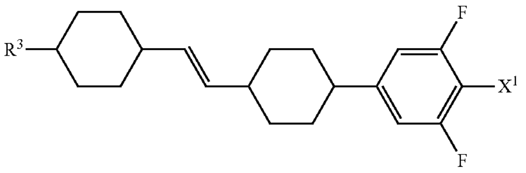
(3-19)
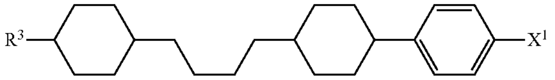
(3-20)
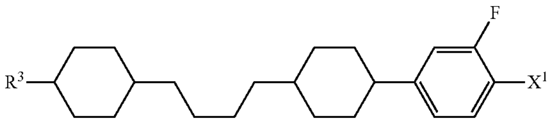
(3-21)
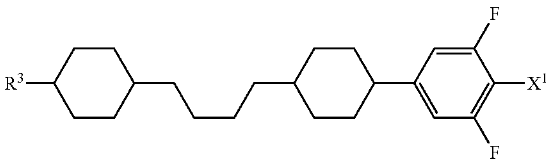
(3-22)
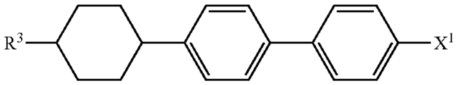

-continued
(3-23)
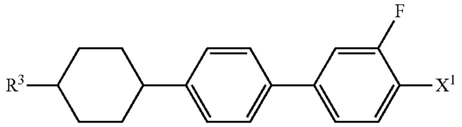
(3-24)
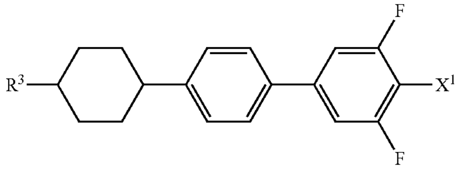
(3-25)
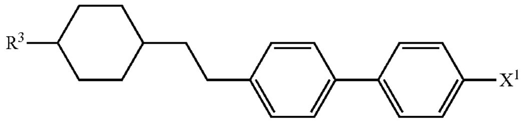
(3-26)
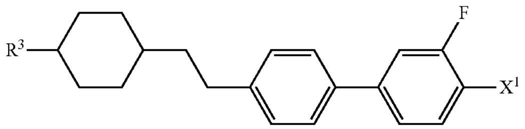
(3-27)
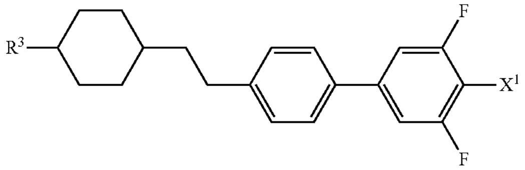
(3-28)
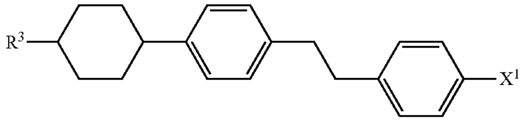
(3-29)
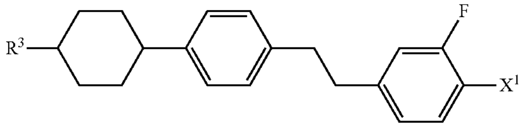
(3-30)
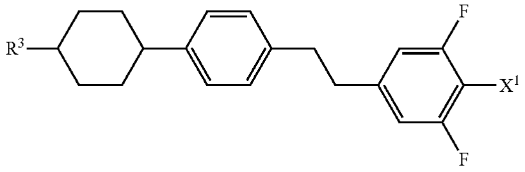
(3-31)
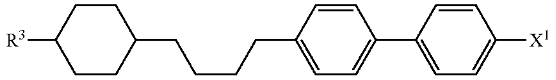
(3-32)
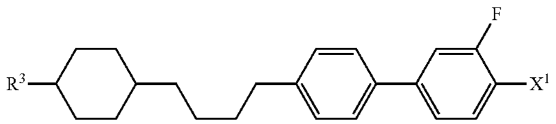
-continued
(3-33)
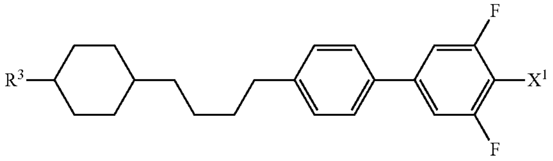
(3-34)
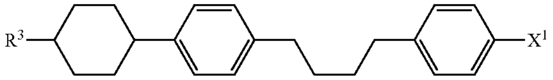
(3-35)
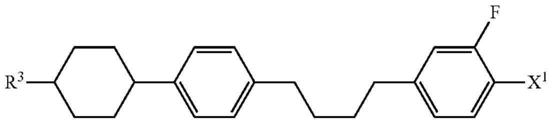
(3-36)
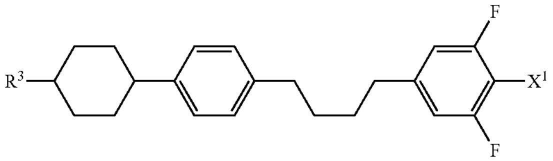
(3-37)
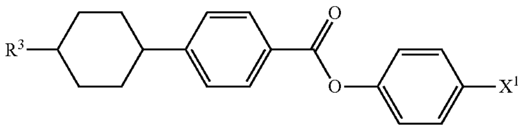
(3-38)
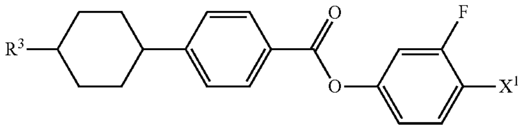
(3-39)
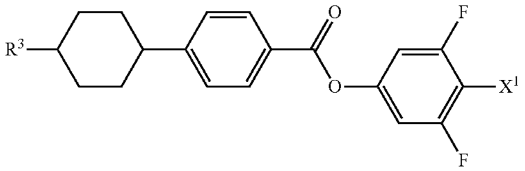
(3-40)
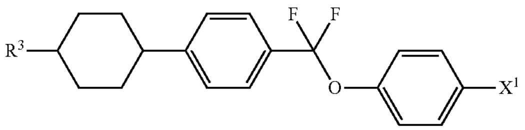
(3-41)
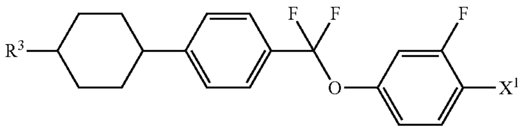

-continued
(3-42)
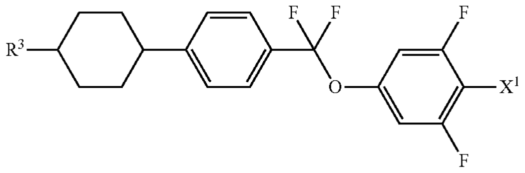
(3-43)
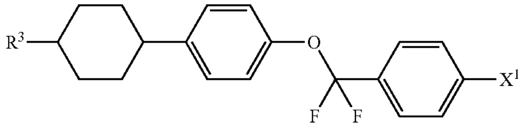
(3-44)
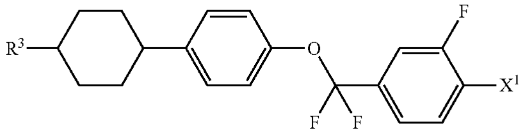
(3-45)
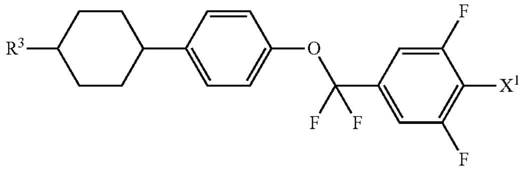
(3-46)
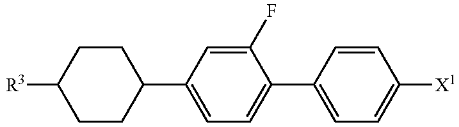
(3-47)
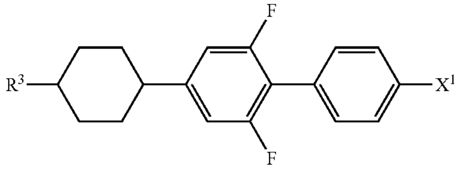
(3-48)
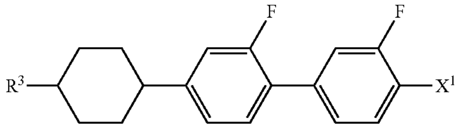
(3-49)
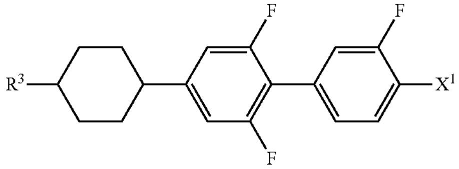
(3-50)
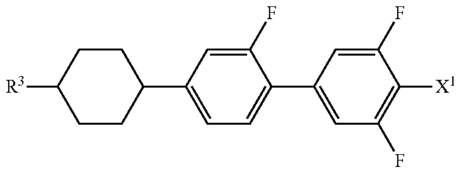
-continued
(3-51)
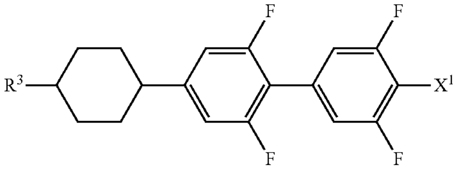
(3-52)
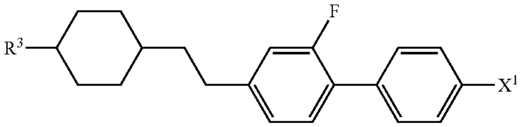
(3-53)
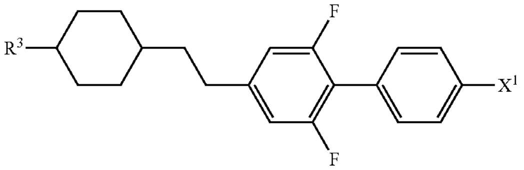
(3-54)
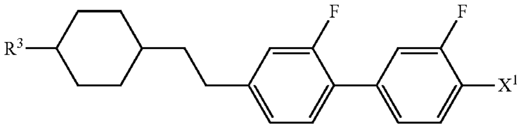
(3-55)
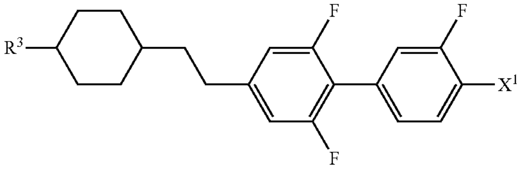
(3-56)
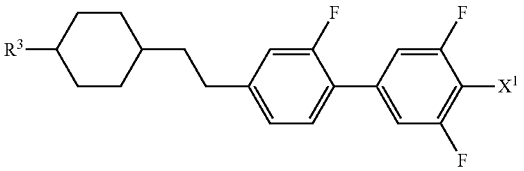
(3-57)
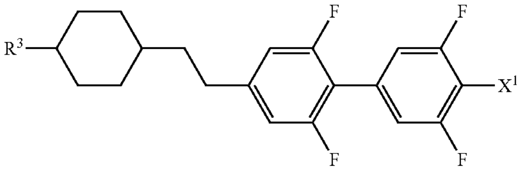
(3-58)
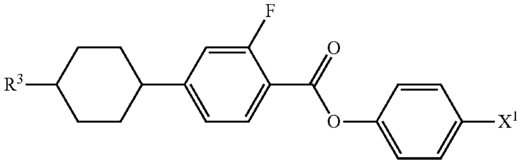

-continued
(3-59)
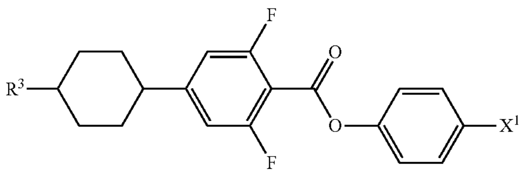
(3-60)
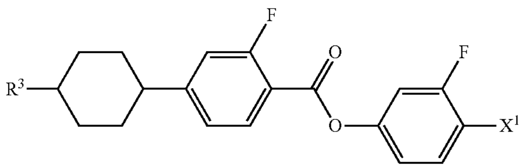
(3-61)
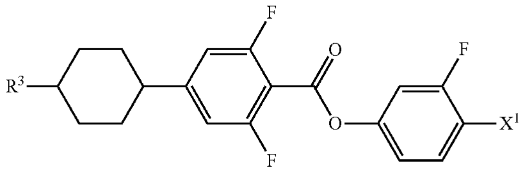
(3-62)
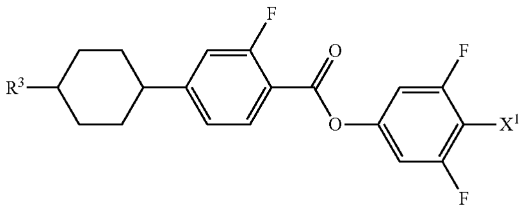
(3-63)
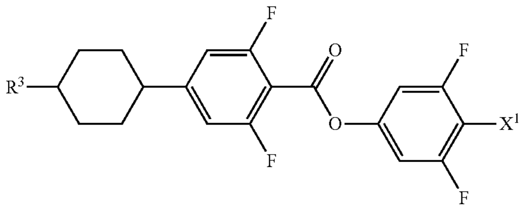
(3-64)
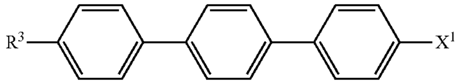
(3-65)
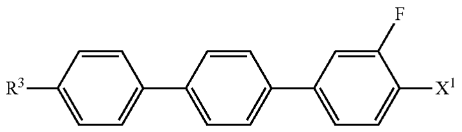
(3-66)
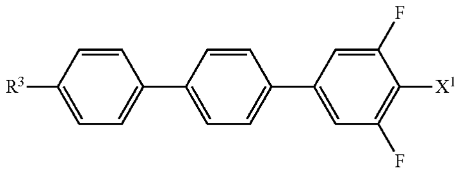
(3-67)
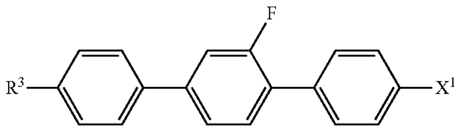
-continued
(3-68)
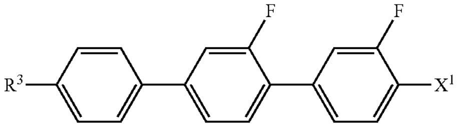
(3-69)
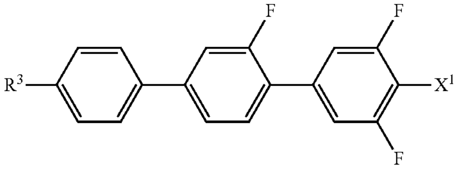
(3-70)
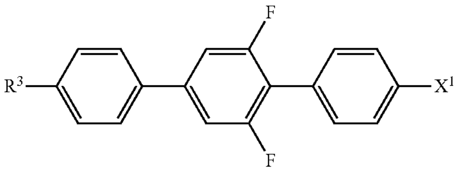
(3-71)
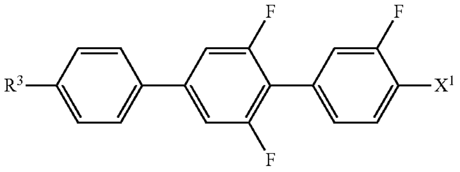
(3-72)
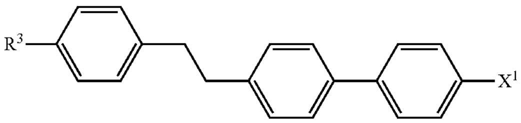
(3-73)
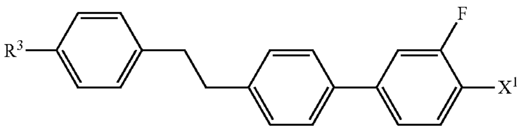
(3-74)
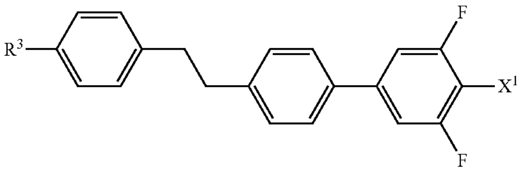
(3-75)
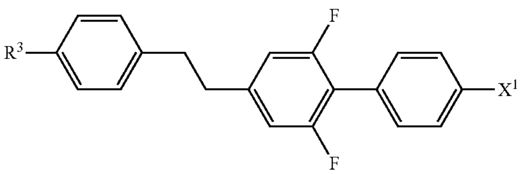
(3-76)
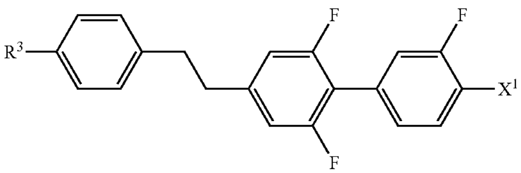

-continued
(3-77)
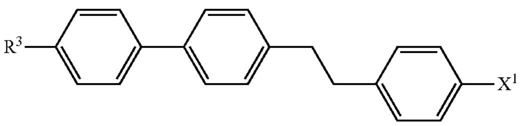
(3-78)
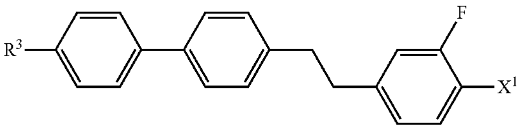
(3-79)
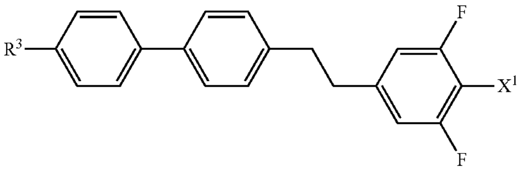
(3-80)
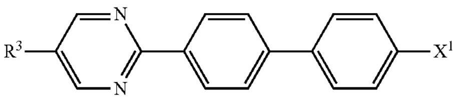
(3-81)
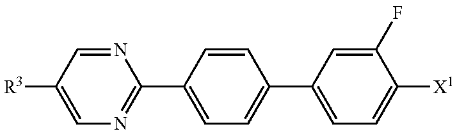
(3-82)
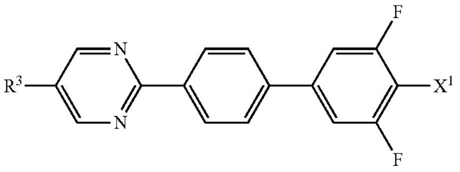
(3-83)
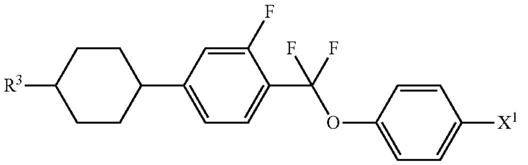
(3-84)
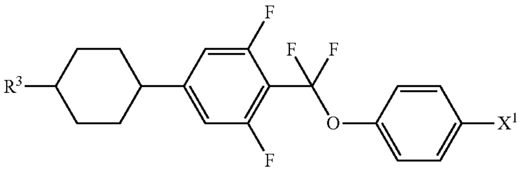
(3-85)
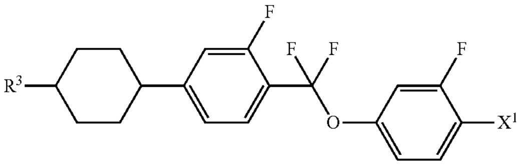
-continued
(3-86)
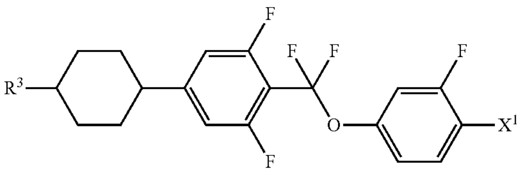
(3-87)
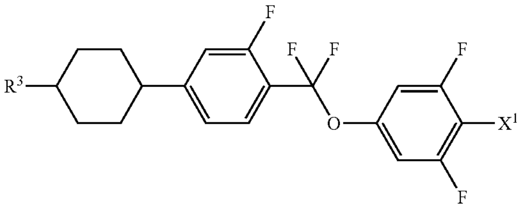
(3-88)
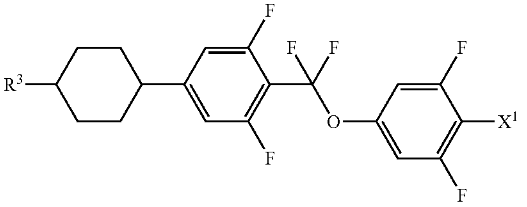
(3-89)
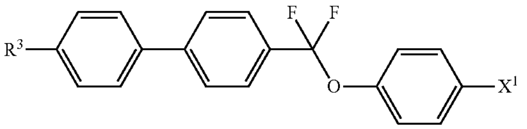
(3-90)
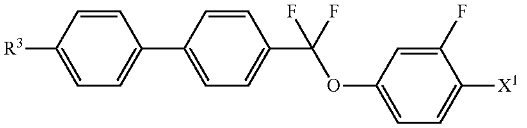
(3-91)
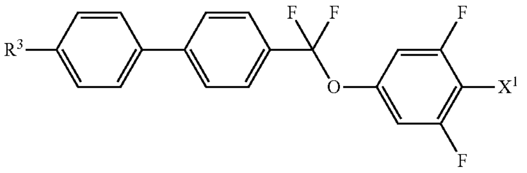
(3-92)
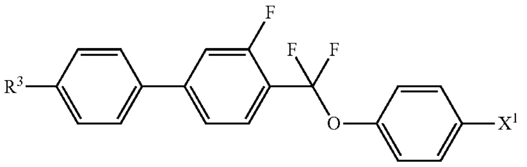
(3-93)
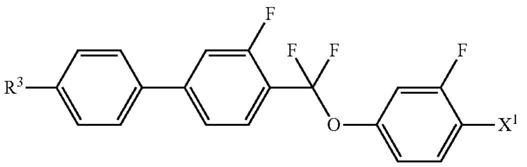

-continued
(3-94)
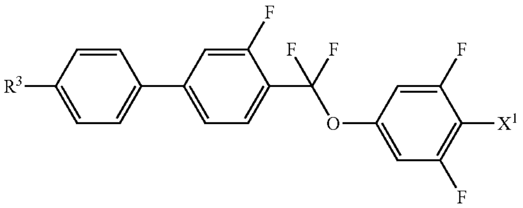
(3-95)
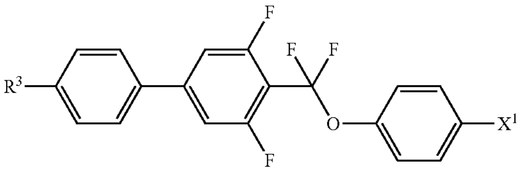
(3-96)
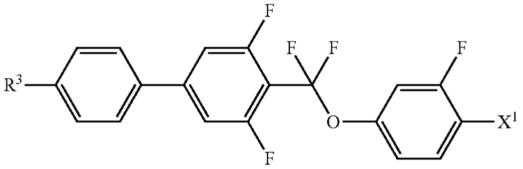
(3-97)
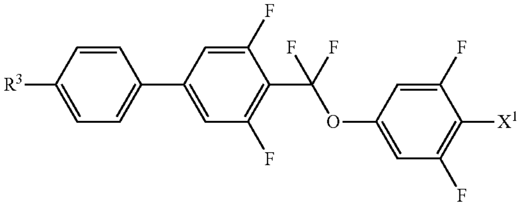
(3-98)
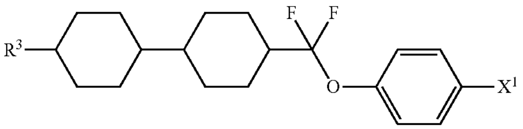
(3-99)
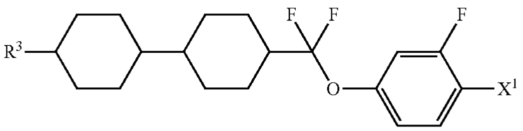
(3-100)
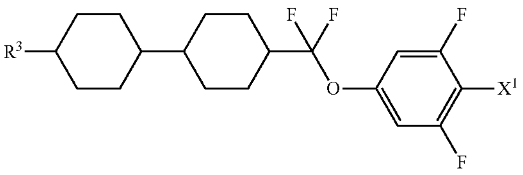
(3-101)
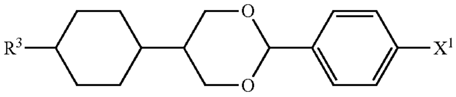
(3-102)
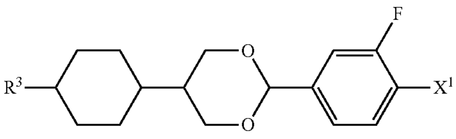
-continued
(3-103)
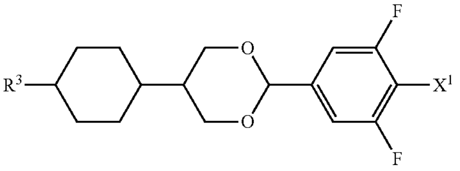
(3-104)
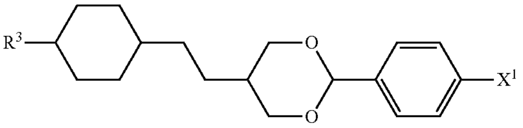
(3-105)
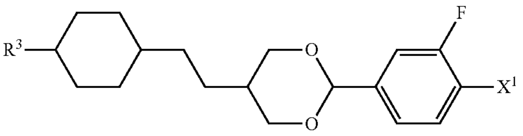
(3-106)
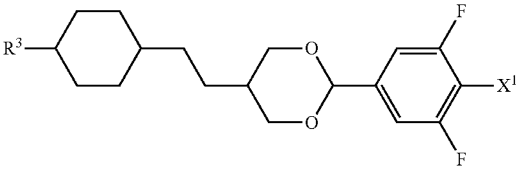
(3-107)
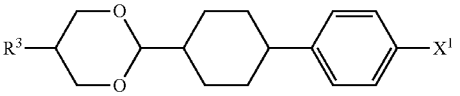
(3-108)
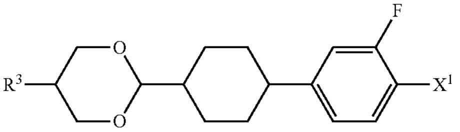
(3-109)
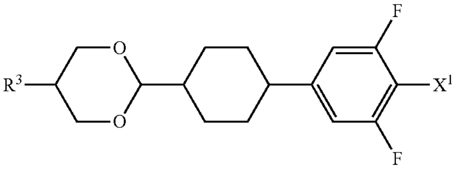
(3-110)
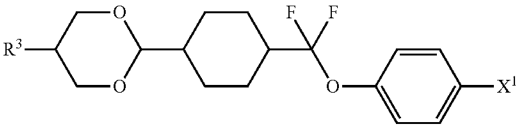
(3-111)
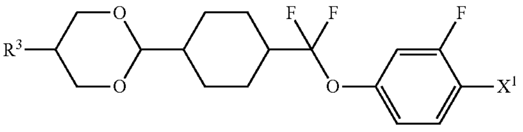

-continued
(3-112)
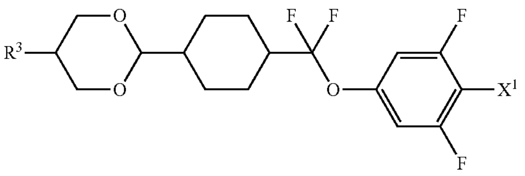
(4-1)
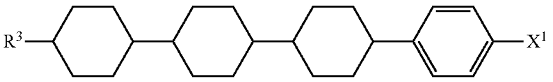
(4-2)
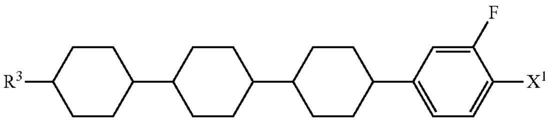
(4-3)
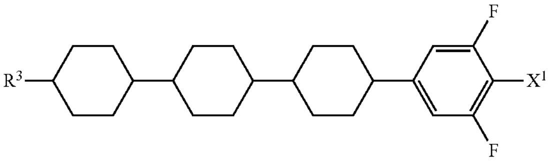
(4-4)
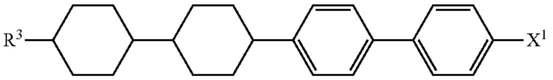
(4-5)
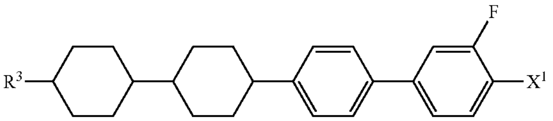
(4-6)
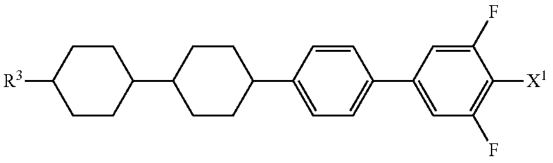
(4-7)
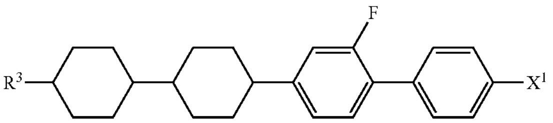
(4-8)
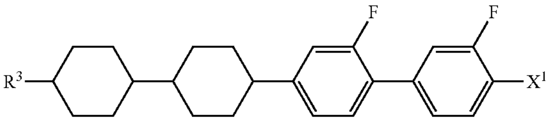
(4-9)
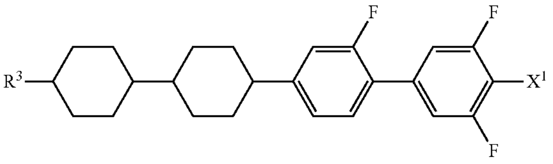
-continued
(4-10)
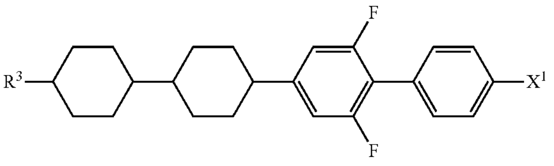
(4-11)
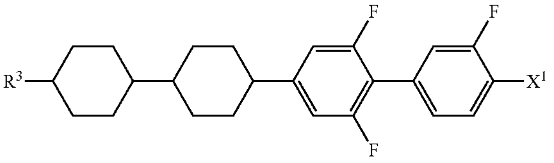
(4-12)
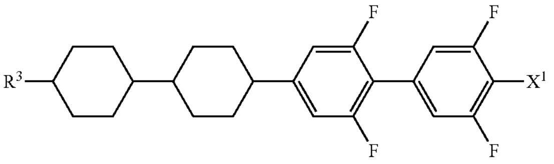
(4-13)
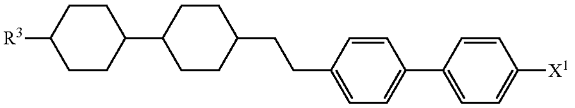
(4-14)
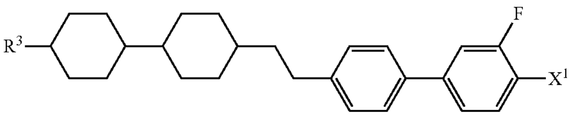
(4-15)
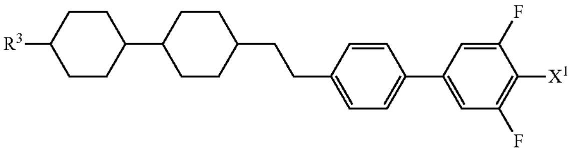
(4-16)
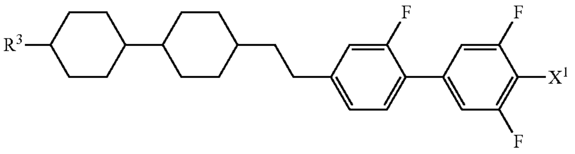
(4-17)
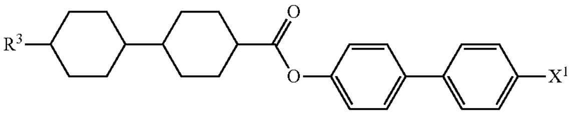
(4-18)
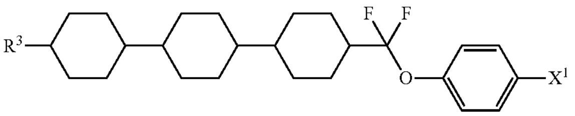

-continued
(4-19)
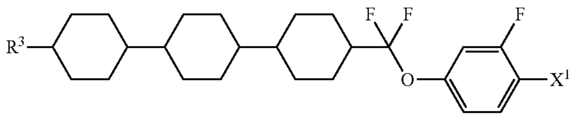
(4-20)
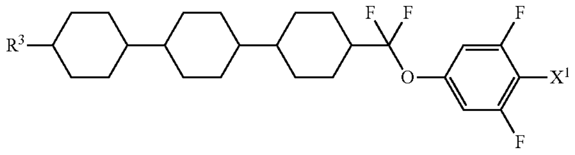
(4-21)
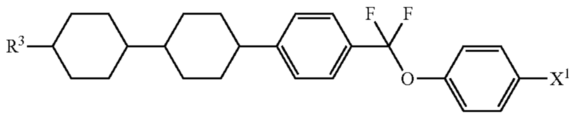
(4-22)
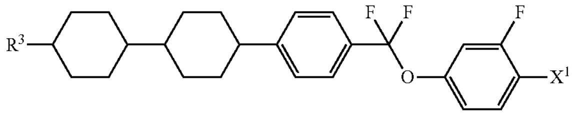
(4-23)
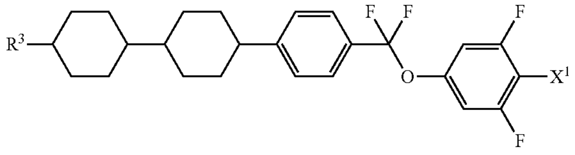
(4-24)
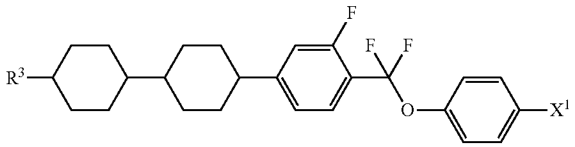
(4-25)
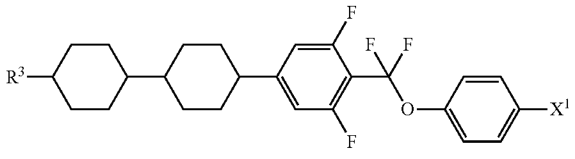
(4-26)
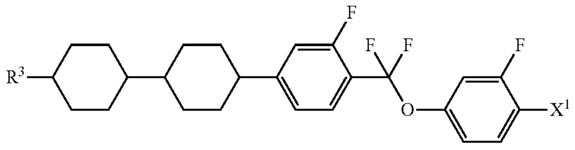
(4-27)
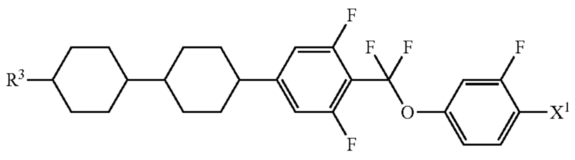
-continued
(4-28)
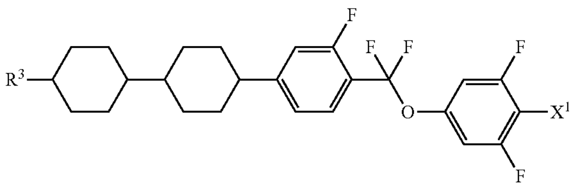
(4-29)
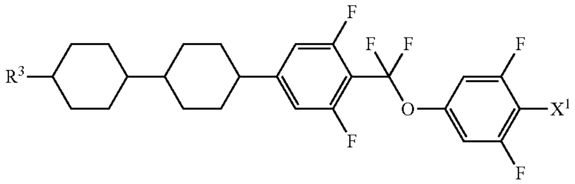
(4-30)
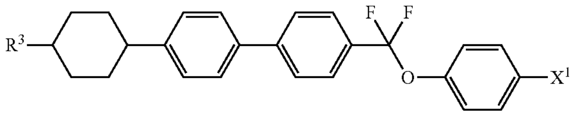
(4-31)
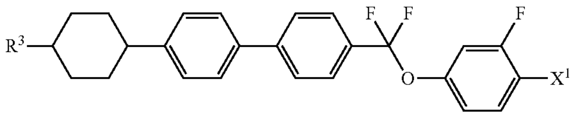
(4-32)
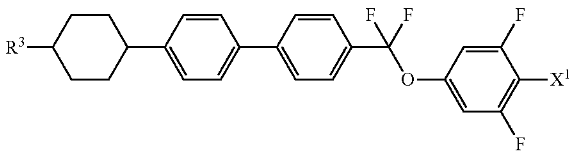
(4-33)
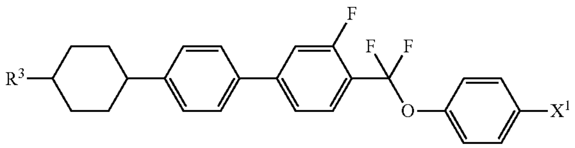
(4-34)
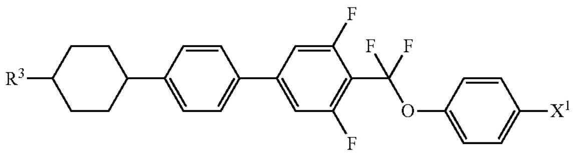
(4-35)
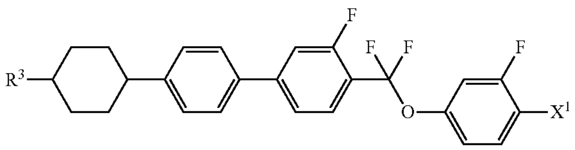
(4-36)
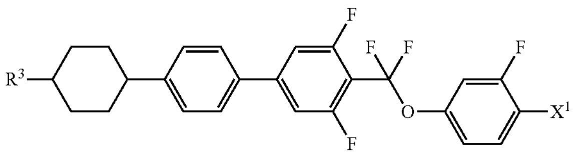

-continued
(4-37)
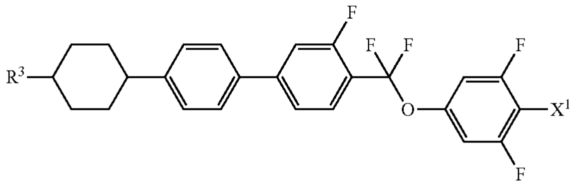
(4-38)
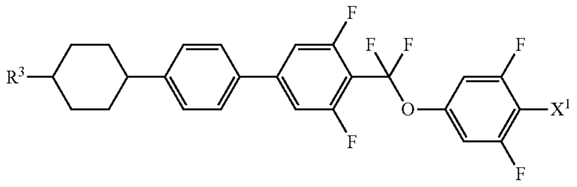
(4-39)
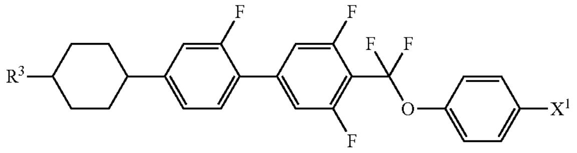
(4-40)
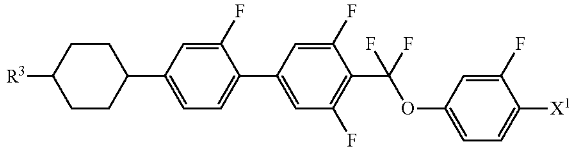
(4-41)
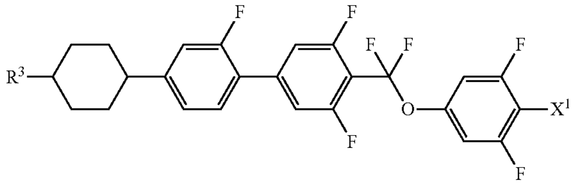
(4-42)
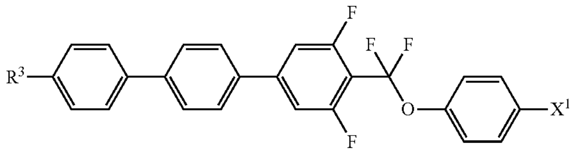
(4-43)
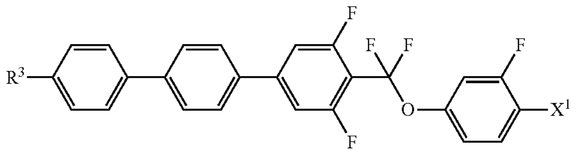
(4-44)
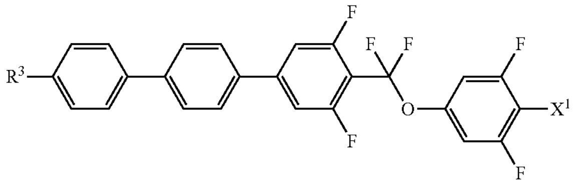
-continued
(4-45)
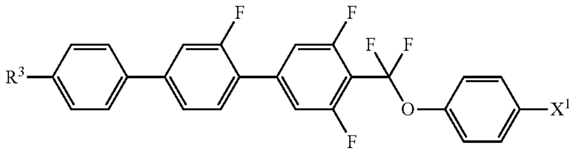
(4-46)
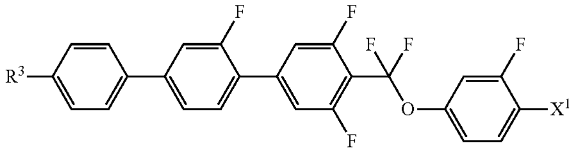
(4-47)
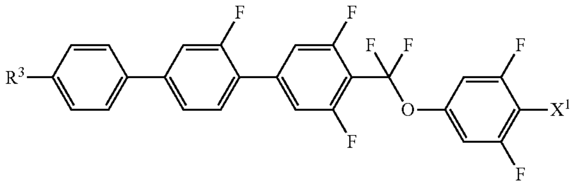
(4-48)
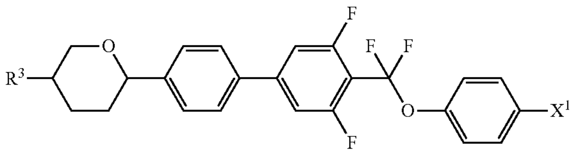
(4-49)
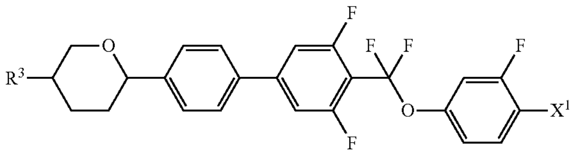
(4-50)
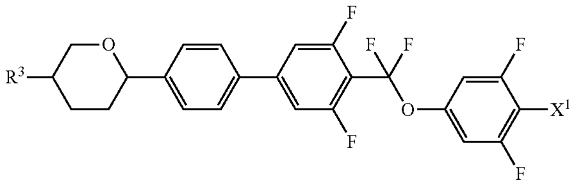
(4-51)
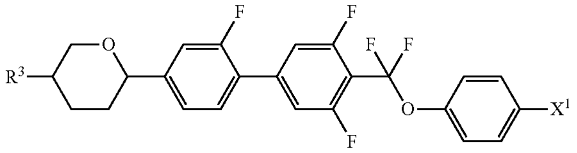
(4-52)
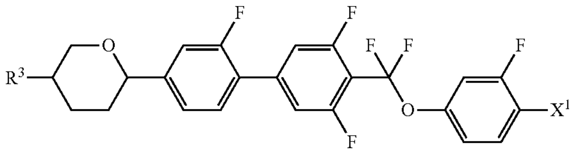

-continued (4-53)

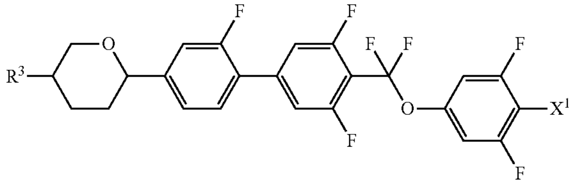

(4-54)

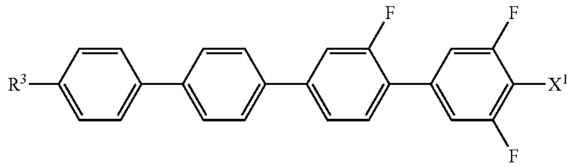

In the formulas, the definitions of $R^3$ and $X^1$ are just the same as described previously.

These compounds (2) to (4), that is the component B, are used in the preparation of the liquid crystal composition for use in TFT and PSA mode-device, since they have positive dielectric anisotropy and a quite excellent thermal or chemical stability. The content of the component B in the liquid crystal composition is suitably in the range of approximately 1% to approximately 99% by weight, preferably in the range of approximately 10% to approximately 97% by weight, and more preferably approximately 40% to approximately 95% by weight based on the total weight of the liquid crystal composition. The viscosity can be adjusted by a further addition of the compounds (12) to (14) (the component E).

Desirable examples of the component C are the compounds (5-1) to (5-64)

(5-1)

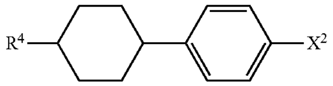

(5-2)

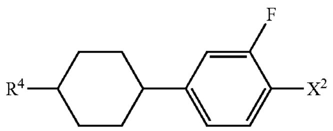

(5-3)

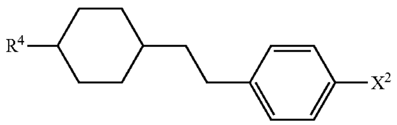

(5-4)

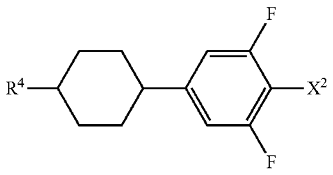

(5-5)

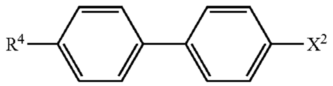

-continued (5-6)

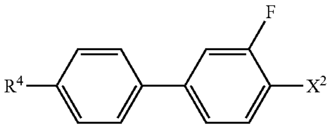

(5-7)

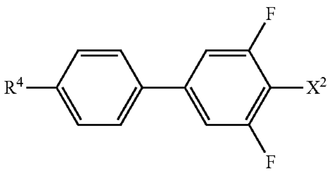

(5-8)

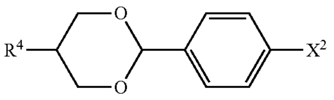

(5-9)

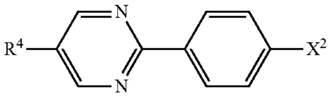

(5-10)

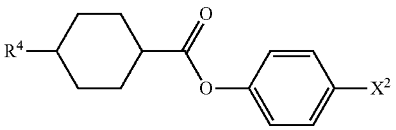

(5-11)

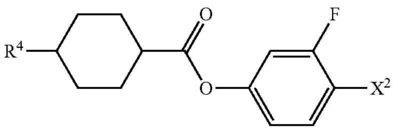

(5-12)

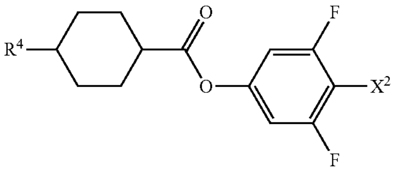

(5-13)

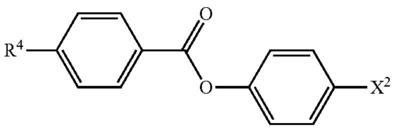

(5-14)

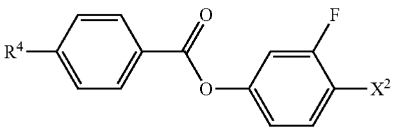

(5-15)

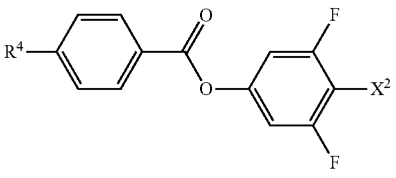

(5-16)

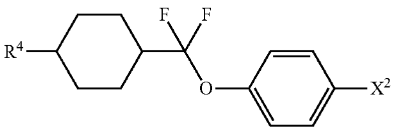

-continued
(5-17)
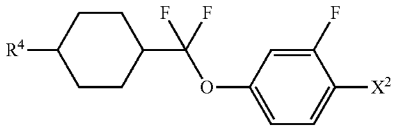
(5-18)
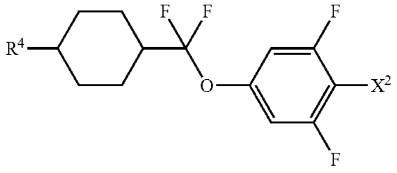
(5-19)
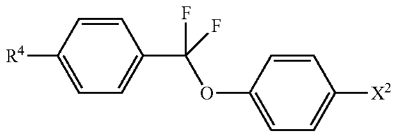
(5-20)
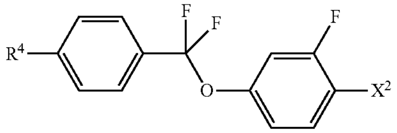
(5-21)
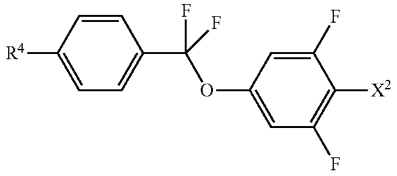
(5-22)
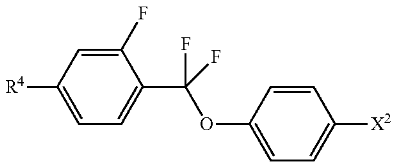
(5-23)
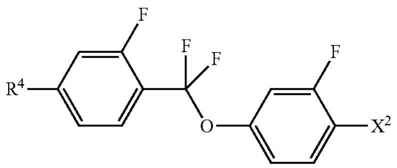
(5-24)
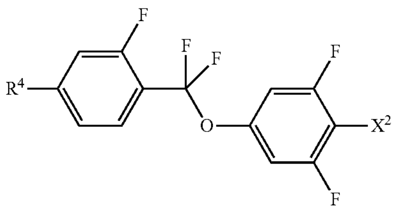
(5-25)
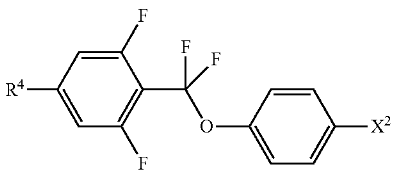
-continued
(5-26)
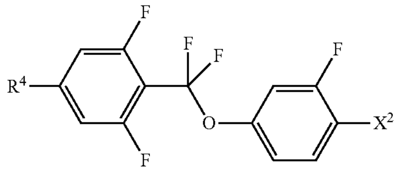
(5-27)
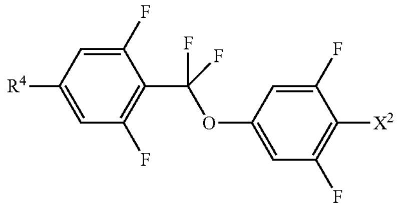
(5-28)
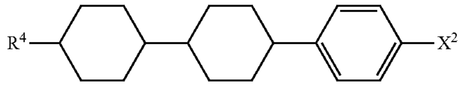
(5-29)
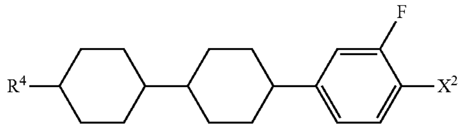
(5-30)
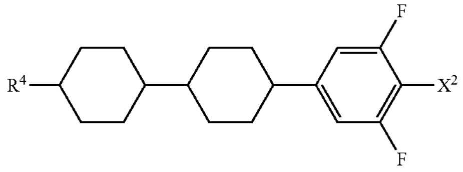
(5-31)
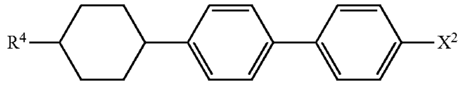
(5-32)
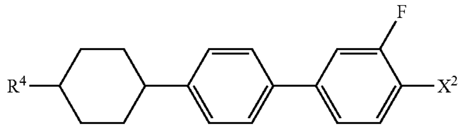
(5-33)
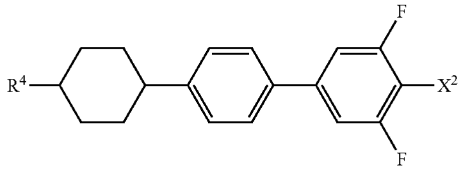
(5-34)
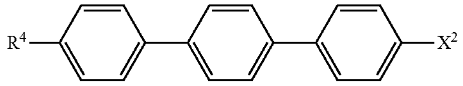
(5-35)
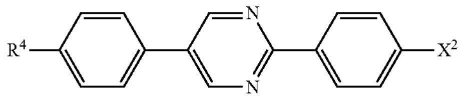
(5-36)
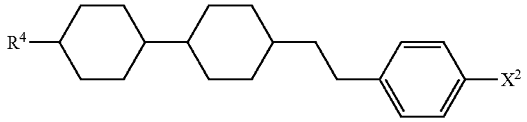

-continued
(5-37)
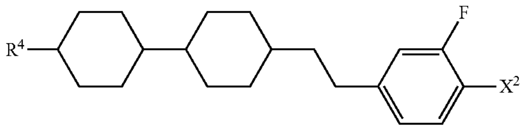
(5-38)
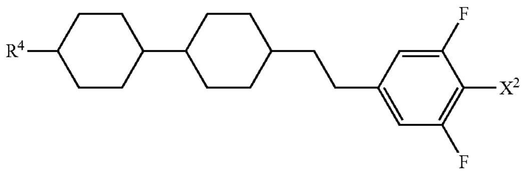
(5-39)
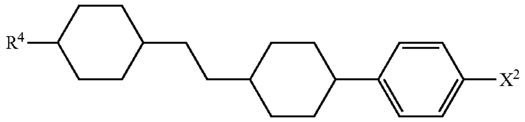
(5-40)
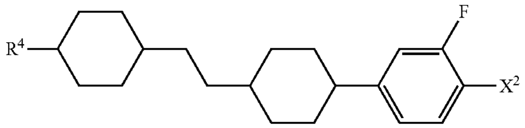
(5-41)
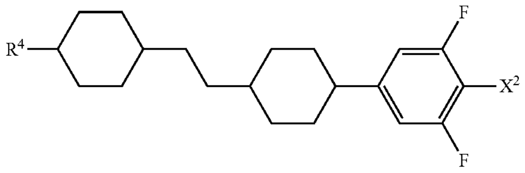
(5-42)
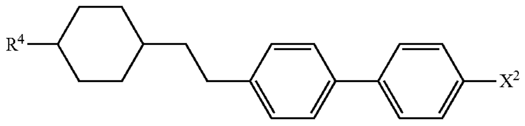
(5-43)
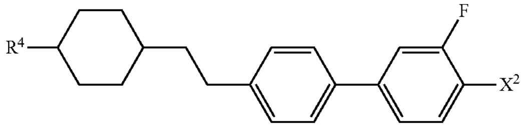
(5-44)
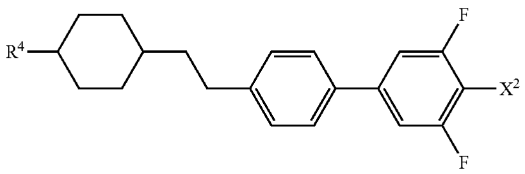
(5-45)
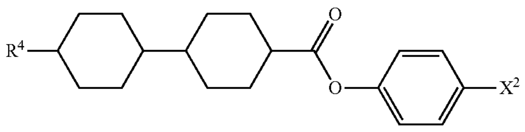
-continued
(5-46)
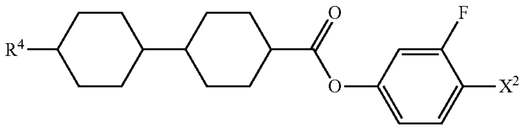
(5-47)
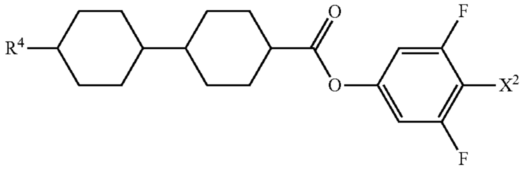
(5-48)
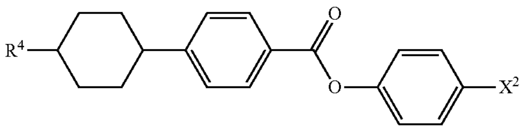
(5-49)
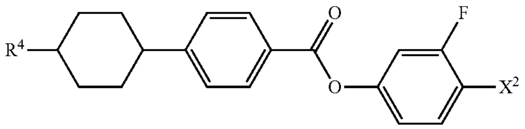
(5-50)
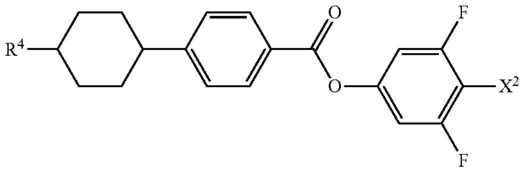
(5-51)
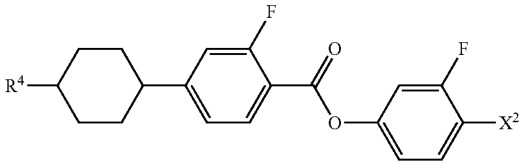
(5-52)
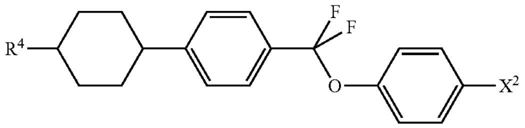
(5-53)
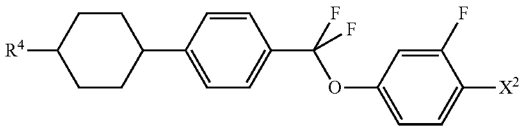
(5-54)
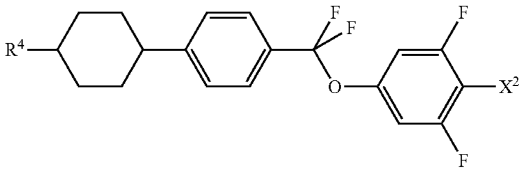

-continued (5-55)

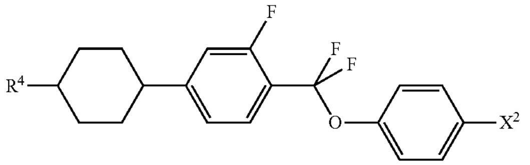

(5-56)

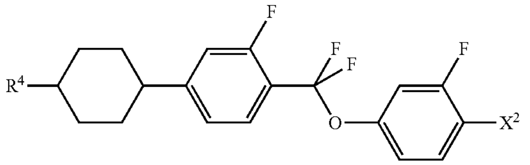

(5-57)

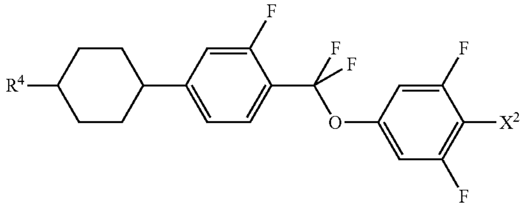

(5-58)

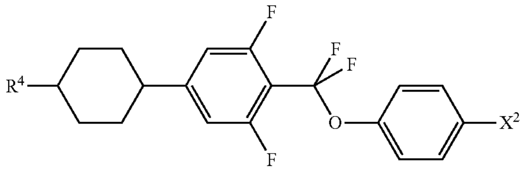

(5-59)

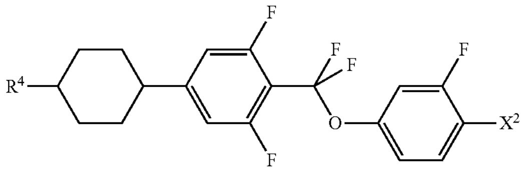

(5-60)

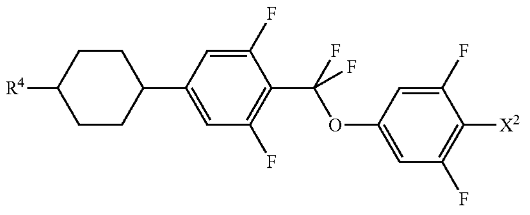

(5-61)

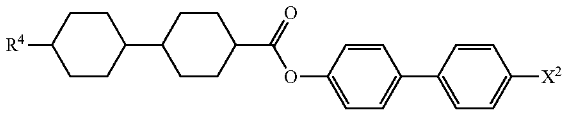

(5-62)

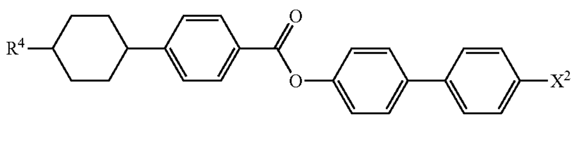

-continued (5-63)

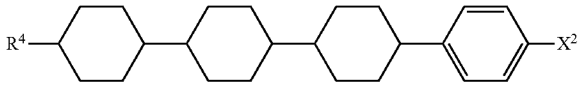

(5-64)

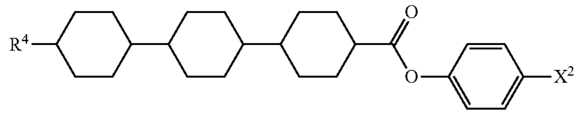

In the formulas, the definitions of $R^4$ and $X^2$ are just the same as described previously.

The compound (5), that is the component C, is mainly used in the preparation of the liquid crystal composition for use in STN, TN and PSA mode-devices, since the dielectric anisotropy is positive and the value is quite large. The threshold voltage of the composition can be decreased by the addition of the component C. The viscosity can be adjusted, the optical anisotropy can be adjusted, and the temperature range of a liquid crystal phase can be increased. Furthermore, the component C can be utilized for an improvement of the steepness.

The content of the component C is suitably in the range of approximately 0.1% to approximately 99.9% by weight, preferably in the range of approximately 10% to approximately 97% by weight, and more preferably in the range of approximately 40% to approximately 95% by weight in the preparation of the liquid crystal composition for use in a STN or TN mode-device. The threshold voltage, the temperature range of a liquid crystal phase, the optical anisotropy, the dielectric anisotropy, the viscosity and so forth can be adjusted by the addition of a component which will be described later.

The compound (6) to (11), that is the component D, is desirable in the preparation of the liquid crystal composition having negative dielectric anisotropy for use in a vertical alignment (VA) mode-device, a polymer sustained alignment (PSA) mode-device and so forth.

Suitable examples of the compounds (6) to (11) include the compounds (6-1) to (6-6), the compounds (7-1) to (7-15), the compounds (8-1), the compounds (9-1) to (9-3), the compounds (10-1) to (10-11) and the compounds (11-1) to (11-10).

(6-1)

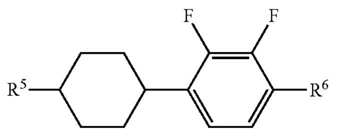

(6-2)

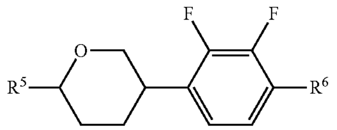

(6-3)

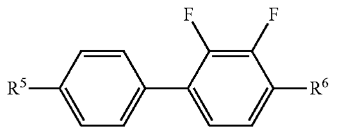

-continued
(6-4)
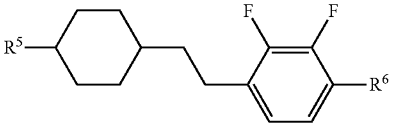
(6-5)
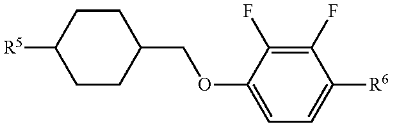
(6-6)
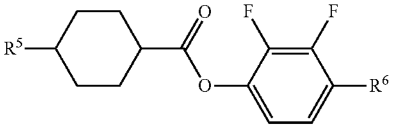
(7-1)
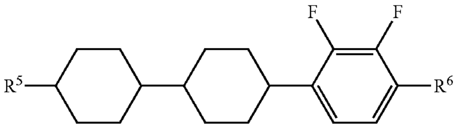
(7-2)
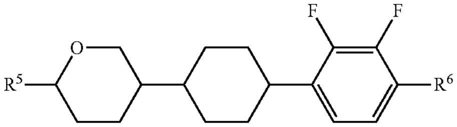
(7-3)
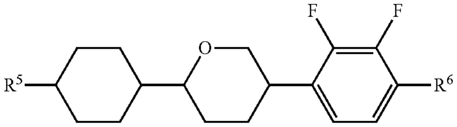
(7-4)
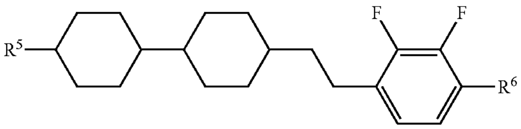
(7-5)
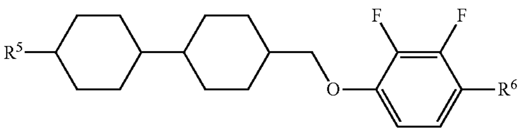
(7-6)
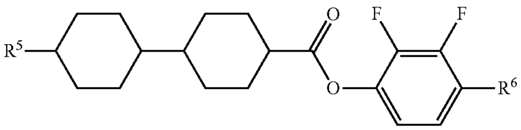
(7-7)
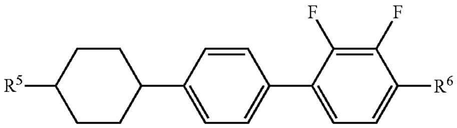
(7-8)
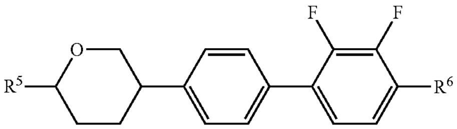
-continued
(7-9)
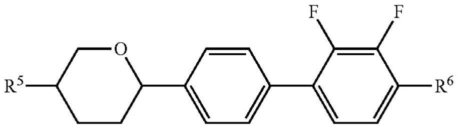
(7-10)
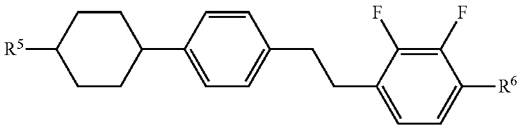
(7-11)
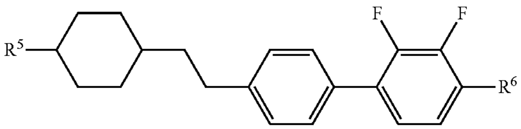
(7-12)
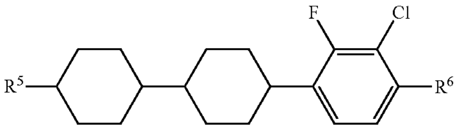
(7-13)
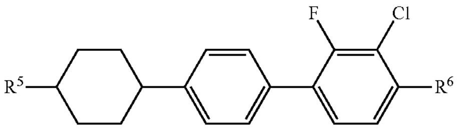
(7-14)
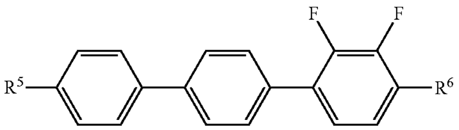
(7-15)
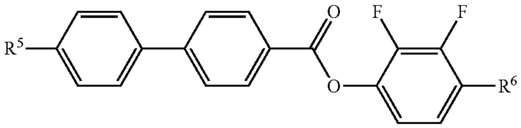
(8-1)
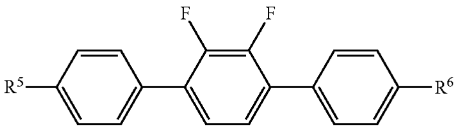
(9-1)
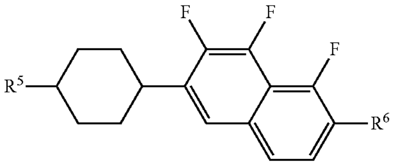
(9-2)
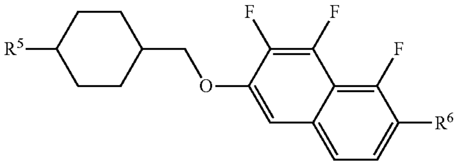

-continued
(9-3)
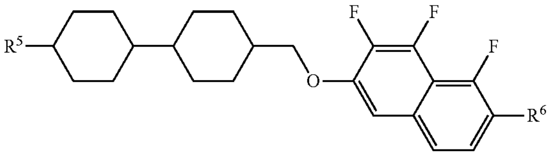
(10-1)
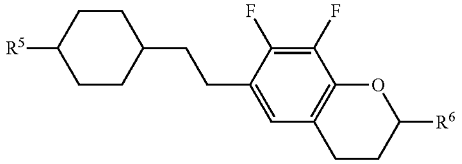
(10-2)
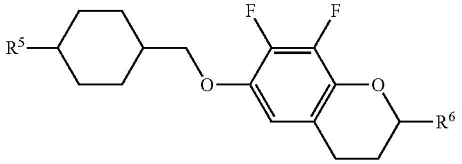
(10-3)
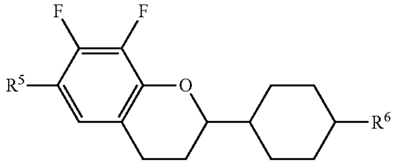
(10-4)
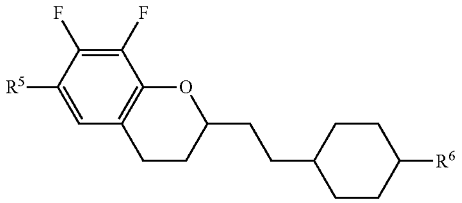
(10-5)
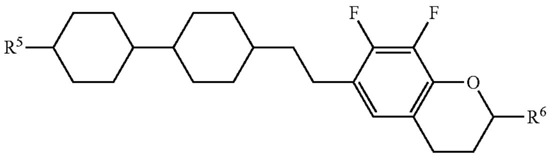
(10-6)
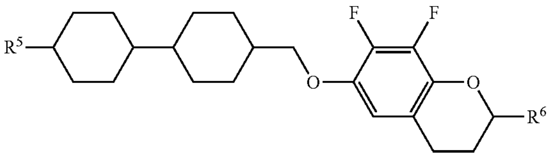
(10-7)
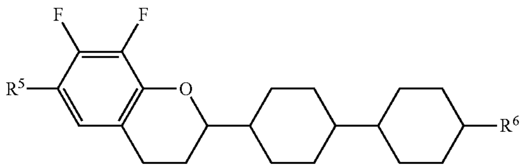
-continued
(10-8)
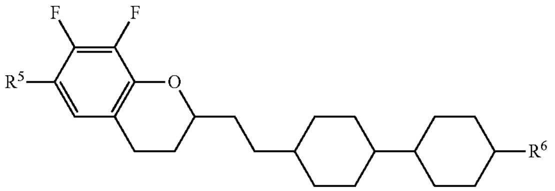
(10-9)
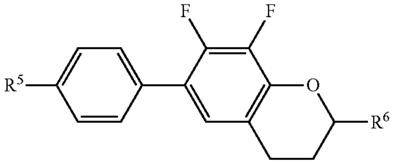
(10-10)
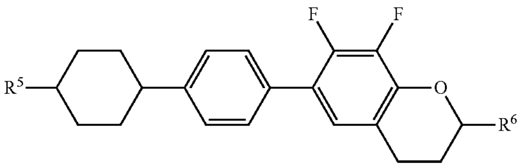
(10-11)
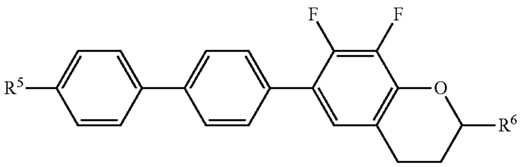
(11-1)
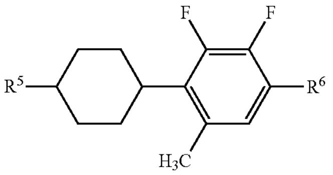
(11-2)
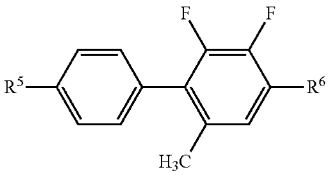
(11-3)
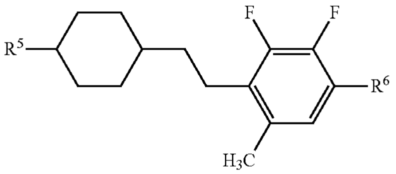
(11-4)
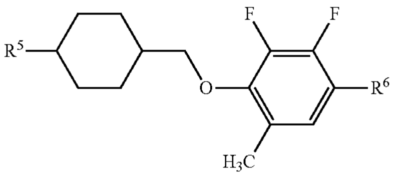

-continued (11-5)

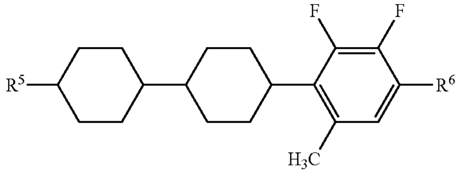

(11-6)

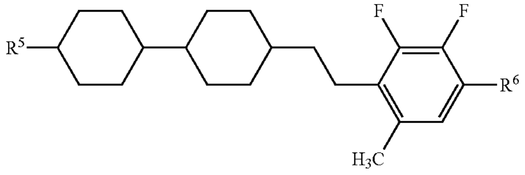

(11-7)

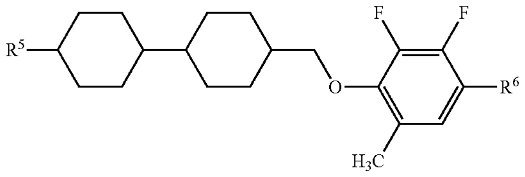

(11-8)

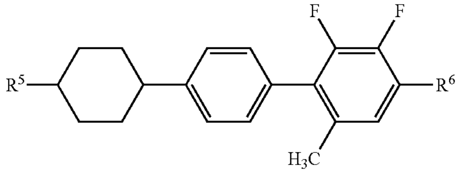

(11-9)

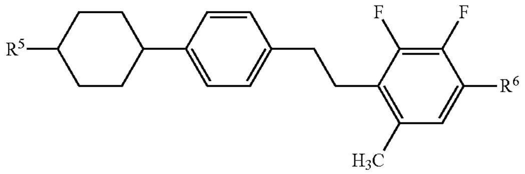

(11-10)

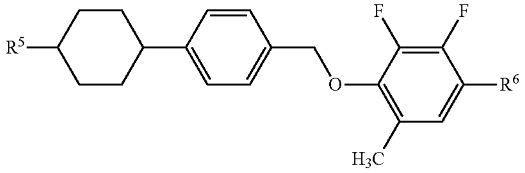

In the formulas, the definitions of $R^5$ and $R^6$ are just the same as described previously.

The compounds of the component D are mainly used in the liquid crystal composition having negative dielectric anisotropy for use in a VA mode-device and a PSA mode-device. As the content of the component D is increased, the threshold voltage of the composition decreases, however, the viscosity increases. Accordingly, it is desirable that the content of the component D decreases as long as the required value of the threshold is satisfied.

The compound (6) among the component D is effective mainly in adjusting the threshold voltage, adjusting the viscosity, and adjusting the optical anisotropy, since it is a two-ring compound. The compounds (7) and (8) are effective in increasing the clearing point, increasing the temperature range of a nematic phase, decreasing the threshold voltage or increasing the optical anisotropy for instance, since it is a three-ring compound. The compounds (9), (10) and (11) are effective in decreasing the threshold voltage for instance.

The content of the component D is preferably in the range of approximately 40% to approximately 99% by weight, and more preferably in the range of approximately 50% to approximately 95% by weight based on the total weight of the composition, in the preparation of the composition for use in a VA and PSA mode-device. The elastic constant can be adjusted and the voltage-transmission curve can be adjusted by the addition of the component D. It is desirable that the content of the component D is approximately 30% by weight or less based on the total weight of the composition when the component D is added to a composition having positive dielectric anisotropy.

Desirable examples of the compounds (12), (13) and (14) (the component E) include the compounds (12-1) to (12-11), the compounds (13-1) to (13-19) and the compounds (14-1) to (14-6).

(12-1)

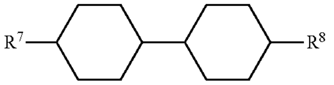

(12-2)

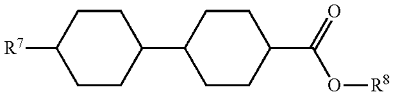

(12-3)

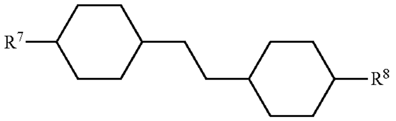

(12-4)

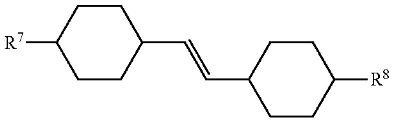

(12-5)

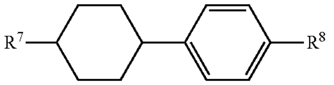

(12-6)

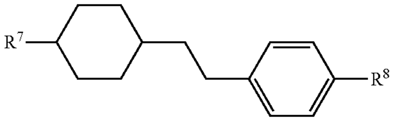

(12-7)

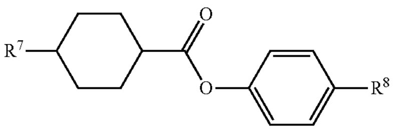

(12-8)

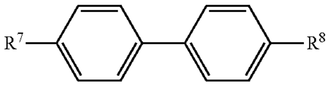

(12-9)

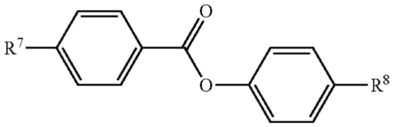

-continued
(12-10)
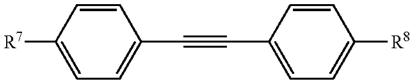
(12-11)
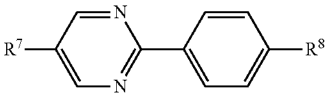
(13-1)
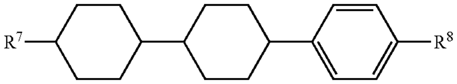
(13-2)
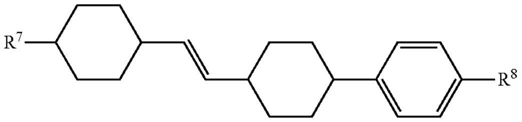
(13-3)
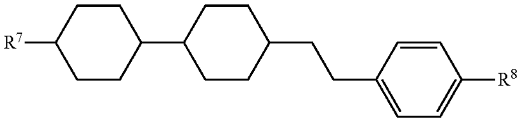
(13-4)
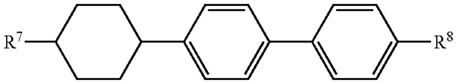
(13-5)
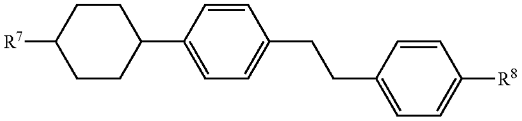
(13-6)
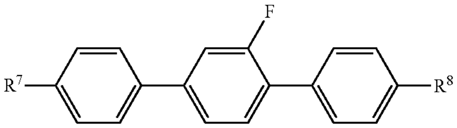
(13-7)
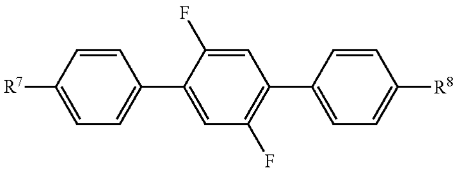
(13-8)
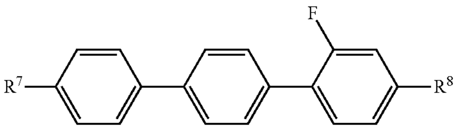
(13-9)
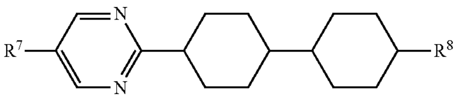
(13-10)
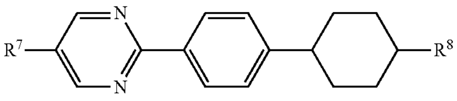
-continued
(13-11)
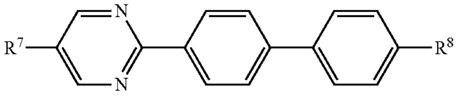
(13-12)
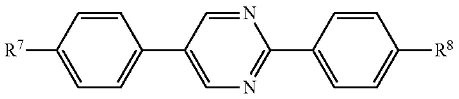
(13-13)
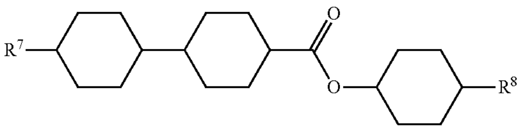
(13-14)
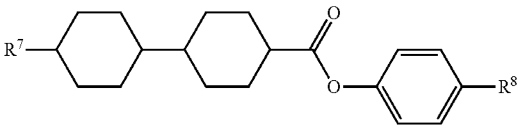
(13-15)
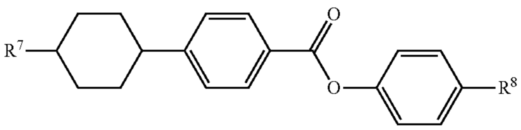
(13-16)
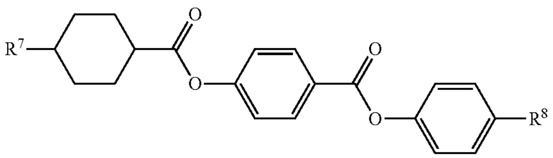
(13-17)
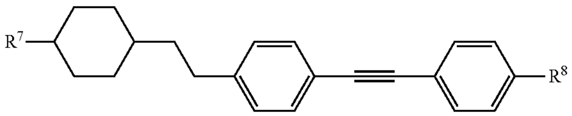
(13-18)
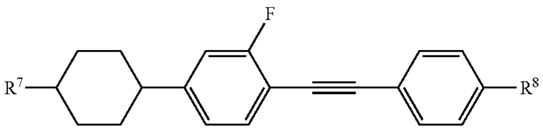
(13-19)
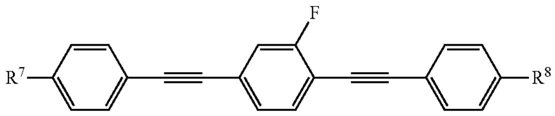
(14-1)
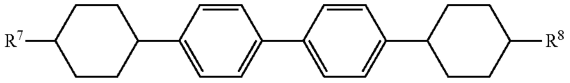
(14-2)
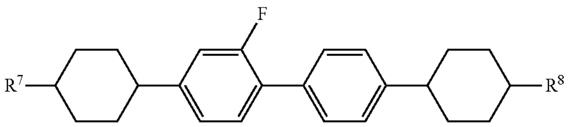

-continued (14-3)

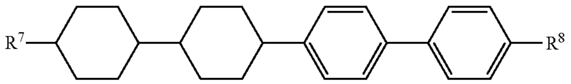

(14-4)

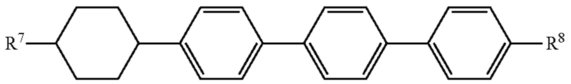

(14-5)

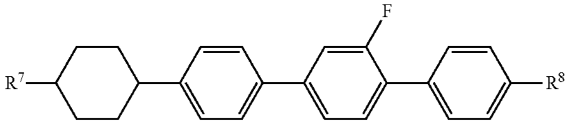

(14-6)

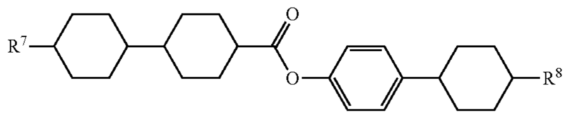

In the formulas, the definitions of $R^7$ and $R^8$ are just the same as described previously.

The compounds (12) to (14) (the component E) are close to neutral, since the absolute value of the dielectric anisotropy is small. The threshold voltage, the temperature range of a liquid crystal phase, the optical anisotropy, the dielectric anisotropy, the viscosity and so forth can be adjusted by the addition of the component E.

The compound (12) is effective mainly in adjusting the viscosity or adjusting the optical anisotropy, and the compounds (13) and (14) are effective in increasing the temperature range of a nematic phase that is caused by an increase in the clearing point for instance, or adjusting the optical anisotropy.

As the content of the component E is increased, the threshold voltage of the liquid crystal composition increases, however, the viscosity decreases. Accordingly, it is desirable that the content increases as long as the required value of the threshold voltage is satisfied. The content of the component E is preferably approximately 30% by weight or more, and more preferably approximately 50% by weight or more based on the total weight of the composition, in the preparation of the liquid crystal composition for use in a TFT or PSA mode-device. The content of the component E is preferably approximately 30% by weight or more, and more preferably approximately 40% by weight or more based on the total weight of the composition, in the preparation of the liquid crystal composition for use in a TN, STN or PSA mode-device.

It is desirable that the liquid crystal composition includes at least one of the compound (1) in the range of approximately 0.1% to approximately 99% by weight for exhibiting excellent characteristics.

The liquid crystal composition is generally prepared according to known methods such as the mutual dissolution of necessary components at a high temperature. An additive that is well-known to a person skilled in the art may be added to the composition depending on its intended use. For example, a liquid crystal composition including an optically active compound, or including a polymerizable compound and a polymerization initiator, those of which will be described below, or a liquid crystal composition for use in a GH mode-device, to which a dye is added, can be prepared. The additive is generally well known to a person skilled in the art, and is described in the literature and so forth in detail.

The liquid crystal composition may further include at least one optically active compound. A known chiral dopant is added as an optically active compound. The chiral dopant is effective in inducing a helical structure in liquid crystals, adjusting a necessary twist angle and thus preventing a reverse twist. Examples of the chiral dopant include the following optically active compounds (Op-1) to (Op-13).

(Op-1)

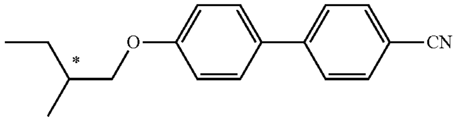

(Op-2)

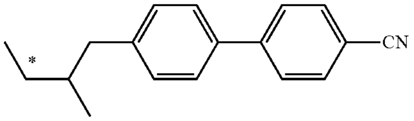

(Op-3)

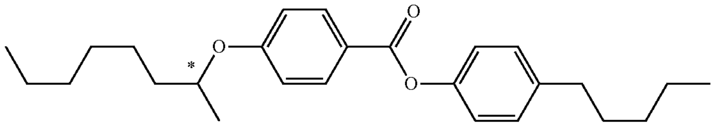

(Op-4)

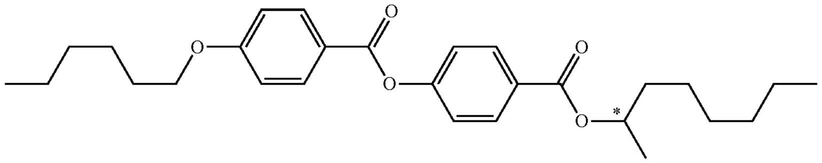

(Op-5)

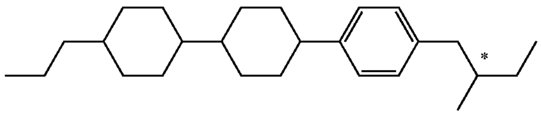

(Op-6)

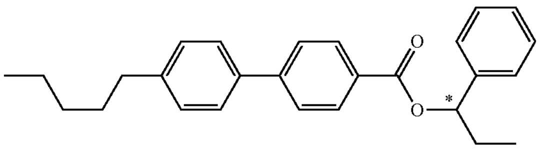

-continued (Op-7)

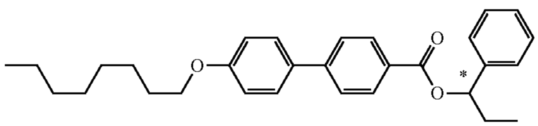

(Op-8)

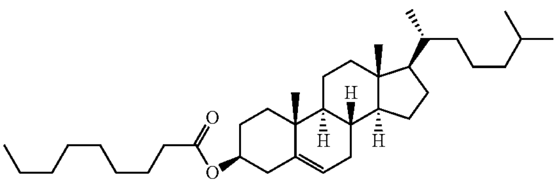

(Op-9)

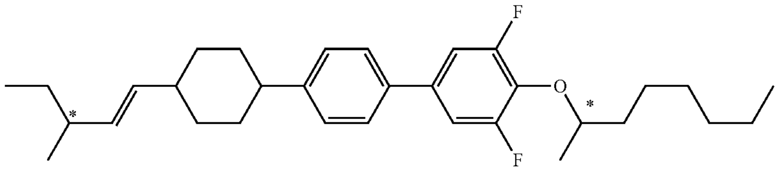

(Op-10)

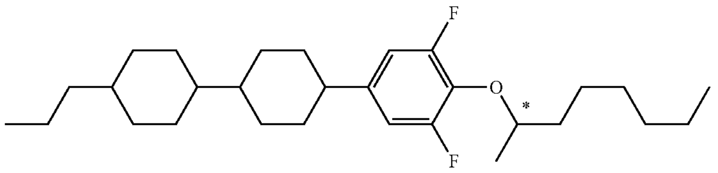

(Op-11)

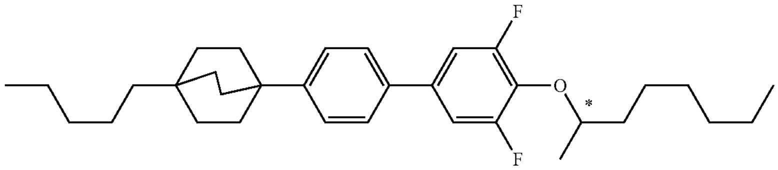

(Op-12)

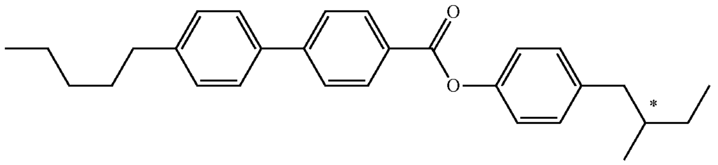

(Op-13)

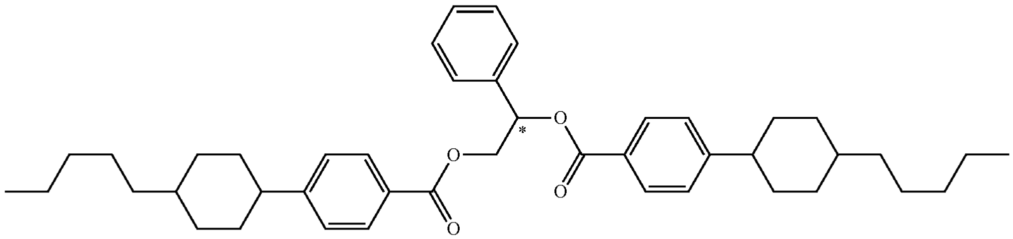

A helical pitch is usually adjusted by the addition of this optically active compound to the liquid crystal composition. It is desirable to adjust the helical pitch to the range of approximately micrometers to approximately 200 micrometers in a liquid crystal composition for use in TFT and TN mode-devices. It is desirable to adjust the helical pitch to the range of approximately 6 micrometers to approximately 20 micrometers in a liquid crystal composition for use in a STN mode-device. It is desirable to adjust the helical pitch to the range of approximately 1.5 micrometers to approximately 4 micrometers in a liquid crystal composition for use in a bistable twisted nematic (BTN) mode-device. Two or more optically active compounds may be added for the purpose of adjusting the temperature dependence of the helical pitch.

The liquid crystal composition can be used for a GH mode-device by the addition of a dichroic dye such as a merocyanine, stylyl, azo, azomethine, azoxy, quinophthalone, anthraquinone or tetrazine compound.

The liquid crystal composition can be used for a NCAP-device prepared by micro-encapsulating nematic liquid crystals, and for a polymer-distributed liquid crystal display device (PDLCD) prepared by forming a three-dimensional network polymer in liquid crystals, such as a polymer network liquid crystal display device (PNLCD), and also for an electrically controlled birefringence (ECB) mode-device or a DS mode-device.

It is possible to prevent the deterioration of a liquid crystal composition or a liquid crystal display device including the liquid crystal composition for instance, when an ultraviolet light absorber or an antioxidant is added to the liquid crystal composition of the invention. For example, the antioxidant can suppress a decrease in the specific resistance when the liquid crystal composition is heated.

The ultraviolet light absorber includes a benzophenone-ultraviolet light absorber, a benzoate-ultraviolet light absorber and a triazole-ultraviolet light absorber.

A specific example of the benzophenone-ultraviolet light absorber is 2-hydroxy-4-n-octoxybenzophenone. A specific example of the benzoate-ultraviolet light absorber is 2,4-di-t-butylphenyl-3,5-di-t-butyl-4-hydroxybenzoate. Specific examples of the triazole-ultraviolet light absorber are 2-(2-hydroxy-5-methylphenyl)benzotriazole, 2-[2-hydroxy-3-(3,4,5,6-tetrahydroxyphthalimide-methyl)-5-methylphenyl] benzotriazole and 2-(3-t-butyl-2-hydroxy-5-methylphenyl)-5-chlorobenzotriazole.

The antioxidant includes a phenol-antioxidant and an organosulfur antioxidant. In particular, an antioxidant of the compound (15) is desirable in view of a high antioxidant effect without changing the values of characteristics of the liquid crystal composition.

(15)

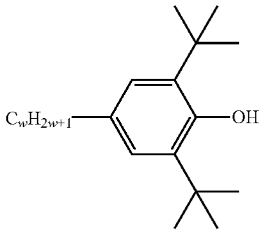

In formula (15), w is an integer of 1 to 15.

In the compound (15), desirable w is 1, 3, 5, 7 or 9. More desirable w is 1 or 7. The compound (15) where w is 1 is effective in preventing a decrease in specific resistance that is caused by heating under air, because it has a large volatility. The compound (15) where w is 7 is effective in maintaining a large voltage holding ratio at room temperature and also at a temperature close to the maximum temperature of a nematic phase even after the device has been used for a long time, because it has a small volatility.

Specific examples of the phenol antioxidant are 2,6-di-t-butyl-4-methylphenol, 2,6-di-t-butyl-4-ethylphenol, 2,6-di-t-butyl-4-propylphenol, 2,6-di-t-butyl-4-butylphenol, 2,6-di-t-butyl-4-pentylphenol, 2,6-di-t-butyl-4-hexylphenol, 2,6-di-t-butyl-4-heptylphenol, 2,6-di-t-butyl-4-octylphenol, 2,6-di-t-butyl-4-nonylphenol, 2,6-di-t-butyl-4-decylphenol, 2,6-di-t-butyl-4-undecylphenol, 2,6-di-t-butyl-4-dodecylphenol, 2,6-di-t-butyl-4-tridecylphenol, 2,6-di-t-butyl-4-tetradecylphenol, 2,6-di-t-butyl-4-pentadecylphenol, 2,2'-methylenebis(6-t-butyl-4-methylphenol), 4,4'-butylidenebis(6-t-butyl-3-methylphenol), 2,6-di-t-butyl-4-(2-octadecyloxycarbonyl)ethylphenol and pentaerythritoltetrakis[3-(3,5-di-t-butyl-4-hydroxyphenyl) propionate].

Specific examples of the organosulfur antioxidant are dilauryl-3,3'-thiopropionate, dimyristyl-3,3'-thiopropionate, distearyl-3,3'-thiopropionate, pentaerythritoltetrakis(3-laurylthiopropionate) and 2-mercaptobenzimidazole.

The amount of the additive represented by the ultraviolet light absorber, the antioxidant and so forth is in the range that the advantage of the invention is not failed and the purpose to add the additive is attained.

When the ultraviolet light absorber or the antioxidant is added, for example, the ratio is usually in the range of approximately 10 ppm to approximately 500 ppm, preferably in the range of approximately 30 ppm to approximately 300 ppm, and more preferably in the range of approximately 40 ppm to approximately 200 ppm based on the total weight of the liquid crystal composition of the invention.

Incidentally, the liquid crystal composition of the invention may include an impurity such as starting materials, side products, solvents used for the reactions or catalysts for the syntheses, which are contaminations in the step for synthesizing each compound that will be included in the liquid crystal composition, and in the step for preparing the liquid crystal composition, for instance.

A polymerizable compound is mixed with the composition for adjusting to a device having a PSA (polymer sustained alignment) mode. Desirable examples of the polymerizable compound include compounds having a polymerizable group, such as an acrylate, methacrylate, vinyl, vinyloxy, propenyl ether, epoxy(oxirane, oxetane) or vinyl ketone compound. Especially desirable examples of the polymerizable compound are acrylate derivatives or methacrylate derivatives. A desirable ratio of the polymerizable compound is approximately 0.05% by weight or more for achieving its effect and is approximately 10% by weight or less for avoiding a poor display. A more desirable ratio is in the range of approximately 0.1% by weight to approximately 2% by weight. The polymerizable compound is polymerized on irradiation with ultraviolet light or the like, preferably in the presence of a suitable initiator such as a photopolymerization initiator. Suitable conditions for polymerization, suitable types of the initiator and suitable amounts thereof are known to a person skilled in the art and are described in the literature. For example, Irgacure 651 (registered trademark), Irgacure 184 (registered trademark) or Darocure 1173 (registered trademark) (Ciba Japan K.K.), each of which is a photopolymerization initiator, is suitable for radical polymerization. The polymerizable compound includes the photopolymerization initiator preferably in the range of approximately 0.1% by weight to approximately 5% by weight and most preferably in the range of approximately 1% by weight to approximately 3% by weight.

When each of component compounds in the liquid crystal composition of the invention is a liquid, for example, the composition is prepared by mixing and shaking the compounds. When solids are included, the composition is prepared by mixing each compound, and then shaking after the compounds have been heated and liquefied. Moreover, the liquid crystal composition of the invention can also be prepared according to other known methods.

The temperature range of the nematic phase is wide in the liquid crystal composition of the invention, since the maximum temperature of a nematic phase can be adjusted to approximately 70° C. or higher and the minimum temperature of the nematic phase can be adjusted to approximately −20° C. or lower. Accordingly, the liquid crystal display device containing this liquid crystal composition can be used in a wide temperature range.

In the liquid crystal composition of the invention, the liquid crystal composition having the optical anisotropy in the range of approximately 0.05 to approximately 0.18, and preferably in the range of approximately 0.09 to approximately 0.13 can be obtained by suitably selecting the formulation, for instance. A liquid crystal composition that falls in the numerical range described above can be suitably used for a liquid crystal display device operated in a TN mode, a STN mode or a TFT mode.

In the liquid crystal composition of the invention, the liquid crystal composition having the dielectric anisotropy usually in the range of approximately −5.0 to approximately −2.0, and preferably in the range of approximately −4.5 to approximately −2.5 can be obtained. A liquid crystal composition that falls in the numerical range described above can be suitably used for a liquid crystal display device operated in an IPS mode, a VA mode or a PSA mode.

The Liquid Crystal Display Device of the Invention

The liquid crystal composition of the invention can be used not only for liquid crystal display devices having operating modes such as the PC, TN, STN and OCB modes which are driven by means of a AM (active matrix) mode, but also for liquid crystal display devices having operating modes such as the PC, TN, STN, OCB, VA, IPS and PSA modes, which are driven by means of a PM (passive matrix) mode.

The liquid crystal display devices having the AM and PM modes can be applied to any of liquid crystal displays and so forth that have a reflection type, a transmission type, and a semi-transmission type.

Moreover, the liquid crystal composition of the invention can also be used for a dynamic scattering (DS) mode-device containing the liquid crystal composition to which a conducting agent is added, and a nematic curvilinear aligned phase (NCAP) device containing the liquid crystal composition microencapsulated, and a polymer dispersed (PD) device having a three-dimensional network polymer formed in the liquid crystal composition, for example, a polymer network (PN) device.

Since the liquid crystal composition of the invention has the characteristics described above, it can be suitably used for the liquid crystal display device having an AM mode which is driven by means of an operating mode such as the VA, IPS or PSA mode, wherein the liquid crystal composition having negative dielectric anisotropy is used, and especially for the liquid crystal display device having the AM mode which is driven by means of the VA mode.

Incidentally, the direction of an electric field is perpendicular to the surface of the glass substrate in a liquid crystal display device which is driven by means of the TN mode, the VA mode, the PSA mode or the like. On the other hand, the direction of an electric field is parallel to the surface of the substrate in a liquid crystal display device which is driven by means of the IPS mode or the like. The structure of the liquid crystal display device which is driven by means of the VA mode is reported by K. Ohmuro, S. Kataoka, T. Sasaki and Y. Koike, SID '97 Digest of Technical Papers, 28, 845 (1997), and the structure of the liquid crystal display device which is driven by means of the IPS mode is reported in WO 1991-010936 A (patent family: U.S. Pat. No. 5,576,867).

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Examples of the Compound (1)

The invention will be explained below in more detail based on examples. However, the invention is not limited to the examples. The term "%" means "% by weight," unless otherwise noted. The obtained compounds herein were identified by means of $^1$H-NMR spectroscopy and so forth. Their measurements were based on the methods that will be described later. In Examples, the symbols C, SA, SB, SX, N and I stand for crystals, a smectic A phase, a smectic B phase, a smectic phase which the phase structure is not yet analyzed, a nematic phase and an isotropic phase, respectively. The degree Celsius (° C.) was used for the unit of the phase transition temperature.

$^1$H-NMR Analysis:

A model DRX-500 apparatus (made by Bruker BioSpin Corporation) was used for measurement. Samples were dissolved in deuterated solvents such as $CDCl_3$ in which the samples were soluble, and measured at room temperature by use of the nuclear magnetic resonance apparatus. Tetramethylsilane (TMS) was used as the standard reference material for the zero point of the 5 value. The symbols s, d, t, q and m stand for a singlet, a doublet, a triplet, a quartet and a multiplet, respectively.

Identification of cis/trans of an ethylene group in a compound was carried out by means of $^1$H-NMR analysis. The coupling constant ($J_{HF}$) of hydrogen and fluorine in the ethylene group was measured, and the ethylene group was identified as trans when the values was from 39 Hz to 41 Hz and the ethylene group was identified as cis when the value was from 21 Hz to 22 Hz.

Gas Chromatographic Analysis

A Gas Chromatograph Model GC-2014 made by Shimadzu Corporation was used for measurement. Helium (2 ml/minute) was used as a carrier gas. The temperature of the sample injector was set at 280° C. and the temperature of the detector (FID) was set at 300° C. A capillary column DB-1 (length 30 m, bore 0.32 mm, film thickness 0.25 micrometer; dimethylpolysiloxane as a stationary liquid phase; non-polar) made by Agilent Technologies Inc. was used for the separation of component compounds. The column was kept at 180° C. for 2 minutes, and heated to 280° C. at the rate of 5° C./minute.

A sample was dissolved in toluene to give a 1% by weight solution, and then 1 microliter of the solution obtained was injected into the sample injector.

Chromatopac Model C-R7A made by Shimadzu Corporation or its equivalent was used as a recorder. The obtained gas chromatogram showed the retention time of the peaks and the values of the peak areas corresponding to the component compounds.

Chloroform or hexane, for example, may also be used as a solvent for diluting the sample. The following capillary columns may also be used: DB-1 (length 30 m, bore 0.32 mm, film thickness 0.25 micrometer) made by Agilent Technologies Inc., HP-1 (length 30 m, bore 0.32 mm, film thickness 0.25 micrometer) made by Agilent Technologies Inc., Rtx-1 (length 30 m, bore 0.32 mm, film thickness 0.25 micrometer) made by Restek Corporation, BP-1 (length 30 m, bore 0.32 mm, film thickness 0.25 micrometer) made by SGE International Pty. Ltd. and so forth.

The ratio of the peak areas in the gas chromatogram corresponds to the ratio of component compounds. In general, the percentage by weight of each component compound in an analytical sample is not completely the same as the percentage of each peak area in the analytical sample. In the invention, however, the percentage by weight of the component compound in the analytical sample corresponds substantially to the percentage of the peak area in the analytical sample, because the correction coefficient is essentially 1 (one) when the columns described above are used. This is because there is no significant difference among the correction coefficients of the liquid crystal compounds as components. An internal standard method using gas chromatograms is used in order to determine the composition ratio of the liquid crystal compounds in the liquid crystal composition more accurately by means of the gas chromatograms. Each liquid crystal compound (test-component) weighed accurately in a fixed amount and a liquid crystal compound serving as a standard (standard reference material) are analyzed simultaneously by means of gas chromatography, and the relative intensity is calculated in advance from the ratio of the peak area of the test-component to that of the standard reference material. Then, the composition ratio of the liquid crystal compounds in the liquid crystal composition can be determined more accurately by means of the gas-chromatographic analysis using the correction method based on the relative intensity of the peak area of each component to that of the standard reference material.

Example 1

1-Ethoxy-2,3-difluoro-4-(trans-1-fluoro-2-(4-propylcyclohexyl)vinyl)benzene (1-a-3) was prepared according to the following synthetic scheme.

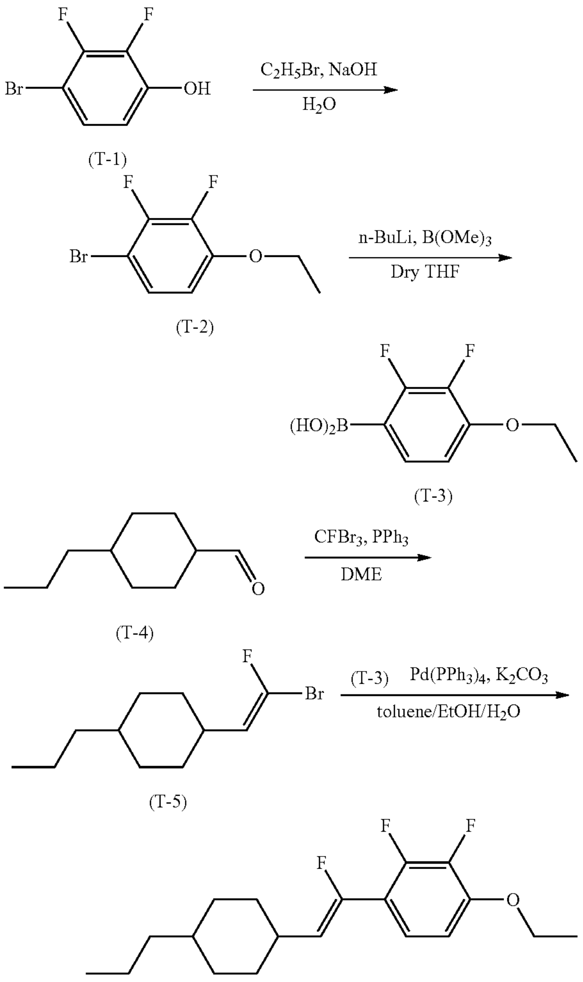

(T-1)

(T-2)

(T-3)

(T-4)

(T-5)

Preparation of 1-ethoxy-2,3-difluorobromobenzene (T-2)

Sodium hydroxide (75.9 g) was added to a water (400 ml) solution of 4-bromo-2,3-difluorophenol (T-1) (195.0 g), bromoethane (196.2 g) and tetrabutylammonium bromide (hereinafter abbreviated as TBAB) (24.2 g), and the mixture was heated at 80° C. for 6 hours with stirring under an atmosphere of nitrogen. After the reaction had been completed, the reaction mixture was extracted with heptane and the organic layer was washed successively with water and brine, and dried over anhydrous magnesium sulfate. The extract was concentrated under reduced pressure to give a black oil. The oil was purified by distillation to give 1-ethoxy-2,3-difluorobromobenzene (T-2) (230.0 g, 97% yield) as a colorless oil.

Preparation of the Compound (T-3)

The compound (T-2) (129.5 g) obtained in the preceding step was dissolved in dried THF (500 ml) and cooled to −70° C. n-BuLi (500 ml) was added dropwise at −70° C. under an atmosphere of nitrogen, and the stirring was continued for 2 hours. Then, trimethyl borate (129.5 g) in dried THF solution was slowly added dropwise at −70° C., and the mixture was allowed to warm to room temperature and stirred for another 16 hours. After the reaction had been completed, the reaction mixture to which 2N—HCl (200 ml) had been added was extracted with toluene, and the extract was washed successively with water and brine, and then dried over anhydrous magnesium sulfate. The extract was concentrated under reduced pressure to give pale brown solids. The solids were purified by recrystallization (heptane:toluene=4:1 by volume) to give the compound (T-20) (117.2 g, 71% yield) as colorless crystals.

Preparation of the Compound (T-5)

Fluorotribromomethane (25 g) and triphenylphosphine (100 g) in an ethylene glycol dimethyl ether solution was stirred at 70° C. for 1 hour. The reaction solution was cooled and the compound (T-4) (25 g) was added. The mixture was stirred for another 1 hour and then allowed to return slowly to room temperature. The reaction solution was filtered and purified by silica gel column chromatography (heptane) to give the compound (T-5) (12.5 g, 54% yield) as a colorless oil.

Preparation of 1-ethoxy-2,3-difluoro-4-(trans-1-fluoro-2-(4-propylcyclohexyl)vinyl)benzene The compound (T-5) (3.5 g) obtained in the preceding step and the compound (T-3) (3.7 g) were dissolved in toluene, and then water, ethanol, $Pd(PPh_3)_4$ (0.81 g), TBAB (0.23 g) and potassium carbonate (5.82 g) were added thereto, and the mixture was heated to reflux for 6 hours. After the reaction had been completed, the reaction mixture was extracted with ethyl acetate, and the organic layer was washed successively with a 2N—NaOH aqueous solution, a saturated aqueous solution of sodium hydrogencarbonate, water and brine, and then dried over anhydrous magnesium sulfate. The extract was concentrated under reduced pressure to give pale brown solids. The solids were purified by silica gel column chromatography (heptane:toluene=6:1 by volume) and by recrystallization (ethanol) to give 1-ethoxy-2,3-difluoro-4-(trans-1-fluoro-2-(4-propylcyclohexyl)vinyl)benzene (1.18 g, 26% yield) as colorless crystals.

As described in the section of Composition Examples below, a sample was prepared by mixing 15% by weight of the compound and 85% by weight of the mother liquid crystals (A), and the physical properties were calculated from the values obtained by measurement according to the extrapolation method: (Extrapolated value)=[(measured value of a sample)−0.85×(measured value of the mother liquid crystals (A))]/0.15. The physical properties of the compound was that NI=79.9° C.; $\Delta\epsilon$=−1.99; $\Delta n$=0.156; $\eta$=24.8 mPa·s; $K_{33}/K_{11}$=1.35; and C 62.8 N 81.5 Iso.

$^1$H-NMR ($CDCl_3$; δ ppm): 7.15 (t, 1H), 6.71 (t, 1H), 5.24 (dd, 1H, $J_{HF}$=40 Hz), 4.12 (q, 2H), 2.56 (q, 1H), 1.80 (t, 4H), 1.46 (t, 3H), 1.37-1.1 (m, 7H), 1.05-0.90 (m, 2H) and 0.89 (t, 3H).

Example 2

4-(2-(4-Ethoxy-2,3-difluorophenyl)-trans-2-fluorovinyl)-4'-propylbicyclohexane (1-b-3) was prepared according to the following synthetic scheme.

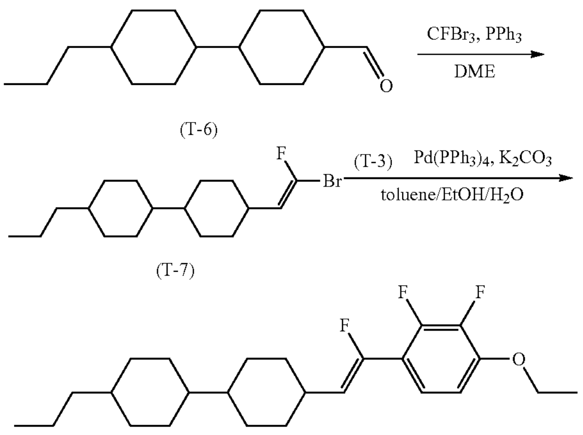

Preparation of the Compound (T-7)

Fluorotribromomethane (2.5 g) and triphenylphosphine (10 g) in an ethylene glycol dimethyl ether solution were stirred at 70° C. for 1 hour. The reaction solution was cooled, and the compound (T-6) (3.8 g) was added thereto, and the mixture was stirred for another 1 hour, and then allowed to return to room temperature. The reaction solution was filtered and purified by silica gel column chromatography (heptane) to give the compound (T-7) (2.13 g, 60% yield) as colorless crystals.

Preparation of 4-(2-(4-ethoxy-2,3-difluorophenyl)-trans-2-fluorovinyl)-4'-propylbicyclohexane The compound (T-7) (0.5 g) obtained in the preceding step and the compound (T-3) (0.46 g) obtained in Example 1 were dissolved in toluene, and then water, ethanol, $Pd(PPh_3)_4$ (0.09 g), TBAB (0.02 g) and potassium carbonate (0.63 g) were added thereto, and the mixture was heated to reflux for 6 hours. After the reaction had been completed, the reaction mixture was extracted with ethyl acetate, and the organic layer was washed successively with a 2N—NaOH aqueous solution, a saturated aqueous solution of sodium hydrogencarbonate, water and brine, and dried over anhydrous magnesium sulfate. The extract was concentrated under reduced pressure to give pale brown solids. The solids were purified by silica gel column chromatography (heptane:toluene=4:1 by volume) and by recrystallization (ethanol) to give 4-(2-(4-ethoxy-2.3-difluorophenyl)-trans-2-fluorovinyl)-4'-propylbicyclohexane (0.5 g, 81% yield) as colorless crystals.

Physical properties of the compound was that NI=206.6° C.; Δε=−2.37; Δn=0.197; η=36.0 mPa·s; $K_{33}/K_{11}$=1.229; and C 89.4 N 236.7 Iso. The physical properties were measured in the manner described in Example 1.

$^1$H-NMR ($CDCl_3$; δ ppm): 7.15 (t, 1H), 6.71 (t, 1H), 5.24 (dd, 1H, $J_{HF}$=40 Hz), 4.12 (q, 2H), 2.56 (q, 1H), 1.84-1.70 (m, 8H), 1.46 (t, 3H), 1.37-0.9 (m, 13H), 0.90-0.81 (m, 2H) and 0.89 (t, 3H).

Example 3

4-Ethoxy-2,2',3,3'-tetrafluoro-4'-(trans-1-fluoro-2-(4-propylcyclohexyl)vinyl)biphenyl (1-c-3) was prepared according to the following synthetic scheme.

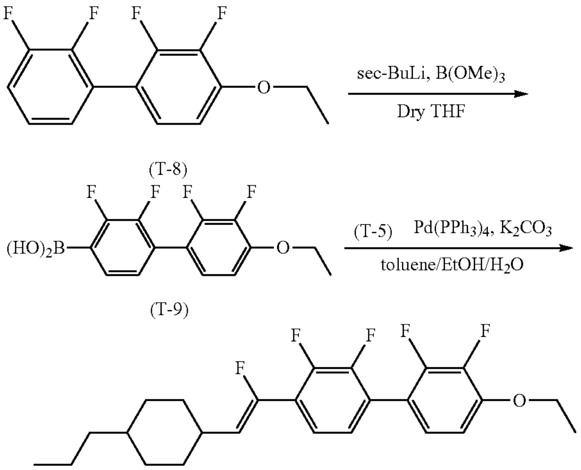

Preparation of the Compound (T-9)

The compound (T-8) (10 g) was dissolved in dried THF (100 ml) and cooled to −70° C. sec-BuLi (48 ml) was then added dropwise under an atmosphere of nitrogen, and the stirring was continued at −70° C. for 2 hours. Then, trimethyl borate (5.4 g) in a dried THF solution was slowly added dropwise at −70° C., and the mixture was allowed to return to room temperature and stirred for another 16 hours. After the reaction had been completed, the reaction mixture to which 2N—HCl (200 ml) had been added was extracted with toluene, and the organic layer was washed successively with water and brine, and then dried over anhydrous magnesium sulfate. The extract was concentrated under reduced pressure to give pale brown solids. The solids were purified by recrystallization (heptane:toluene=4:1 by volume) to give the compound (T-9) (9.3 g, 80% yield) as colorless crystals.

Preparation of 4-ethoxy-2,2',3,3'-tetrafluoro-4'-(trans-1-fluoro-2-(4-propylcyclohexyl)vinyl)biphenyl The compound (T-9) (2.6 g) obtained in the preceding step and the compound (T-3) (1.5 g) obtained in Example 1 were dissolved in toluene, and then water, ethanol, $Pd(PPh_3)_4$ (0.34 g), TBAB (0.1 g) and potassium carbonate (2.5 g) were added thereto and the mixture was heated to reflux 6 hours. After the reaction had been completed, the reaction mixture was extracted with ethyl acetate, and the organic layer was washed successively with a 2N—NaOH aqueous solution, a saturated aqueous solution of sodium hydrogencarbonate, water and brine, and then dried over anhydrous magnesium sulfate. The extract was concentrated under reduced pressure to give pale brown solids. The solids were purified by silica gel column chromatography (heptane:toluene=2:1 by volume) and by recrystallization (ethanol) to give 4-ethoxy-2,2',3,3'-tetrafluoro-4'-(trans-1-fluoro-2-(4-propylcyclohexyl)vinyl)biphenyl (0.88 g, 33% yield) as colorless crystals.

Physical properties of the compound was that NI=164.6° C.; Δ∈=−5.37; Δn=0.249; η=77.2 mPa·s; $K_{33}/K_{11}$=1.078; and C 141.6 N 189.7 Iso. The physical properties were measured in the manner described in Example 1.

$^1$H-NMR ($CDCl_3$; δ ppm): 7.31 (t, 1H), 7.11 (t, 1H), 7.04 (t, 1H), 6.81 (t, 1H), 5.54 (dd, 1H, $J_{HF}$=40 Hz), 4.12 (q, 2H), 2.56 (q, 1H), 1.80 (t, 4H), 1.46 (t, 3H), 1.37-1.1 (m, 7H), 1.05-0.90 (m, 2H) and 0.89 (t, 3H).

The compounds shown in Table 1 to Table 3 are prepared based on the synthetic method described in Example 1 to Example 3. Incidentally, the compound (1-a-3), the compound (1-b-3) and the compound (1-c-3) obtained in Example 1 to Example was described there again.

TABLE 1

(1-a)

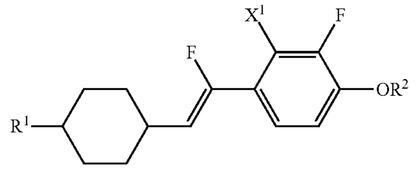

| No. | $R^1$ | $X^1$ | $R^2$ |
|---|---|---|---|
| 1-a-1 | $C_2H_5$ | F | $C_2H_5$ |
| 1-a-2 | $C_3H_7$ | F | $CH_3$ |
| 1-a-3 | $C_3H_7$ | F | $C_2H_5$ |
| 1-a-4 | $C_3H_7$ | Cl | $C_2H_5$ |
| 1-a-5 | $C_3H_7$ | Cl | $C_2H_5$ |
| 1-a-6 | $C_3H_7$ | F | $C_3H_7$ |
| 1-a-7 | $C_3H_7$ | F | $C_4H_9$ |
| 1-a-8 | $C_3H_7$ | F | $C_4H_9$ |
| 1-a-9 | $C_3H_7$ | Cl | $C_4H_9$ |
| 1-a-10 | $C_3H_7$ | F | $C_5H_{11}$ |
| 1-a-11 | $C_3H_7$ | F | $C_6H_{13}$ |
| 1-a-12 | $C_3H_7$ | F | $C_7H_{15}$ |
| 1-a-13 | $C_3H_7$ | F | $C_8H_{17}$ |
| 1-a-14 | $C_3H_7$ | F | $CH{=}CH_2$ |
| 1-a-15 | $C_3H_7$ | F | $CH_2CH{=}CH_2$ |
| 1-a-16 | $C_3H_7$ | F | $CH_2CH{=}CHCH_3$ |
| 1-a-17 | $C_3H_7$ | F | $CH_2CH{=}CH(CH_2)_2CH{=}CH_2$ |
| 1-a-18 | $C_4H_9$ | F | $C_2H_5$ |
| 1-a-19 | $C_4H_9$ | F | $C_4H_9$ |
| 1-a-20 | $C_5H_{11}$ | F | $C_2H_5$ |
| 1-a-21 | $C_5H_{11}$ | Cl | $C_2H_5$ |
| 1-a-22 | $C_5H_{11}$ | Cl | $C_2H_5$ |
| 1-a-23 | $C_5H_{11}$ | F | $C_4H_9$ |
| 1-a-24 | $C_5H_{11}$ | F | $C_4H_9$ |
| 1-a-25 | $C_5H_{11}$ | Cl | $C_4H_9$ |
| 1-a-26 | $C_5H_{11}$ | F | $C_6H_{13}$ |
| 1-a-27 | $C_5H_{11}$ | F | $CH_2CH{=}CHCH_3$ |
| 1-a-28 | $C_6H_{13}$ | F | $C_2H_5$ |
| 1-a-29 | $C_7H_{15}$ | F | $C_2H_5$ |
| 1-a-30 | $C_8H_{17}$ | F | $C_2H_5$ |
| 1-a-31 | $C_9H_{19}$ | F | $C_2H_5$ |
| 1-a-32 | $CH_2{=}CH$ | F | $C_2H_5$ |
| 1-a-33 | $CH_2{=}CHCH_2$ | F | $C_2H_5$ |
| 1-a-34 | $CH_3CH_2{=}CHCH_2$ | F | $C_2H_5$ |
| 1-a-35 | $CH_3CH_2{=}CHCH_2$ | F | $C_4H_9$ |
| 1-a-36 | $CH_2{=}CH(CH_2)_2CH_2{=}CHCH_2$ | F | $C_2H_5$ |

TABLE 2

(1-b)

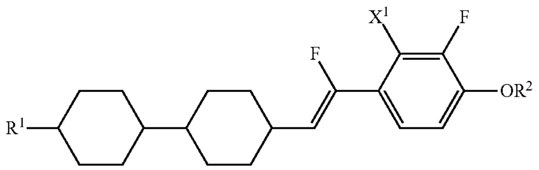

| No.. | $R^1$ | $X^1$ | $R^2$ |
|---|---|---|---|
| 1-b-1 | $C_2H_5$ | F | $C_2H_5$ |
| 1-b-2 | $C_3H_7$ | F | $CH_3$ |
| 1-b-3 | $C_3H_7$ | F | $C_2H_5$ |
| 1-b-4 | $C_3H_7$ | Cl | $C_2H_5$ |
| 1-b-5 | $C_3H_7$ | Cl | $C_2H_5$ |

TABLE 2-continued (1-b)

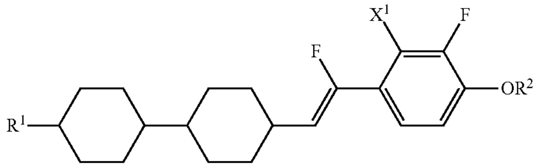

| No.. | $R^1$ | $X^1$ | $R^2$ |
|---|---|---|---|
| 1-b-6 | $C_3H_7$ | F | $C_3H_7$ |
| 1-b-7 | $C_3H_7$ | F | $C_4H_9$ |
| 1-b-8 | $C_3H_7$ | F | $C_4H_9$ |
| 1-b-9 | $C_3H_7$ | Cl | $C_4H_9$ |
| 1-b-10 | $C_3H_7$ | F | $C_5H_{11}$ |
| 1-b-11 | $C_3H_7$ | F | $C_6H_{13}$ |
| 1-b-12 | $C_3H_7$ | F | $C_7H_{15}$ |
| 1-b-13 | $C_3H_7$ | F | $C_8H_{17}$ |
| 1-b-14 | $C_3H_7$ | F | $CH{=}CH_2$ |
| 1-b-15 | $C_3H_7$ | F | $CH_2CH{=}CH_2$ |
| 1-b-16 | $C_3H_7$ | F | $CH_2CH{=}CHCH_3$ |
| 1-b-17 | $C_3H_7$ | F | $CH_2CH{=}CH(CH_2)_2CH{=}CH_2$ |
| 1-b-18 | $C_4H_9$ | F | $C_2H_5$ |
| 1-b-19 | $C_4H_9$ | F | $C_4H_9$ |
| 1-b-20 | $C_5H_{11}$ | F | $C_2H_5$ |
| 1-b-21 | $C_5H_{11}$ | Cl | $C_2H_5$ |
| 1-b-22 | $C_5H_{11}$ | Cl | $C_2H_5$ |
| 1-b-23 | $C_5H_{11}$ | F | $C_4H_9$ |
| 1-b-24 | $C_5H_{11}$ | F | $C_4H_9$ |
| 1-b-25 | $C_5H_{11}$ | Cl | $C_4H_9$ |
| 1-b-26 | $C_5H_{11}$ | F | $C_6H_{13}$ |
| 1-b-27 | $C_5H_{11}$ | F | $CH_2CH{=}CHCH_3$ |
| 1-b-28 | $C_6H_{13}$ | F | $C_2H_5$ |
| 1-b-29 | $C_7H_{15}$ | F | $C_2H_5$ |
| 1-b-30 | $C_8H_{17}$ | F | $C_2H_5$ |
| 1-b-31 | $C_9H_{19}$ | F | $C_2H_5$ |
| 1-b-32 | $CH_2{=}CH$ | F | $C_2H_5$ |
| 1-b-33 | $CH_2{=}CHCH_2$ | F | $C_2H_5$ |
| 1-b-34 | $CH_3CH_2{=}CHCH_2$ | F | $C_2H_5$ |
| 1-b-35 | $CH_3CH_2{=}CHCH_2$ | F | $C_4H_9$ |
| 1-b-36 | $CH_2{=}CH(CH_2)_2CH_2{=}CHCH_2$ | F | $C_2H_5$ |

TABLE 3

(1-c)

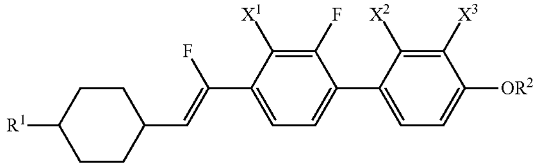

| NO. | $R^1$ | $X^1$ | $R^2$ |
|---|---|---|---|
| 1-c-1 | $C_2H_5$ | F | $C_2H_5$ |
| 1-c-2 | $C_3H_7$ | F | $CH_3$ |
| 1-c-3 | $C_3H_7$ | F | $C_2H_5$ |
| 1-c-4 | $C_3H_7$ | Cl | $C_2H_5$ |
| 1-c-5 | $C_3H_7$ | Cl | $C_2H_5$ |
| 1-c-6 | $C_3H_7$ | F | $C_3H_7$ |
| 1-c-7 | $C_3H_7$ | F | $C_4H_9$ |
| 1-c-8 | $C_3H_7$ | F | $C_4H_9$ |
| 1-c-9 | $C_3H_7$ | Cl | $C_4H_9$ |
| 1-c-10 | $C_3H_7$ | F | $C_5H_{11}$ |
| 1-c-11 | $C_3H_7$ | F | $C_6H_{13}$ |
| 1-c-12 | $C_3H_7$ | F | $C_7H_{15}$ |
| 1-c-13 | $C_3H_7$ | F | $C_8H_{17}$ |
| 1-c-14 | $C_3H_7$ | F | $CH_2{=}CH$ |
| 1-c-15 | $C_3H_7$ | F | $CH_2CH{=}CH_2$ |
| 1-c-16 | $C_3H_7$ | F | $CH_2CH{=}CHCH_3$ |
| 1-c-17 | $C_3H_7$ | F | $CH_2CH{=}CH(CH_2)_2CH{=}CH_2$ |
| 1-c-18 | $C_4H_9$ | F | $C_2H_5$ |
| 1-c-19 | $C_4H_9$ | F | $C_4H_9$ |
| 1-c-20 | $C_5H_{11}$ | F | $C_2H_5$ |

TABLE 3-continued (1-c)

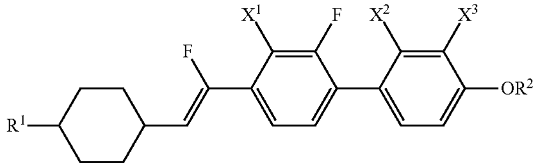

| NO. | $R^1$ | $X^1$ | $R^2$ |
|---|---|---|---|
| 1-c-21 | $C_5H_{11}$ | Cl | $C_2H_5$ |
| 1-c-22 | $C_5H_{11}$ | Cl | $C_2H_5$ |
| 1-c-23 | $C_5H_{11}$ | F | $C_4H_9$ |
| 1-c-24 | $C_5H_{11}$ | F | $C_4H_9$ |
| 1-c-25 | $C_5H_{11}$ | Cl | $C_4H_9$ |
| 1-c-26 | $C_5H_{11}$ | F | $C_6H_{13}$ |
| 1-c-27 | $C_5H_{11}$ | F | $CH_2CH{=}CHCH_3$ |
| 1-c-28 | $C_6H_{13}$ | F | $C_2H_5$ |
| 1-c-29 | $C_7H_{15}$ | F | $C_2H_5$ |
| 1-c-30 | $C_8H_{17}$ | F | $C_2H_5$ |
| 1-c-31 | $C_9H_{19}$ | F | $C_2H_5$ |
| 1-c-32 | $CH_2{=}CH$ | F | $C_2H_5$ |
| 1-c-33 | $CH_2{=}CHCH_2$ | F | $C_2H_5$ |
| 1-c-34 | $CH_3CH_2{=}CHCH_2$ | F | $C_2H_5$ |
| 1-c-35 | $CH_3CH_2{=}CHCH_2$ | F | $C_4H_9$ |
| 1-c-36 | $CH_2{=}CH(CH_2)_2CH_2{=}CHCH_2$ | F | $C_2H_5$ |

An example of typical formulations in the invention will be shown below. Measurement of physical properties was carried out according to the methods described below.

Two kinds of samples were used for measuring physical properties of a liquid crystal compound: one is the compound itself, and the other is a mixture of the compound and mother liquid crystals.

In the latter case using a sample in which the compound was mixed with mother liquid crystals, the measurement was carried out according to the following method. First, the sample was prepared by mixing 15% by weight of the liquid crystal compound obtained and 85% by weight of the mother liquid crystals. Then, extrapolated values were calculated from the measured values of the resulting sample by means of an extrapolation method based on the following formula. The extrapolated values were regarded as the values of physical properties of this compound.

(Extrapolated value)=[100×(Measured value of sample)−(% by weight of mother liquid crystals)×(Measured value of mother liquid crystals)]/(% by weight of liquid crystal compound)

When a smectic phase or crystals deposited even at this ratio of the compound to the mother liquid crystals at 25° C., the ratio of the liquid crystal compound to the mother liquid crystals was changed in the order of (10% by weight: 90% by weight), (5% by weight: 95% by weight) and (1% by weight: 99% by weight). Physical properties of the sample were measured at the ratio in which the smectic phase or the crystals did not deposit at 25° C. Extrapolated values were determined according to the above equation, and regarded as the values of physical properties of the liquid crystal compound.

There are a variety of mother liquid crystals used for measurement and, for example, the formulation of the mother liquid crystals (A) is shown below.

The mother liquid crystals (A):

17.2%

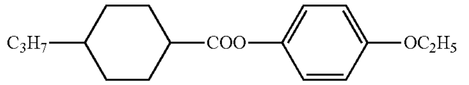

27.6%

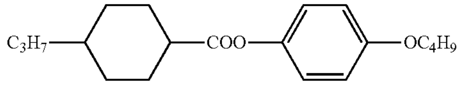

20.7%

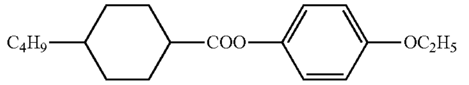

20.7%

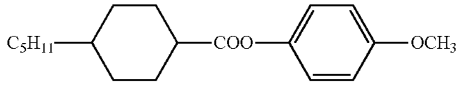

13.8%

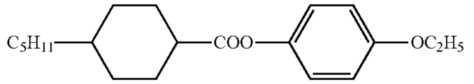

The physical properties of the mother liquid crystals (A) were as follows: maximum temperature (NI)=74.6° C.; optical anisotropy (Δn)=0.087; and dielectric anisotropy (Δ∈)=−1.3.

1-Ethoxy-2,3-difluoro-4-(trans-1-fluoro-2-(4-propylcyclohexyl)vinyl)benzene (1-a-3) (15% by weight) described in Example 1 was added to the mother liquid crystals (A) and the physical properties were measured. The results were as follows: maximum temperature (NI)=79.9° C.; optical anisotropy (Δn)=0.156; and viscosity (η)=24.8 mPa·s.

Comparative Example 1

1-Ethoxy-2,3-difluoro-4-(trans-2-(4-propylcyclohexyl) vinyl)benzene (S-3) was synthesized and a composition consisting of this compound (15% by weight) and the mother liquid crystals (A) (85% by weight) was prepared, and then the physical properties were measured in a similar manner. The results were as follows: maximum temperature (NI)=69.9° C.; optical anisotropy (Δn)=0.144; and viscosity (η)=34.4 mPa·s. It was found that the compound (1-a-3) of the invention had a high clearing point, a large optical anisotropy and a small viscosity in comparison with this comparative compound.

4-(2-(4-Ethoxy-2,3-difluorophenyl)-trans-2-fluorovinyl)-4'-propylbicyclohexane (1-b-3) (15% by weight) described in Example 2 was added to the mother liquid crystals (A) and the physical properties were measured. The results was as follows: optical anisotropy (Δn)=0.197; and viscosity (η)=36.0 mPa·s. 4-(2-(4-Ethoxy-2,3-difluorophenyl)-trans-2-fluorovinyl)-4'-propylbicyclohexane (1-b-3) (15% by weight) was added to the mother liquid crystals ZLI-1132 (Merck KGaA), and the clearing points of the resulting composition was measured before and after the irradiation of ultraviolet light. The change was from 76.9° C. to 76.7° C.

Comparative Example 2

4-(4-Ethoxy-2,3-difluorophenyl)-4'-propylbicyclohexane (S-4) was synthesized and a composition consisting of this compound (15% by weight) and the mother liquid crystals (A) (85% by weight) was prepared, and then the physical properties were measured in a similar manner. The results were as follows: optical anisotropy (Δn)=0.166; and viscosity (η)=41.1 mPa·s. 4-(4-Ethoxy-2,3-difluorophenyl)-4'-propylbicyclohexane (15% by weight) was added to the mother liquid crystals ZLI-1132 (Merck KGaA) and the clearing points of the resulting composition was measured before and after the irradiation of ultraviolet light. The change was from 88.2° C. to 56.3° C. It was found that the compound (1-b-3) of the invention had a large optical anisotropy, a small viscosity and an excellent stability to light in comparison with this comparative compound.

Furthermore, representative compositions of the invention are summarized in Example 4 (Composition Example 1 to Composition Example 11). First, compounds that are the component of the composition and their ratio (% by weight) are shown. The compounds are expressed as symbols of a left-terminal group, a bonding group, a ring structure and a right-terminal group according to the definition in Table 4, and the corresponding formula numbers are also attached. The configuration of 1,4-cyclohexylene is trans. The terminal group means hydrogen when the symbol of the terminal group is not described.

TABLE 4

Method of Description of Compounds using Symbols
$R—(A_1)—Z_1— \ldots —Z_n—(A_n)—R'$

| 1) Left-terminal Group R— | Symbol |
|---|---|
| $C_nH_{2n+1}$— | n- |
| $C_nH_{2n+1}O$— | nO- |
| $C_mH_{2m+1}OC_nH_{2n}$— | mOn- |
| $CH_2$=CH— | V- |
| $C_nH_{2n+1}$—CH=CH— | nV- |
| $CH_2$=CH—$C_nH_{2n}$— | Vn- |
| $C_mH_{2m+1}$—CH=CH—$C_nH_{2n}$— | mVn- |
| $CF_2$=CH— | VFF- |
| $CF_2$=CH—$C_nH_{2n}$— | VFFn- |

| 2) Right-terminal Group —R' | Symbol |
|---|---|
| —$C_nH_{2n+1}$ | -n |
| —$OC_nH_{2n+1}$ | -On |
| —CH=$CH_2$ | -V |
| —CH=CH—$C_nH_{2n+1}$ | -Vn |
| —$C_nH_{2n}$—CH=$CH_2$ | -nV |
| —CH=$CF_2$ | -VFF |
| —$COOCH_3$ | -EMe |
| —CN | —C |
| —F | —F |
| —Cl | —CL |
| —$OCF_3$ | —OCF3 |
| —$CF_3$ | —CF3 |

| 3) Bonding Group —$Z_n$— | Symbol |
|---|---|
| —$C_nH_{2n}$— | n |
| —COO— | E |
| —CH=CH— | V |
| —$CH_2O$— | 1O |
| —$CF_2O$— | X |
| —C≡C— | T |
| —CH=CF— | VF |

| 4) Ring Structure —$A_n$— | Symbol |
|---|---|
| 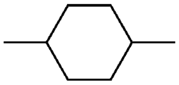 | H |

TABLE 4-continued
| Method of Description of Compounds using Symbols<br>R—($A_1$)—$Z_1$— . . . —$Z_n$—($A_n$)—R' | |
|---|---|
| 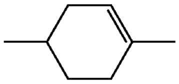 | Ch |
| 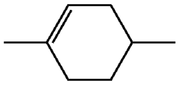 | ch |
| 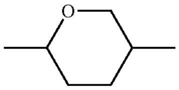 | Dh |
| 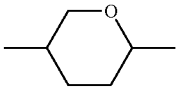 | dh |
| 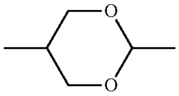 | G |
| 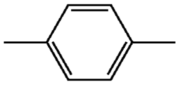 | B |
| 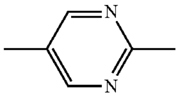 | Py |
| 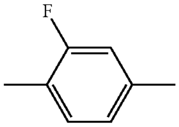 | B(2F) |
| 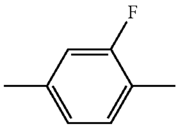 | B(F) |
| 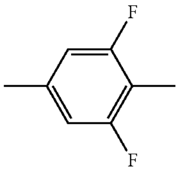 | B(F,F) |
| 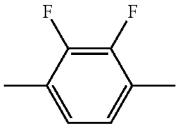 | B(2F,3F) |
| 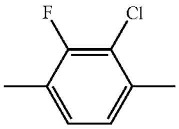 | B(2F,3CL) |

TABLE 4-continued

| Method of Description of Compounds using Symbols $R—(A_1)—Z_1— \ldots —Z_n—(A_n)—R'$ | |
|---|---|
| 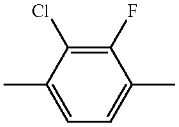 | B(2CL,3F) |
| 5) Examples of Description | |
| Example 1. 3-HVFB(2F,3F)-O2<br>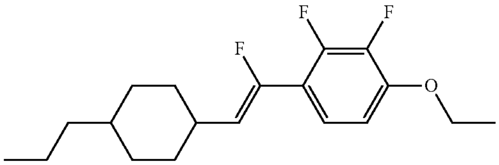 | |
| Example 2. 3-HH1VF1B(2F,3F)-O2<br>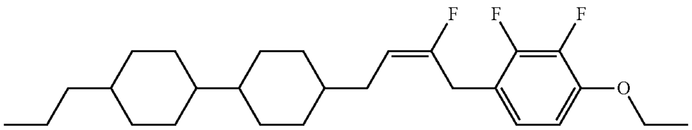 | |
| Example 3. 3-HHB-3<br>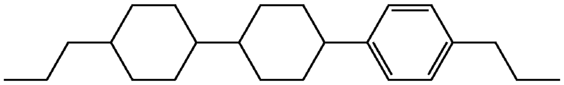 | |
| Example 4. 3-HH-V<br>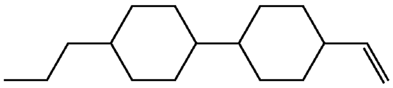 | |

Characteristics can be measured according to the following methods. Most are methods described in the Standards of Electronic Industries Association of Japan, EIAJ•ED-2521 A or the methods with some modifications. No TFT was attached to a TN device used for measurement.

Transition Temperature (° C.)

Measurement was carried out in either way. (1) A sample was placed on a hot plate of a melting point apparatus (Hot Stage Model FP-52 made by Mettler Toledo International Inc.) equipped with a polarizing microscope, and heated at the rate of 1° C. per minute. A temperature was measured when the phase of the sample changed. (2) Measurement was carried out using a Perkin-Elmer differential scanning calorimeter, a DSC-7 System at the rate of 3° C. per minute.

The symbol C stood for crystals, which were expressed by $C_1$ or $C_2$ when the kinds of the crystals were distinguishable. The symbol S stood for a smectic phase. The symbol Iso stood for a liquid (isotropic). The symbol N stood for a nematic phase. When a smectic B phase, a smectic C phase and a smectic A phase were distinguishable in the smectic phases, they were expressed as $S_B$, $S_C$ and $S_A$, respectively. Phase transition temperatures were expressed, for example, as "C 50.0 N 100.0 Iso", which means that the phase transition temperature from crystals to a nematic phase (CN) is 50.0° C., and the phase transition temperature from the nematic phase to a liquid (NI) is 100.0° C. The same applied to the other transition temperatures.

Maximum Temperature of a Nematic Phase (NI; ° C.)

A sample was placed on a hot plate of a melting point apparatus equipped with a polarizing microscope, and was observed with the polarizing microscope while being heated at the rate of 1° C. per minute. The temperature was measured when part of the sample began to change from a nematic phase to an isotropic liquid. The maximum temperature of a nematic phase may be abbreviated to "the maximum temperature."

Minimum Temperature of a Nematic Phase (Tc; ° C.)

A sample having a nematic phase was kept in freezers at temperatures of 0° C., −10° C., −20° C., −30° C. and −40° C. for 10 days, and then the liquid crystal phases were observed. For example, when the sample maintained the nematic phase at −20° C. and changed to crystals (or a smectic phase) at −30° C., Tc was expressed as <−20° C. A lower limit of the temperature range of a nematic phase may be abbreviated to "the minimum temperature."

Compatibility of the Compound

Some compounds having similar structures were mixed to give mother liquid crystals having a nematic phase. A composition was prepared by mixing a compound for measurement and the mother liquid crystals. One example of the ratio for the mixing was 15% by weight of the compound and 85% by weight of the mother liquid crystals. The composition was kept at low temperature such as at −20° C. and −30° C. for 30 days. Whether or not the part of the composition had changed to crystals (or a smectic phase) was observed. The ratio for the mixing and the temperature for keeping were changed as requested. Conditions that crystals (or a smectic phase) deposited and conditions that crystals (or smectic phase) did not deposit were obtained from these measurements. These conditions are the scale of the compatibility.

Viscosity (Bulk Viscosity; η; Measured at 20° C.; mPa·s)

An E-type viscometer was used for measurement.

Viscosity (Rotational Viscosity; γ1; Measured at 25° C.; mPa·s)

Rotational viscosity was measured according to the method described in M. Imai, et al., Molecular Crystals and Liquid Crystals, vol. 259, p. 37 (1995). A sample was put in a VA device in which the distance between the two glass substrates (cell gap) was 20 micrometers. A voltage in the range of 30 V to 50 V was applied stepwise with an increment of 1 volt to the device. After a period of 0.2 second with no voltage, a voltage was applied repeatedly under the conditions of only one rectangular wave (rectangular pulse; 0.2 second) and no voltage (2 seconds). The peak current and the peak time of the transient current generated by the applied voltage were measured. The value of rotational viscosity was obtained from the measured values and the calculating equation (8) on page 40 of the paper presented by M. Imai, et al. The value of the dielectric anisotropy (Δ∈) necessary for the present calculation was obtained by the method described below, under the heading "Dielectric Anisotropy."

Optical Anisotropy (Refractive Index Anisotropy; Δn; Measured at 25° C.)

Measurement was carried out using an Abbe refractometer with a polarizing plate attached to the ocular, on irradiation with light at a wavelength of 589 nanometers. The surface of the main prism was rubbed in one direction, and then a sample was dropped onto the main prism. A refractive index (n||) was measured when the direction of the polarized light was parallel to that of the rubbing. A refractive index (n⊥) was measured when the direction of polarized light was perpendicular to that of the rubbing. The value of the optical anisotropy was calculated from the equation: Δn=n||−n⊥. When a sample was a composition, the optical anisotropy was measured by this method. When a sample was a compound, the compound was mixed with suitable mother liquid crystals, and then the optical anisotropy was measured. The optical anisotropy of the compound was expressed as an extrapolated value.

Dielectric Anisotropy (Δ∈; Measured at 25° C.)

When a sample was a compound, the compound was mixed with suitable mother liquid crystals, and then the dielectric anisotropy was measured. The dielectric anisotropy of the compound was expressed as an extrapolated value.

An ethanol (20 mL) solution of octadecyltriethoxysilane (0.16 mL) was applied to a well-washed glass substrate. The glass substrate was rotated with a spinner, and then heated at 150° C. for 1 hour. A VA device in which the distance (cell gap) was 20 micrometers was assembled from the two glass substrates.

A polyimide alignment film was prepared on glass substrates in a similar manner. After a rubbing-treatment to the alignment film formed on the glass substrates, a TN device in which the distance between the two glass substrates was 9 micrometers and the twist angle was 80 degrees was assembled.

A sample (a liquid crystal composition, or a mixture of a liquid crystal compound and mother liquid crystals) was put in the VA device obtained, a voltage of 0.5 V (1 kHz, sine waves) was applied to the sample, and then the dielectric constant (∈||) in the major axis direction of the liquid crystal molecules was measured.

The sample (the liquid crystal composition, or the mixture of the liquid crystal compound and the mother liquid crystals) was put in the TN device obtained, a voltage of 0.5 V (1 kHz, sine waves) was applied to the sample, and then the dielectric constant (∈⊥) in the minor axis direction of the liquid crystal molecules was measured.

The value of the dielectric anisotropy was calculated from the equation of Δ∈=∈||−∈⊥.

A composition in which this value is negative means that the composition has negative dielectric anisotropy.

Threshold Voltage (Vth; Measured at 25° C.; V)

When a sample was a compound, the compound was mixed with suitable mother liquid crystals, and the threshold voltage was measured. The threshold voltage of a compound was expressed as an extrapolated value.

A sample was poured into a liquid crystal display device having a normally black mode, in which the distance between the two glass substrates (cell gap) was about 9 micrometers and the device was treated for homeotropic orientation. Rectangular waves at a wavelength of 32 Hz were applied to the device. A voltage of the rectangular waves was increased and the value of the voltage was measured when the transmittance of light passing through the device became 10%.

Voltage Holding Ratio (VHR; Measured at 25° C.; %)

A TN device used for measurement had a polyimide-alignment film and the distance between the two glass substrates (cell gap) was 6 micrometers. A sample was put in the device, and then the device was sealed with an adhesive polymerizable under ultraviolet radiation. The TN device was charged by applying pulse voltage (60 microseconds at 5 V). Decreasing voltage was measured for 16.7 milliseconds with a High Speed Voltmeter, and the area A between a voltage curve and a horizontal axis in a unit period was measured. The area B was an area without the decrease. The voltage holding ratio was the percentage of the area A to the area B.

Light Resistance Test

A glass substrate on which silicone dioxide was deposited obliquely was prepared. A sample was poured into a cell in which the distance between the two glass substrates (cell gap) was 10 micrometers, giving a TN device. Ultraviolet light of 12 $mW/cm^2$ was irradiated to the TN device for 20 minutes. The distance between the light source and the subject was 20 cm. The clearing point of the resulting sample was measured, and compared with the sample before the irradiation of ultraviolet light. It can be said that the fewer the change is, the higher the light resistance is.

Elastic Constant (Splay Elastic Constant $K_{11}$ and Bend Elastic Constant $K_{33}$; Measured at 25° C.; pN)

An elastic constant measurement system Model EC-1 made by Toyo Corporation was used for measurement. A sample was put in a homeotropic cell in which the distance between the two glass substrates (cell gap) was 20 micrometers. An electric charge of 20 volts to 0 volts was applied to the cell, and electrostatic capacity and applied voltage were measured. The measured values of the electrostatic capacity (C) and the applied voltage (V) were fitted to equation (2.98) and equation (2.101) in page 75 of the "Liquid Crystal Device Handbook" (Ekisho Debaisu Handobukku, in Japanese; The Nikkan Kogyo Shimbun, Ltd.) and the value of the elastic constant was obtained from equation (2.100).

Example 4

Composition Example 1

| | | |
|---|---|---|
| 3-HVFB(2F,3F)—O2 | (1-a-3) | 5% |
| 3-HHVFB(2F,3F)—O2 | (1-b-3) | 3% |
| 3-HH—O1 | (12-1) | 8% |
| 5-HH—O1 | (12-1) | 4% |
| 3-HH-4 | (12-1) | 5% |
| 3-HB(2F,3F)—O2 | (6-1) | 8% |
| 5-HB(2F,3F)—O2 | (6-1) | 21% |
| 2-HHB(2F,3F)-1 | (7-1) | 5% |
| 3-HHB(2F,3F)-1 | (7-1) | 7% |
| 3-HHB(2F,3F)—O2 | (7-1) | 14% |
| 5-HHB(2F,3F)—O2 | (7-1) | 20% |

NI = 71.8° C.;
Δn = 0.085;
η = 23.3 mPa · s;
Δε = −4.0.

Composition Example 2

| | | |
|---|---|---|
| 3-HHVFB(2F,3F)—O2 | (1-b-3) | 3% |
| 3-HVFB(2F,3F)B(2F,3F)—O2 | (1-c-3) | 3% |
| 3-HB—O1 | (12-5) | 15% |
| 3-HH-4 | (12-1) | 5% |
| 3-HB(2F,3F)—O2 | (6-1) | 12% |
| 5-HB(2F,3F)—O2 | (6-1) | 12% |
| 2-HHB(2F,3F)-1 | (7-1) | 12% |
| 3-HHB(2F,3F)-1 | (7-1) | 12% |
| 3-HHB(2F,3F)—O2 | (7-1) | 7% |
| 5-HHB(2F,3F)—O2 | (7-1) | 13% |
| 3-HHB-1 | (13-1) | 6% |

NI = 88.1° C.;
Δn = 0.097;
η = 35.9 mPa · s;
Δε = −3.3.

Composition Example 3

| | | |
|---|---|---|
| 3-HVFB(2F,3F)—O2 | (1-a-3) | 3% |
| 3-HHVFB(2F,3F)—O2 | (1-b-3) | 3% |
| 3-HB—O1 | (12-5) | 15% |
| 3-HH-4 | (12-1) | 5% |
| 3-HB(2F,3F)—O2 | (6-1) | 12% |
| 5-HB(2F,3F)—O2 | (6-1) | 12% |
| 2-HHB(2F,3F)-1 | (7-1) | 6% |
| 3-HHB(2F,3F)-1 | (7-1) | 12% |
| 3-HHB(2F,3F)—O2 | (7-1) | 13% |
| 5-HHB(2F,3F)—O2 | (7-1) | 13% |
| 6-HEB(2F,3F)—O2 | (6-6) | 6% |

NI = 84.7° C.;
Δn = 0.092;
η = 34.2 mPa · s;
Δε = −3.6.

The pitch was 61.2 micrometers when 0.25 part by weight of the optically active compound (Op-5) was added to 100 parts by weight of the preceding composition.

Composition Example 4

| | | |
|---|---|---|
| 3-HHVFB(2F,3F)—O2 | (1-b-3) | 3% |
| 3-HVFB(2F,3F)B(2F,3F)—O2 | (1-c-3) | 3% |
| 1V2—BEB(F,F)—C | (5-15) | 3% |
| 3-HB—C | (5-1) | 18% |
| 2-BTB-1 | (12-10) | 10% |
| 5-HH—VFF | (12-1) | 30% |
| 3-HHB-1 | (13-1) | 4% |
| VFF—HHB-1 | (13-1) | 8% |
| VFF2—HHB-1 | (13-1) | 8% |
| 3-H2BTB-2 | (13-17) | 5% |
| 3-H2BTB-3 | (13-17) | 4% |
| 3-H2BTB-4 | (13-17) | 4% |

NI = 88.0° C.;
Δn = 0.135;
Δε = 4.0;
η = 13.0 mPa · sec.

Composition Example 5

| | | |
|---|---|---|
| 3-HVFB(2F,3F)—O2 | (1-a-3) | 3% |
| 3-HHVFB(2F,3F)—O2 | (1-b-3) | 3% |
| 2-HB—C | (5-1) | 5% |
| 3-HB—C | (5-1) | 12% |
| 3-HB—O2 | (12-5) | 11% |
| 2-BTB-1 | (12-10) | 3% |
| 3-HHB—F | (3-1) | 4% |
| 3-HHB-1 | (13-1) | 8% |
| 3-HHB—O1 | (13-1) | 5% |
| 3-HHB-3 | (13-1) | 14% |
| 3-HHEB—F | (3-10) | 2% |
| 5-HHEB—F | (3-10) | 4% |
| 2-HHB(F)—F | (3-2) | 7% |
| 3-HHB(F)—F | (3-2) | 7% |
| 5-HHB(F)—F | (3-2) | 7% |
| 3-HHB(F,F)—F | (3-3) | 5% |

NI = 103.5° C.;
Δn = 0.104;
Δε = 4.2;
η = 18.8 mPa · sec.

Composition Example 6

| | | |
|---|---|---|
| 3-HVFB(2F,3F)—O2 | (1-a-3) | 3% |
| 3-HHVFB(2F,3F)—O2 | (1-b-3) | 3% |
| 5-HB—CL | (2-2) | 3% |
| 7-HB(F)—F | (2-3) | 7% |
| 3-HH-4 | (12-1) | 9% |
| 3-HH—EMe | (12-2) | 21% |
| 3-HHEB—F | (3-10) | 8% |
| 5-HHEB—F | (3-10) | 8% |
| 3-HHEB(F,F)—F | (3-12) | 10% |
| 4-HHEB(F,F)—F | (3-12) | 5% |
| 4-HGB(F,F)—F | (3-103) | 5% |
| 5-HGB(F,F)—F | (3-103) | 6% |
| 2-H2GB(F,F)—F | (3-106) | 4% |

-continued

| | | |
|---|---|---|
| 3-H2GB(F,F)—F | (3-106) | 5% |
| 5-GHB(F,F)—F | (3-109) | 3% |

NI = 85.0° C.;
$\Delta n$ = 0.071;
$\Delta\epsilon$ = 4.7;
$\eta$ = 18.7 mPa · sec.

INDUSTRIAL APPLICABILITY

The invention provides a new liquid crystal compound having a small viscosity and negative dielectric anisotropy. The invention provides a new liquid crystal composition that has desired characteristics and the features described above by a suitable selection of the structural units of the compound, such as rings, substituents and bonding groups, and further provide a liquid crystal display device by use of this liquid crystal composition.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A compound represented by formula (1):

(1)

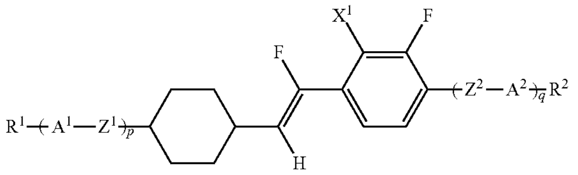

wherein $R^1$ and $R^2$ are each independently alkyl having 1 to 10 carbons, and in the alkyl, arbitrary —$CH_2$— may be replaced by —O—, —S—, —CO—, —CH═CH— or —C≡C—, and in these groups, arbitrary hydrogen may be replaced by halogen or —C≡N; $A^1$ and $A^2$ are each independently 1,4-cyclohexylene, 1,4-cyclohexenylene or 1,4-phenylene, and in these rings, arbitrary —$CH_2$— may be replaced by —O—, arbitrary —CH═ may be replaced by —N═, and arbitrary hydrogen may be replaced by fluorine, chlorine or bromine; $Z^1$ and $Z^2$ are each independently a single bond, —$(CH_2)_2$—, —$(CF_2)_2$—, —COO—, —OCO—, —$OCH_2$—, —$CH_2O$—, —CH═CH—, —C≡C—, —$(CH_2)_4$—, —$O(CH_2)_3$— or —$(CH_2)_3O$—; X is fluorine or chlorine; and p and q are each independently 0 or 1.

2. The compound according to claim 1, wherein $R^1$ and $R^2$ are each independently alkyl having 1 to 10 carbons, alkenyl having 2 to 10 carbons or alkoxy having 1 to 9 carbons; $A^1$ and $A^2$ are each independently 1,4-cyclohexylene, 1,4-cyclohexenylene, 1,4-phenylene, 2,3-difluoro-1,4-phenylene, 2-fluoro-1,4-phenylene or 3-fluoro-1,4-phenylene; $Z^1$ and $Z^2$ are each independently a single bond, —$(CH_2)_2$—, —COO—, —OCO—, —$OCH_2$—, —$CH_2O$—, —CH═CH— or —C≡C—.

3. The compound according to claim 1, wherein $R^1$ is alkyl having 1 to 10 carbons; $R^2$ is alkoxy having 1 to 9 carbons; $A^1$ is 1,4-cyclohexylene, 1,4-cyclohexenylene, 1,4-phenylene or 2,3-difluoro-1,4-phenylene; $Z^1$ is a single bond; X is fluorine; and p is 1 and q is 0.

4. The compound according to claim 1, wherein $R^1$ is alkyl having 1 to 10 carbons; $R^2$ is alkoxy having 1 to 9 carbons; $A^1$ and $A^2$ are each independently 1,4-cyclohexylene, 1,4-phenylene or 2,3-difluoro-1,4-phenylene; $Z^1$ and $Z^2$ are a single bond; X is fluorine; and p is 1 and q is 1.

5. A liquid crystal composition comprising at least one of compounds according to claim 1.

6. The liquid crystal composition according to claim 5, further comprising at least one compound selected from the group of compounds represented by formulas (2), (3) and (4):

(2)

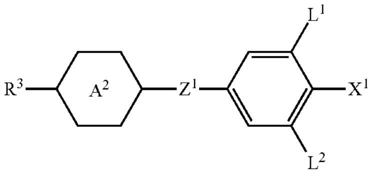

(3)

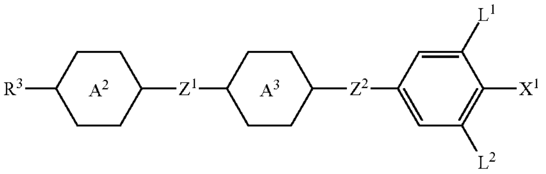

(4)

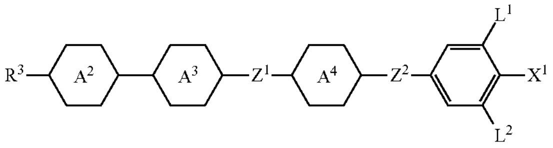

wherein $R^3$ is alkyl having 1 to 10 carbons or alkenyl having 2 to 10 carbons, and in these groups, arbitrary hydrogen may be replaced by fluorine and arbitrary —$CH_2$— may be replaced by —O—; $X^1$ is fluorine or chlorine; the ring $A^2$, the ring $A^3$ and the ring $A^4$ are each independently 1,4-cyclohexylene, 1,3-dioxane-2,5-diyl, pyrimidine-2,5-diyl, tetrahydropyran-2,5-diyl or 1,4-phenylene in which arbitrary hydrogen may be replaced by fluorine; $Z^1$ and $Z^2$ are each independently —$(CH_2)_2$—, —$(CH_2)_4$—, —COO—, —$CF_2O$—, —$OCF_2$—, —CH═CH—, —C≡C—, —$CH_2O$— or a single bond; and $L^1$ and $L^2$ are each independently hydrogen or fluorine.

7. The liquid crystal composition according to claim 5, further comprising at least one compound selected from the group of compounds represented by formula (5):

(5)

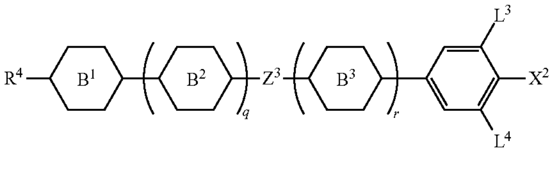

wherein $R^4$ is alkyl having 1 to 10 carbons or alkenyl having 2 to 10 carbons, and in the alkyl and the alkenyl, arbitrary hydrogen may be replaced by fluorine and arbitrary —$CH_2$— may be replaced by —O—; $X^2$ is —C≡N or —C≡C—C≡N; the ring $B^1$, the ring $B^2$ and the ring $B^3$ are each independently 1,4-cyclohexylene, 1,4-phenylene in which arbitrary hydrogen may be replaced by fluorine, 1,3-dioxane-2,5-diyl, tetrahydropyran-2,5-diyl or pyrimidine-2,5-diyl; $Z^3$ is $—(CH_2)_2—$, —COO—, $—CF_2O—$, $—OCF_2—$, —C≡C—, $—CH_2O—$ or a single bond; $L^3$ and $L^4$ are each independently hydrogen or fluorine; and q is 0, 1 or 2 and r is 0 or 1.

8. The liquid crystal composition according to claim 5, further comprising at least one compound selected from the group of compounds represented by formulas (6), (7), (8), (9), (10) and (11):

(6)

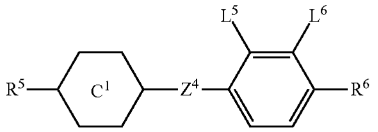

(7)

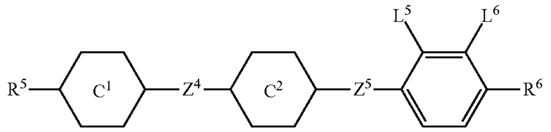

(8)

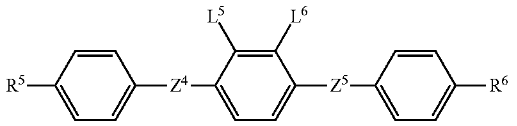

(9)

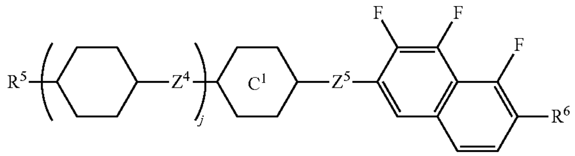

(10)

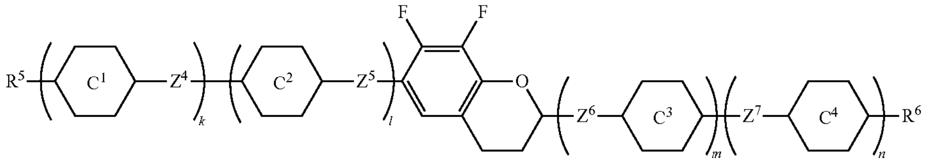

(11)

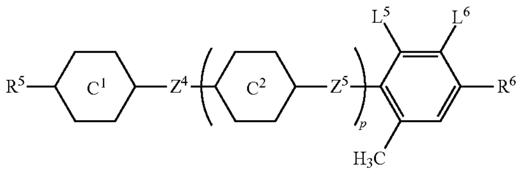

wherein $R^5$ is alkyl having 1 to 10 carbons or alkenyl having 2 to 10 carbons, and in these groups, arbitrary hydrogen may be replaced by fluorine; $R^6$ is alkoxy having 1 to 9 carbons or alkenyloxy having 2 to 9 carbons, and in these groups, arbitrary hydrogen may be replaced by fluorine; the ring $C^1$, the ring $C^2$, the ring $C^3$ and the ring $C^4$ are each independently 1,4-cyclohexylene, 1,4-cyclohexenylene, 1,4-phenylene in which arbitrary hydrogen may be replaced by fluorine, tetrahydropyran-2,5-diyl or decahydronaphthalene-2,6-diyl; $Z^4$, $Z^5$, $Z^6$ and $Z^7$ are each independently $—(CH_2)_2—$, —COO—, $—CH_2O—$, $—OCF_2—$, $—OCF_2\ (CH_2)_2—$ or a single bond; $L^5$ and $L^6$ are each independently fluorine or chlorine; and j, k, l, m, n and p are each independently 0 or 1, and the sum of k, l, m and n is 1 or 2.

9. The liquid crystal composition according to claim 5, further comprising at least one compound selected from the group of compounds represented by formulas (12), (13) and (14):

(12)

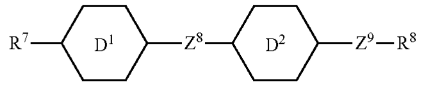

(13)

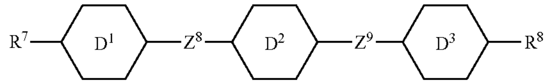

-continued (14)

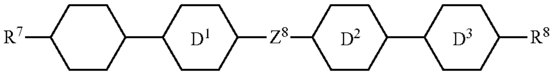

wherein $R^7$ and $R^8$ are each independently alkyl having 1 to 10 carbons or alkenyl having 2 to 10 carbons, and in these groups, arbitrary hydrogen may be replaced by fluorine and arbitrary $—CH_2—$ may be replaced by —O—; the ring $D^1$, the ring $D^2$ and the ring $D^3$ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^8$ and $Z^9$ are each independently —C≡C—, —COO—, $—(CH_2)_2—$, —CH═CH— or a single bond.

10. The liquid crystal composition according to claim 6, further comprising at least one compound selected from the group of compounds represented by formula (5):

(5)

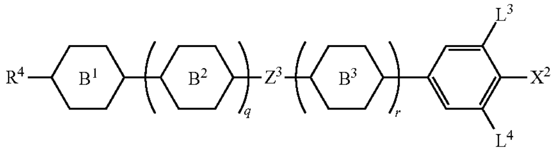

wherein $R^4$ is alkyl having 1 to 10 carbons or alkenyl having 2 to 10 carbons, and in the alkyl and the alkenyl, arbitrary hydrogen may be replaced by fluorine and arbitrary $—CH_2—$ may be replaced by —O—; $X^2$ is —C≡N or —C≡C—C≡N; the ring $B^1$, the ring $B^2$ and the ring $B^3$ are each independently 1,4-cyclohexylene, 1,4-phenylene in which arbitrary hydrogen may be replaced by fluorine, 1,3-dioxane-2,5-diyl, tetrahydropyran-2,5-diyl or pyrimidine-2,5-diyl; $Z^3$ is $—(CH_2)_2—$, —COO—, $—CF_2O—$, $—OCF_2—$, —C≡C—, $—CH_2O—$ or a single bond; $L^3$ and $L^4$ are each independently hydrogen or fluorine; and q is 0, 1 or 2 and r is 0 or 1.

11. The liquid crystal composition according to claim 6, further comprising at least one compound selected from the group of compounds represented by formulas (12), (13) and (14):

(12)

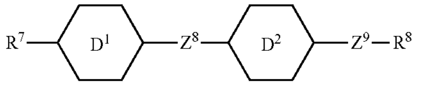

(13)

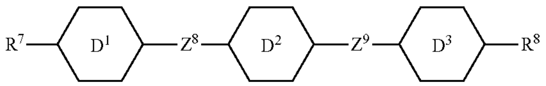

(14)

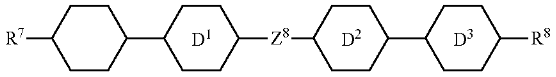

wherein $R^7$ and $R^8$ are each independently alkyl having 1 to 10 carbons or alkenyl having 2 to 10 carbons, and in these groups, arbitrary hydrogen may be replaced by fluorine and arbitrary $—CH_2—$ may be replaced by —O—; the ring $D^1$, the ring $D^2$ and the ring $D^3$ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^8$ and $Z^9$ are each independently —C≡C, —COO—, $—(CH_2)_2—$, —CH═CH— or a single bond.

12. The liquid crystal composition according to claim 7, further comprising at least one compound selected from the group of compounds represented by formulas (12), (13) and (14):

(12)

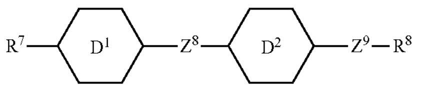

-continued (13)

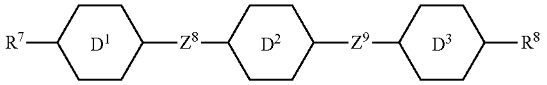

(14)

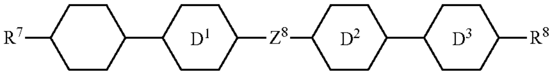

wherein $R^7$ and $R^8$ are each independently alkyl having 1 to 10 carbons or alkenyl having 2 to 10 carbons, and in these groups, arbitrary hydrogen may be replaced by fluorine and arbitrary $—CH_2—$ may be replaced by —O—; the ring $D^1$, the ring $D^2$ and the ring $D^3$ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^8$ and $Z^9$ are each independently —C≡C—, —COO—, $—(CH_2)_2—$, —CH═CH— or a single bond.

13. The liquid crystal composition according to claim 8, further comprising at least one compound selected from the group of compounds represented by formulas (12), (13) and (14):

(12)

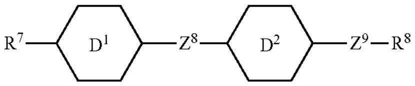

(13)

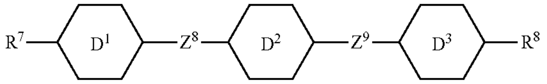

(14)

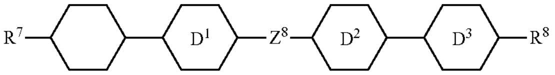

wherein $R^7$ and $R^8$ are each independently alkyl having 1 to 10 carbons or alkenyl having 2 to 10 carbons, and in these groups, arbitrary hydrogen may be replaced by fluorine and arbitrary $—CH_2—$ may be replaced by —O—; the ring $D^1$, the ring $D^2$ and the ring $D^3$ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^8$ and $Z^9$ are each independently —C≡C—, —COO—, $—(CH_2)_2—$, —CH═CH— or a single bond.

14. The liquid crystal composition according claim 5, further comprising at least one optically active compound and/or one polymerizable compound.

15. The liquid crystal composition according to claim 5, further comprising at least one antioxidant and/or one ultraviolet light absorber.

16. A liquid crystal display device containing the liquid crystal composition according to claim 5.

* * * * *